(12) United States Patent
Ichinose et al.

(10) Patent No.: US 8,363,103 B2
(45) Date of Patent: Jan. 29, 2013

(54) DRIVE ASSIST DISPLAY APPARATUS

(75) Inventors: Tadao Ichinose, Kanagawa (JP); Koji Takahashi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 68 days.

(21) Appl. No.: 13/186,684

(22) Filed: Jul. 20, 2011

(65) Prior Publication Data

US 2011/0279674 A1 Nov. 17, 2011

Related U.S. Application Data

(63) Continuation of application No. PCT/JP2010/004722, filed on Jul. 23, 2010.

(30) Foreign Application Priority Data

Apr. 8, 2010 (JP) ................................. 2010-089724

(51) Int. Cl.
H04N 7/18 (2006.01)
H04N 7/00 (2011.01)
G02B 27/14 (2006.01)
G03B 41/00 (2006.01)

(52) U.S. Cl. ......... 348/148; 348/113; 359/631; 396/332
(58) Field of Classification Search .................. 348/148
See application file for complete search history.

(56) References Cited

U.S. PATENT DOCUMENTS

| 8,023,009 | B2 * | 9/2011 | Cho | ............................. 348/241 |
| 2005/0083427 | A1 | 4/2005 | Imoto | |
| 2005/0089241 | A1 * | 4/2005 | Kawanishi et al. | ........... 382/274 |
| 2007/0165108 | A1 | 7/2007 | Yuasa et al. | |
| 2008/0129756 | A1 | 6/2008 | Iwano | |
| 2008/0246843 | A1 | 10/2008 | Nagata et al. | |
| 2009/0219419 | A1 * | 9/2009 | Kawasaka | ..................... 348/251 |

FOREIGN PATENT DOCUMENTS

| JP | 2005-110207 A | 4/2005 |
| JP | 2006-159933 A | 6/2006 |
| JP | 2006-279511 A | 10/2006 |
| JP | 2007-022176 A | 2/2007 |
| JP | 2007-158427 A | 6/2007 |
| JP | 2008-005478 A | 1/2008 |
| JP | 2008-083786 A | 4/2008 |
| JP | 2008-258822 A | 10/2008 |

* cited by examiner

Primary Examiner — Andy Rao
Assistant Examiner — Hee-Yong Kim
(74) Attorney, Agent, or Firm — Pearne & Gordon LLP

(57) ABSTRACT

A drive assist display apparatus displays the backward or frontward of a vehicle. It is assumed that planes are perpendicular with the front-back direction, the downward, leftward and rightward directions being perpendicular with the front-back direction. Square subjects assumed to be on the planes are displayed as squares or rectangles having equal to one another on respective regions in accordance with the direction. The regions include a forward correction image display region in the vicinity of other display regions. The vicinity area has the same display image corresponding to a straight line coincident with a vertical straight line with respect to the ground surface or being in the vehicle front-back direction. The bottom side of a leftward or rightward correction image display region and the left or right side of a downward correction image display region are straight lines coincident with respective vehicle front-back direction straight lines.

6 Claims, 61 Drawing Sheets

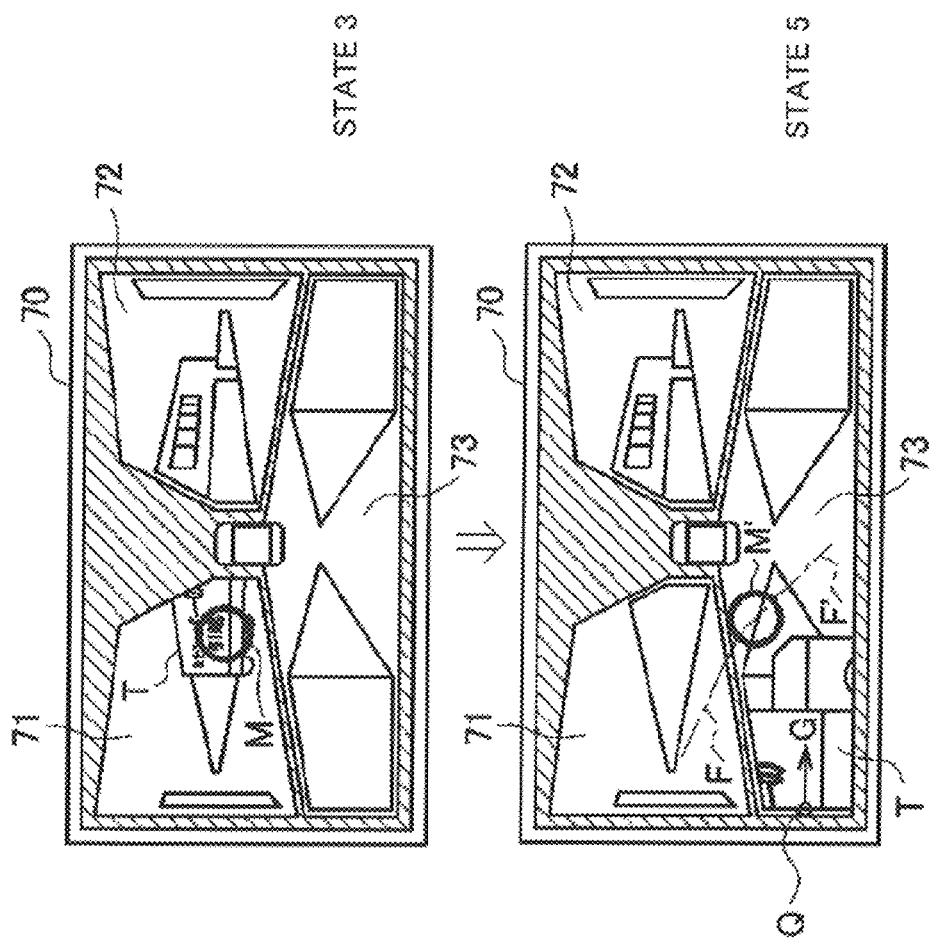

DRIVE ASSIST DISPLAY APPARATUS

RELATED APPLICATIONS

This application is a continuation of PCT/JP2010/004722 filed on Jul. 23, 2010, which is incorporated herein by reference in its entirety.

This application claims the benefits of Japanese Patent Application No. 2010-089724 filed on Apr. 8, 2010 in Japan, the contents of which are incorporated herein by reference.

TECHNICAL FIELD

The present invention relates to a drive assist display apparatus for performing image processing to provide a driver with an image taken backwardly or forwardly from a vehicle by a vehicle-mounted camera.

BACKGROUND ART

There have so far been proposed a wide variety of drive assist display apparatuses for providing a driver with an image taken by a vehicle-mounted camera mounted on such as a rear trunk or a front grille of a vehicle to make the driver sense a backward or a forward of the vehicle.

The conventional drive assist display apparatus is required to take the image of a wider area, and to display a wider image.

In order to realize the requirement, the conventional drive assist display apparatus is designed in various ways such as, for example, taking the image with a plurality of vehicle-mounted cameras or taking the image by using a wide-angle lens, and displaying the wide image in a limited display area.

As an example, the conventional drive assist display apparatus taking the image by using the wide-angle lens is disclosed by a Patent Literature 1.

As shown in FIG. 57, the Patent Literature 1 discloses an image taken by using the wide-angle lens. In the image view, the reference sign 101-1 is regarded as indicating a crosswise straight line crossing in front of the vehicle-mounted camera on the ground surface, and the reference sign 101-2 is regarded as indicating a vertical straight line extending from the ground surface with forming a building.

As an example, the conventional drive assist display apparatus designed to perform a correcting operation of a wide-angle taken image is disclosed by a Patent Literature 2.

As shown in FIG. 58, the Patent Literature 2 discloses a corrected omnidirectional image developed by a Mercator projection from an omnidirectional taken image. FIGS. 59 and 60 each shows an image clipped horizontally about a range of 180 degrees from the corrected omnidirectional image shown in FIG. 58. In FIGS. 59 and 60, the reference sign 102-2-1 is regarded as indicating a vertical straight line extending from the ground surface with forming a building. In FIG. 59, the reference sign 102-2-2 is regarded as indicating parallel lines extending on the ground surface with crossing from the near side toward the far side of the vehicle-mounted camera, the parallel lines constituting a vertically-striped pattern of a crosswalk. In FIG. 60, the reference sign 102-3-1 is regarded as indicating a crosswise straight line crossing in front of the vehicle-mounted camera on the ground surface.

As an example, the conventional drive assist display apparatus designed to take the image with the plurality of vehicle-mounted cameras and to display the image taken by the vehicle-mounted cameras is disclosed by a Patent Literature 3.

As shown in FIG. 61, the Patent Literature 3 discloses a display image including three images respectively taken by three vehicle-mounted cameras. The display image has a backward left image display region 71 for displaying the image taken by the vehicle-mounted camera mounted at an angle toward a backward left direction, a backward right image display region 72 for displaying the image taken by the vehicle-mounted camera mounted at an angle toward a backward right direction, and a backward straight image display region 73 for displaying the image taken by the vehicle-mounted camera mounted at an angle toward a backward straight direction.

In the image arrangement, the image regions 71 to 73 are located in a manner that the backward left image display region 71 and the backward right image display region 72 are covered by the top side of the backward straight image display region 73.

As shown states 3 and 5 in FIG. 61, in responding to change the display region of a moving object T crossing in the back of the vehicle from the backward left image display region 71 to the backward straight image display region 73, an auxiliary image M' is appeared in the backward straight image display region 73 so that an auxiliary image guide line F' in the backward straight image display region 73 is contiguous to a movement locus F in the backward left image display region 71. This results in the fact that an eye line of a driver is led to the backward straight image display region 73 with reducing a feeling of discontinuity.

CITATION LIST

Patent Literature

[PTL 1]
  Patent Literature 1: Japanese Patent Laid-Open Publication 2007-22176
[PTL 2]
  Patent Literature 2: Japanese Patent Laid-Open Publication 2008-5478
[PTL 3]
  Patent Literature 3: Japanese Patent Laid-Open Publication 2008-258822

SUMMARY OF INVENTION

Technical Problem

However, in case of using the wide-angle lens as the disclosure of the Patent Literature 1, the actual straight lines 101-1 and 101-2 appeared on the taken image are obviously curved depending respectively on the angular relationships between the actual straight lines 101-1, 101-2 and the axis of the lens. This leads to the fact that, under the state that the taken image is directly displayed, the conventional drive assist display apparatus disclosed in the Patent Literature 1 encounters such a problem of difficulty to distinguish whether the line 101-1 is crosswise or not, the line 101-2 is vertical or not, and the lines 101-1 and 101-2 are straight or not.

As means for correcting the taken image to facilitate visibility, the Patent Literature 2 discloses an image correction method.

By the image correction method, a vertical subject such as, for example, the vertical straight line 102-2-1 is displayed straight vertically on the display image. In other word, the image correction method improves visibility of the vertical subject.

However, the crosswise straight line 102-3-1 is curved in similar to the line 101-1. The straight line 102-3-1 is displayed in a horizontal direction in the vicinity of a front face portion, and displayed in a nearly vertical direction in left and right far portions. This leads to the fact that the disclosure of the Patent Literature 2 has difficulty, in similar to the Patent Literature 1, to distinguish whether the line 102-3-1 is in the cross direction over all or not, and the line 102-3-1 is straight over all or not.

In case that an image of an edge portion of the vehicle such as, for example, a bumper is taken on the downside of the image to make the driver recognize relationships between the vehicle and the circumference of the vehicle for the purpose of a drive assist, the edge portion of the vehicle is curved beyond recognition on the display image.

The lines 102-2-2 constituting the vertically-striped pattern of the crosswalk with extending a front-back direction from the position of the camera are especially near to the vehicle-mounted camera. The front-back direction straight lines among the lines 102-2-2 are obviously curved and spread toward the left or right side on the display image. This leads to the fact that the disclosure of the Patent Literature 2 encounters such a problem of difficulty to make the driver recognize the width of the vehicle and a travelling direction of the vehicle for the purpose of the drive assist.

On the other hand, if the image is taken without using the wide-angle lens, the straight line is not obviously carved on the taken image without the image correction method disclosed in the Patent Literature 2. The example of the taken image is disclosed in the Patent Literature 3. In response to change the display region of the moving object T from the backward left image display region 71 to the backward straight image display region 73, the eye line of the driver is forced to be moved from the right side of the backward left image display region 71 to an image appearance position Q on the left side of the backward straight image display region 73 in the reverse direction of movement of the moving object T on the backward straight image display region 73.

The disclosure of the Patent Literature 3 is not designed to guide the movement of the eye line to the backward straight image display region 73 by displaying the auxiliary image M'. However, the disclosure of the Patent Literature 3 is not designed to guide to the complete image appearance position Q and not designed to correct the direction and length of the movement of the eye line to the image appearance position Q. This results in the fact that the disclosure of the Patent Literature 3 encounters such a problem that the driver needs time to consider about the positional relationships. As a result, there is a possibility that the driver falls behind in vehicle handling. In addition, in the case that the image taken at an angle of the straight backward direction without using the wide-angle lens, the disclosure of the Patent Literature 3 has a difficulty to take and display the image of the edge portion of the vehicle such as, for example, the bumper. This results from the fact that there is a large angular difference between the edge portion of the vehicle and the straight backward direction.

It is, therefore, a subject of the present invention to provide a drive assist display apparatus which can realize, from imaging to displaying the front, left, right and down wide area of the backward or frontward of the vehicle, displaying in high visibility of a form of an imaged subject in accordance with purposes, improving visibility of directional and positional relationships between the imaged subject and the vehicle, and facilitating the movement of the eye line targeting to the subject on the display.

Solution to Problem

According to one aspect of the present invention to resolve the conventional problems above mentioned, there is provided a drive assist display apparatus comprises: one or more imaging sections operable to take an image of a front, left, right and down wide area of a backward or frontward of a vehicle from an imaging position; an image processing section operable to correct the image taken by the imaging section, operable to divide the corrected image, operable to locate the divided images respectively on arbitrary correction image display regions, and operable to combine mask pictures with the located images on arbitrary display positions; an image display section for displaying the image processed by the image processing section, wherein the image processing section is operable to create: a forward correction image corrected in a manner that, when an image of square cells formed by horizontal and vertical lines with respect to a horizontal ground surface on a forward plane is taken, the square cells on the forward plane are displayed as squares or rectangles formed by horizontal and vertical lines with each having an area equal to one another on a display image, the forward plane being in perpendicular relationship with a forward virtual sight line, the forward virtual sight line being in parallel relationship with a vehicle front-back direction, and the vehicle front-back direction being in parallel relationship with the ground surface; a leftward correction image corrected in a manner that, when an image of square cells formed by horizontal and vertical lines with respect to the ground surface on a leftward plane is taken, the square cells on the leftward plane are displayed as squares or rectangles formed by horizontal and vertical lines with each having an area equal to one another on the display image, the leftward plane being in perpendicular relationship with a leftward virtual sight line, the leftward virtual sight line being horizontally inclined leftward at an angle over 0 and under 90 degrees with respect to the vehicle front-back direction; a rightward correction image corrected in a manner that, when an image of square cells formed by horizontal and vertical lines with respect to the ground surface on a rightward plane is taken, the square cells on the rightward plane are displayed as squares or rectangles formed by horizontal and vertical lines with each having an area equal to one another on the display image, the rightward plane being in perpendicular relationship with a rightward virtual sight line, the rightward virtual sight line being horizontally inclined rightward at an angle over 0 and under 90 degrees with respect to the vehicle front-back direction; and a downward correction image corrected in a manner that, when an image of square cells formed by straight lines parallel to a vehicle left-right direction and straight lines perpendicular to a straight line being in the vehicle left-right direction on a downward plane is taken, the parallel and perpendicular square cells are displayed as squares or rectangles formed by horizontal and vertical lines with each having an area equal to one another on the display image, the downward plane being in perpendicular relationship with a downward virtual sight line, the downward virtual sight line being vertically inclined downward at an angle over 0 and under 90 degrees with respect to the vehicle front-back direction, operable to have the forward, leftward, rightward, and downward correction images displayed on respective forward, leftward, rightward, and downward correction image display regions: the forward correction image display region having left and right sides each formed a vertical straight line on the display image, and a bottom side formed a horizontal straight line on the display image; the leftward correction image display region having a right side formed a vertical straight line on the display image, and a bottom side formed a straight line corresponding to a straight line being in parallel relationship with the vehicle front-back direction at the left hand side of the imaging position on the ground surface; the rightward correction image display region having a left side formed a vertical straight line on the display image, and a bottom side formed a straight line corresponding to a straight line being in parallel relationship with the vehicle front-back direction at the right hand side of the imaging position on the ground surface; and the downward correction image display region having a top side formed a horizontal straight line on the display image with corresponding to a straight line being in parallel relationship with the vehicle left-right direction at the front side of the imaging position on the ground surface, a left side formed a straight line corresponding to the straight line being in parallel relationship with the vehicle front-back direction at the left hand side of the imaging position on the ground surface, and a right side formed a straight line corresponding to the straight line being in parallel relationship with the vehicle front-back direction at the right hand side of the imaging position on the ground surface, operable to locate the correction image display regions in a manner that the right side of the leftward correction image display region is adjacent to the left side of the forward correction image display region, the left side of the rightward correction image display region is adjacent to the right side of the forward correction image display region, and the top side of the downward correction image display region is adjacent to the bottom side of the forward correction image display region, operable to fit the taken images to the respective correction image display regions in a manner that the same images are appeared in the vicinity of the sides of the respective correction image display regions adjacent to each other, operable to flip horizontally the display image with keeping the relationships among four correction image display regions as usage, and operable to draw mask pictures of lines or dotted lines in arbitrary color on the sides of the respective correction image display regions adjacent to each other, and draw mask pictures filling gaps except four correction image display regions in arbitrary color.

In accordance with the above construction, the whole taken image of the front, left, right and down wide area of the backward or frontward of the vehicle is simultaneously displayed.

Additionally, the image displayed on each correction image display region is corrected with reducing the deformation of the image of the subject on the plane, the plane being in perpendicular to the leftward, rightward and downward directions with respect to the vehicle front-back direction.

Additionally, the display regions are displayed on directional relationships similar to the actuality directional relationships.

Additionally, the subject moving between the frontward direction and leftward, rightward or downward direction is displayed without discontinuity.

Additionally, the straight line subjects are respectively displayed as the straight lines in the correction image display regions.

Additionally, the straight line subjects perpendicular to the ground surface in forward, leftward and rightward directions are respectively displayed as the vertical straight lines in the correction image display regions.

Additionally, the straight line subjects parallel to the ground surface in forward and downward directions and parallel to the vehicle left-right direction are respectively displayed as the horizontal straight lines in the correction image display regions.

Additionally, the vehicle front-back direction on the ground surface is indicated by forms of the left and right sides of the downward correction image display region and the bottom side of the leftward and rightward correction image display regions.

Additionally, boundaries of the display regions adjacent to one another are respectively displayed.

The drive assist display apparatus may adjust the inclined angle of the leftward and rightward virtual sight lines, or adjusting the degree of expanding horizontally the square cells on the leftward and rightward planes so that the straight line corresponding to the bottom side of the leftward or rightward correction image display region and being parallel relationship with the vehicle front-back direction on the ground surface is displayed more horizontal on the leftward or rightward correction image display region than on the forward correction image display region.

In accordance with the above construction, straight lines displayed on the leftward or rightward correction image display region toward the vehicle front-back direction except having a height equal to an imaging position is reduced in inclination with retained.

The drive assist display apparatus may display in a manner that, when the image of the square cells on the leftward plane is taken, the square cells are appeared as parallelogram cells each having an area equal to one another and inclined down toward left gradually at a degree that straight lines parallel to the ground surface are visible in the leftward correction image display region, and that, when the image of the square cells on the rightward plane is taken, the square cells are appeared as parallelogram cells each having an area equal to one another and inclined down toward right gradually at a degree that the straight lines parallel to the ground surface is visible in the rightward correction image display region.

In accordance with the above construction, a horizon is displayed horizontally in the forward correction image display region, inclined down toward left in the leftward correction image display region, and inclined down toward right in the rightward correction image display region.

The drive assist display apparatus may locate the correction image display regions in a manner that the bottom side of the leftward correction image display region is adjacent to the left side of the downward correction image display region, and the bottom side of the rightward correction image display region is adjacent to the right side of the downward correction image display region, fit the taken images to the respective correction image display regions in a manner that the same images are appeared in the vicinity of the sides of the respective correction image display regions adjacent to each other, and draw the mask pictures of lines or dotted lines in arbitrary color on the sides of the respective correction image display regions adjacent to each other.

In accordance with the above construction, the subject moving between the leftward or rightward direction and downward direction is displayed without discontinuity.

The drive assist display apparatus may display in a manner that, when the image of the square cells on the leftward plane is taken, the square cells are appeared as parallelogram cells each having an area equal to one another and inclined down toward left gradually at a degree that lines parallel to the ground surface are visible in the leftward correction image display region, and that, when the image of the square cells on the rightward plane is taken, the square cells are appeared as parallelogram cells each having an area equal to one another and inclined down toward right gradually at a degree that lines parallel to the ground surface are visible in the rightward correction image display region.

In accordance with the above construction, while the degree of enlarging vertically the downward correction image display region is reduced, the horizon is displayed horizontally in the forward correction image display region, displayed inclined down toward left in the leftward correction image display region, and displayed inclined down toward right in the rightward correction image display region.

The drive assist display apparatus to be operated with: a vehicle front-back direction straight line being in parallel relationship with the vehicle front-back direction on the ground surface, and corresponding to the left or right side of the downward correction image display region or corresponding to the bottom side of the leftward or rightward correction image display region; a vehicle left-right direction straight line being in parallel relationship with the vehicle left-right direction on the ground surface, and corresponding to the top side of the downward correction image display region or corresponding to the bottom side of the forward correction image display region; an intersection point between the vehicle front-back direction straight line and the vehicle left-right direction straight line; a circle being an innermost of a vehicle travelling way on the ground surface, the vehicle travelling way travelled thereon the vehicle at full lock; and a tangent line tangent to the circle with passing on an image origin being under the imaging position on the ground surface, wherein the intersection point may be in the vicinity of the tangent line.

In accordance with the above construction, solid vertical subjects are displayed vertically. Additionally, the circle being the innermost of the vehicle travelling way is located in mainly the leftward or rightward correction image display region under the relationships between the forward correction image display region and the leftward or rightward correction image display region, and targeted the boundaries between the forward correction image display region and the leftward and rightward correction image display regions.

Advantageous Effects of Invention

As mentioned above, in accordance with the drive assist display apparatus of the present invention: the front, left, right and down wide area is displayed without a missing part; the whole image is displayed similar in form and location to the real sight; and the horizon is displayed horizontally across three display regions. This leads to the fact that the whole image is improved visibility as subjects from an adjacent place to a distant place are overlooked from a place.

The subject moving along the front-back direction or the distantly-positioned left-right direction is displayed without discontinuity and misalignment. This results in the fact that the movement of the eye line useful for the drive assist toward the front-back direction or the left-right direction is facilitated.

The straight line subjects are respectively displayed as the straight lines in display regions, thereby resulting in improving visibility of directionality. The straight lines perpendicular to the ground surface is displayed as the vertical lines in the image useful for watching a left-right direction, thereby resulting in improving visibility of up and down relationships useful for the drive assist between the ground surface and an obstacles. The straight lines directed along an crosswise direction of the vehicle is displayed as the horizontal lines in the image useful for watching an up-down direction, thereby resulting in reducing the deformation of the image of the edge portion of the vehicle such as, for example, the bumper and improving visibility of relationships of directionality of the vehicle with respect to the crosswise direction. The display regions are matched in sides and forms, thereby resulting in improving visibility of the vehicle front-back direction useful for the drive assist.

Although the straight lines formed the boundaries of the display regions adjacent to one another are polygonal, the boundaries are recognized by the mask pictures. This results in the fact that the driver recognize that the sight line is needed to change in accordance with the display regions.

Additionally, in accordance with the drive assist display apparatus of the present invention, the vehicle front-back direction straight lines on the ground surface are displayed on the leftward or rightward correction image display region as inclined closely to the horizon with increasing distance from the vehicle, thereby resulting in maintaining visibility of the depth of the vehicle front-back direction and decreasing the inclination of the image of the subject in the vehicle front-back direction. This leads to the fact that the image of the subject is displayed similar to the real subject, thereby resulting in improving visibility of the subject.

Additionally, in accordance with the drive assist display apparatus of the present invention, when the image of the infinite ground surface without the solid subjects and patterns is taken, the horizon is appeared as arcuate shape on the display image. This leads to the fact that the forward, leftward and rightward correction image display regions are respectively recognized to display the forward, leftward and rightward directions.

Additionally, in accordance with the drive assist display apparatus of the present invention, the image is displayed without discontinuity and misalignment from the left-right direction to the down direction, thereby resulting in improving visibility of the relationships in the whole image, and facilitating the movement of the eye line targeting to the subject moving in the whole display image.

Additionally, in accordance with the drive assist display apparatus of the present invention, the forward, leftward and rightward correction image display regions are respectively recognized to display the forward, leftward and rightward directions without influence of visibility of the downward correction image display region under the state that the downward correction image display region is in contact with each leftward and rightward correction image display region.

Additionally, in accordance with the drive assist display apparatus of the present invention, the straight line formed mask pictures indicating the boundary between the leftward or rightward correction image display region and the forward correction image display region acts as a guideline for judging whether or not the vehicle at full lock is in contact with the solid subject, thereby resulting in improving visibility of the relationships between the vehicle, for example, moved into the garage and the solid subject.

BRIEF DESCRIPTION OF DRAWINGS

FIG. 61 is a conceptual diagram showing a conventional display image.

DESCRIPTION OF EMBODIMENTS

The embodiments of the present invention will be described hereinafter with reference to the drawings.

(First Embodiment)

Figure 1:
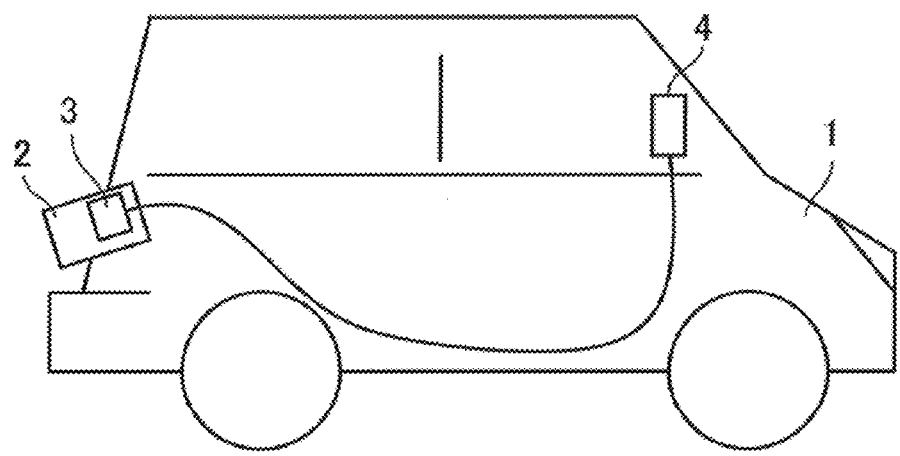
FIG. 1 is a configuration diagram showing a construction of the drive assist display apparatus according to first to sixth embodiments of the present invention.

FIG. 1 is a configuration diagram of the first embodiment of the present invention.

As shown in FIG. 1, the reference sign 1 indicates a vehicle mounting a drive assist display apparatus, the reference sign 2 indicates a vehicle-mounted camera having a wide-angle lens for taking an image of a wide area, and the reference sign 3 indicates an image processing section accommodated in the vehicle-mounted camera 2. The image processing section 3 is operable to correct the image taken by the vehicle-mounted camera 2, operable to divide the corrected image, operable to locate the divided images respectively on arbitrary correction image display regions, and operable to draw mask pictures on arbitrary display positions.

The reference sign 4 indicates a monitor for displaying the image processed by the image processing section 3.

Figure 2:
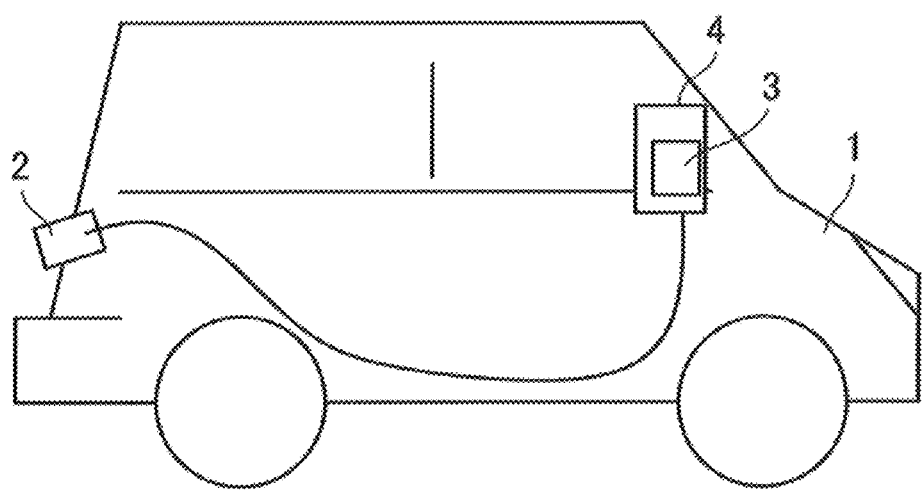
FIG. 2 is a configuration diagram showing a construction of the drive assist display apparatus according to first to sixth embodiments of the present invention.

While there has been described in the forgoing description about the fact that the image processing section 3 is accommodated in the vehicle-mounted camera 2, the image processing section 3 may be accommodated in the monitor 4 as shown in FIG. 2. The image processing section 3 may also be accommodated in an image processing apparatus 5 as shown in FIG. 3.

Figure 3:
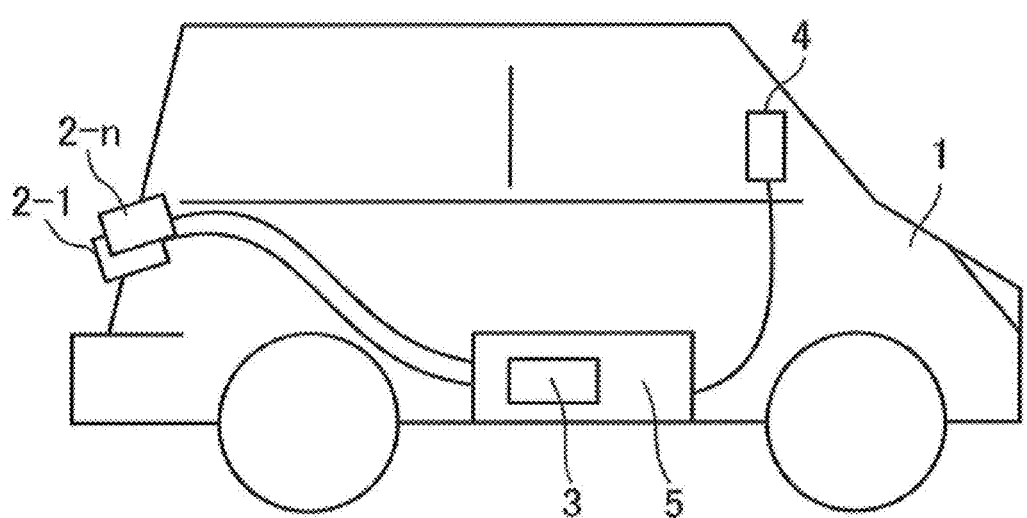
FIG. 3 is a configuration diagram showing a construction of the drive assist display apparatus according to first to sixth embodiments of the present invention.

As shown in FIG. 3, the vehicle-mounted camera 2 may be replaced by a plurality of vehicle-mounted cameras 2-1 to 2-$n$ each having a non wide-angle lens.

In this case, however, there is the possibility of causing declinations at the seams between the corrected images. The vehicle-mounted cameras 2-1 to 2-$n$ are, therefore, mounted adjacently to each other to make the declinations be inconspicuous on the image to be displayed.

While there has been shown in FIGS. 1 to 3 about the fact that the vehicle-mounted camera 2 is mounted on the rear side of the vehicle, the vehicle-mounted camera 2 may be mounted on the front side of the vehicle. In the first and following embodiments of the present invention, the vehicle-mounted camera 2 is described as mounted on the rear side of the vehicle.

Figure 4:
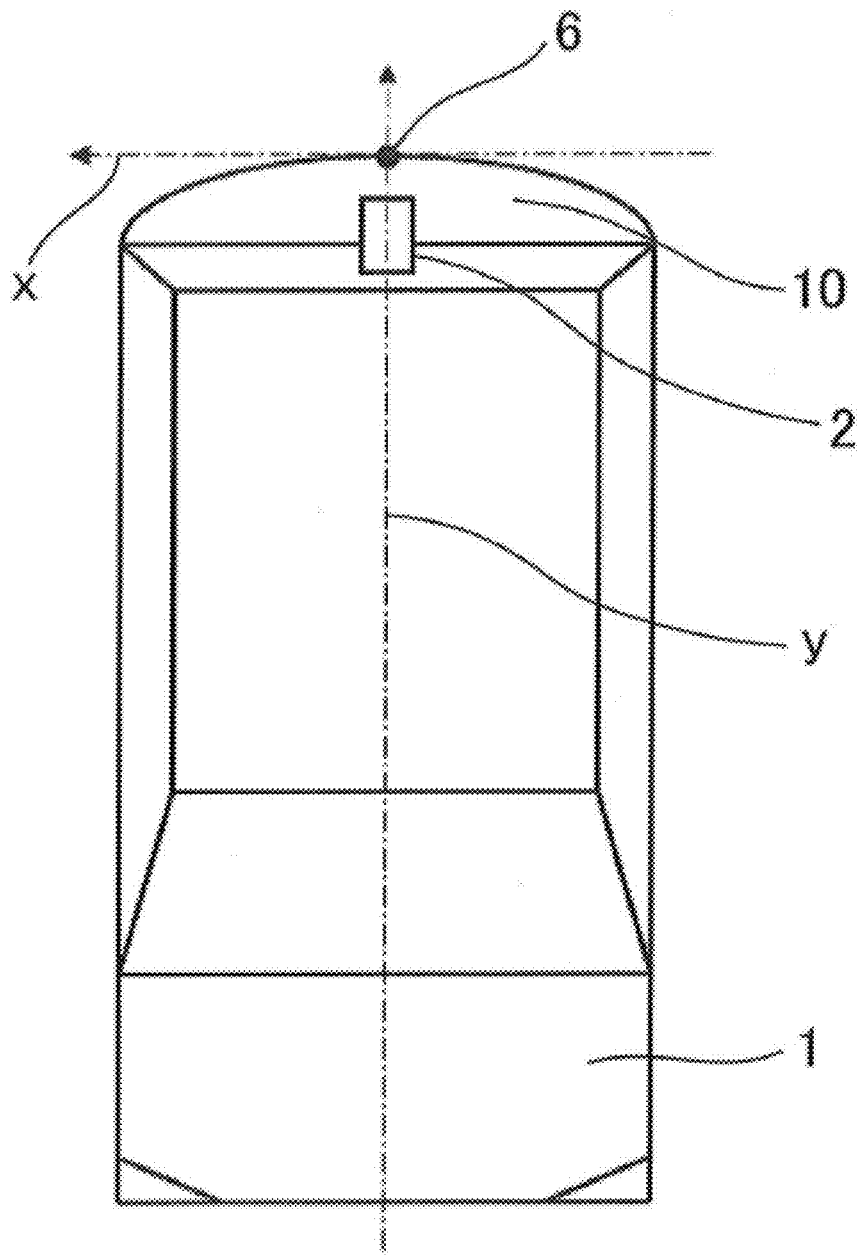
FIG. 4 is a conceptual diagram showing a detailed mounted state of the vehicle-mounted camera with respect to the vehicle.
Figure 5:
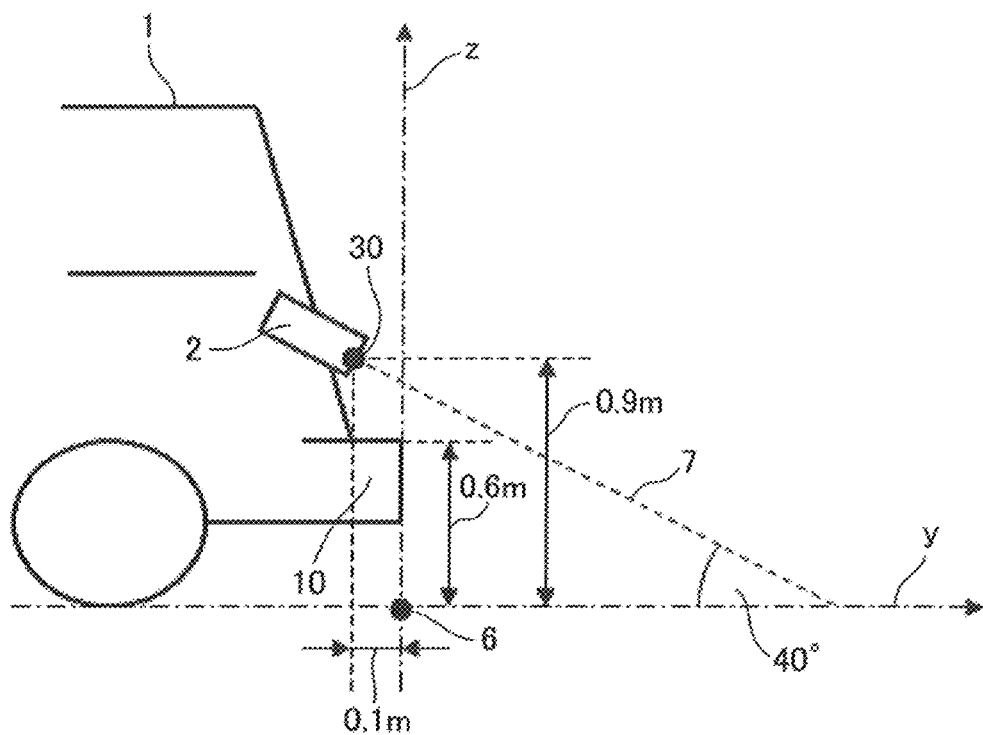
FIG. 5 is a conceptual diagram showing a detailed mounted state of the vehicle-mounted camera with respect to the vehicle.

FIGS. 4 and 5 each shows a detailed mounted state of the vehicle-mounted camera 2 with respect to the vehicle 1.

The overhead view of the vehicle 1 is shown in FIG. 4.

In the following description, the ground surface is assumed to be horizontal. The reference sign 10 indicates a rear bumper of the vehicle 1, and the reference sign y indicates a y-axis representing a front-back direction of the vehicle 1. The y-axis is in parallel relationship with the ground surface, and passes through a center of a left-right direction of the vehicle 1.

The reference sign x indicates an x-axis representing the left-right direction of the vehicle 1. The x-axis is in parallel relationship with the ground surface, and is tangent to the edge of the bumper, i.e., the rear edge portion of the vehicle 1.

The reference sign 6 indicates an origin of the vehicle 1 hereinafter referred to as "vehicle origin", the vehicle origin 6 being an intersection point of the y-axis with the x-axis.

The vehicle-mounted camera 2 is located on the y-axis.

The side view of the vehicle 1 is shown in FIG. 5.

The reference sign y indicates the y-axis shown in FIG. 4.

The reference sign z indicates a z-axis being in perpendicular relationship with the ground surface, the z-axis being tangent to the edge of the bumper, i.e., the rear edge portion of the vehicle 1 across the vehicle origin 6 shown in FIG. 4.

The reference sign 7 indicates an optical axis of the lens constituting the vehicle-mounted camera 2, the optical axis 7 being assumed to be inclined with respect to the y-axis at an angle of 40 degrees.

The reference sign 30 indicates an imaging origin representing an imaging position, the imaging position being assumed to be at −0.1 m in the direction of the y-axis and at 0.9 m in the direction of the z-axis from the vehicle origin 6.

The rear edge of the bumper, i.e., the rear edge portion of the vehicle 1 is assumed to be at 0.6 m in the direction of the z-axis.

The above angles and positional relationships are mentioned as an example. In actuality, the angles and positional relationships are varied in response to a type of vehicle.

FIGS. 6, 7, 9 and 13 each shows a subject imaged by the vehicle-mounted camera 2 on the basis of the vehicle origin 6.

Figure 6:
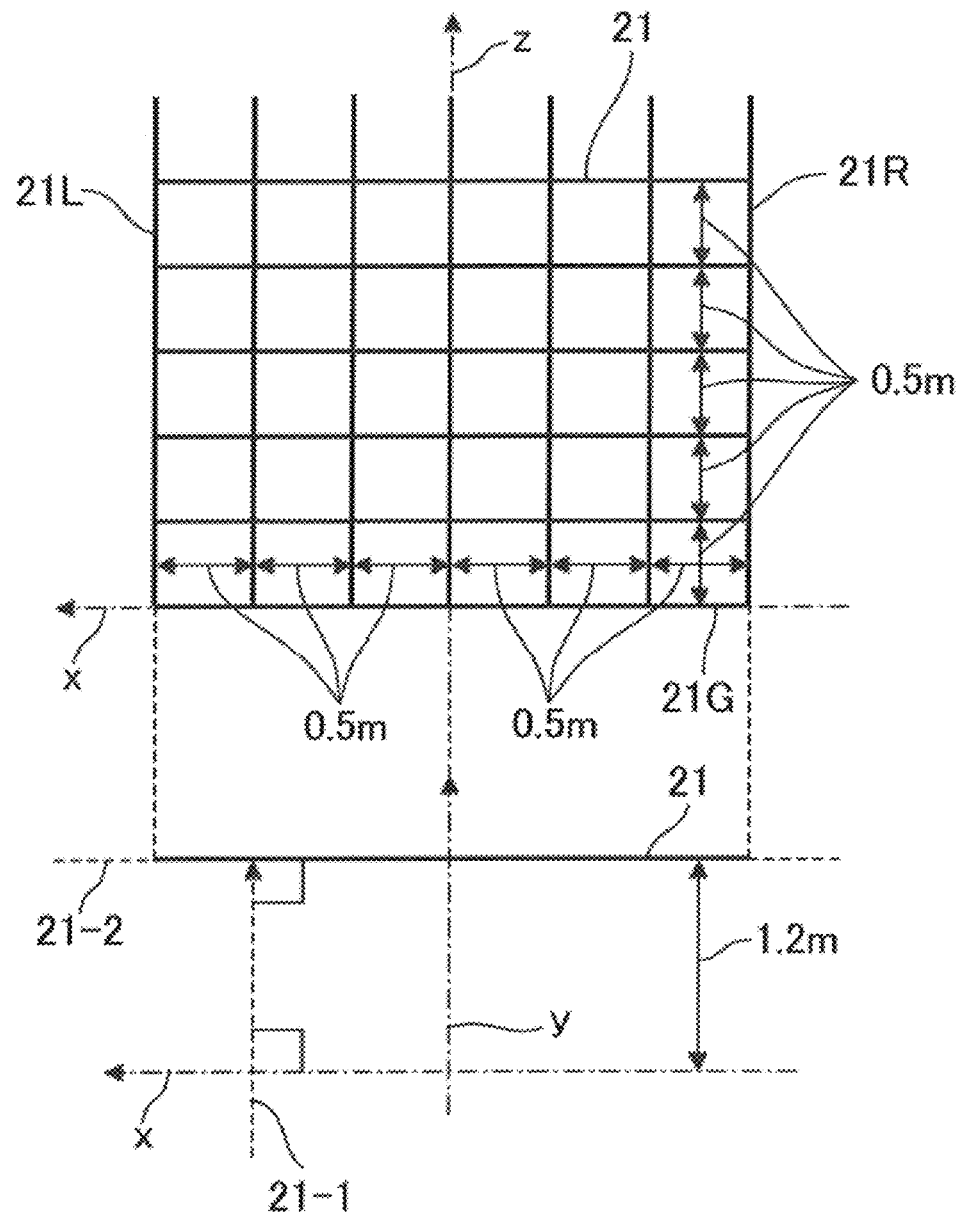
FIG. 6 is a conceptual diagram showing a subject imaged by the vehicle-mounted camera 2.

In FIG. 6, the reference sign 21-1 indicates a forward virtual sight line being in parallel relationship with the y-axis. The reference sign 21-2 indicates a forward plane being in perpendicular relationship with the forward virtual sight line 21-1, the forward plane 21-2 being at 1.2 m in the direction of the y-axis. The reference sign 21 indicates cells each aligned with one another at equal intervals of 0.5 m on the illustrated part of the forward plane 21-2. Each of the cells 21 is formed a square having a 0.5 m side being in parallel relationship with the ground surface, and a 0.5 m side being in perpendicular relationship with the ground surface. The reference sign 21G indicates a vehicle left-right direction straight line on the ground surface, the vehicle left-right direction straight line 21G being included in the cells 21 on the forward plane. The reference sign 21L indicates a vertical line being at 1.5 m in the direction of the x-axis from the vehicle origin 6, the vertical line 21L being included in the cells 21 on the forward plane. The reference sign 21R indicates a vertical line being at −1.5 m in the direction of the x-axis from the vehicle origin 6, the vertical line 21R being included in the cells 21 on the forward plane.

Figure 7:
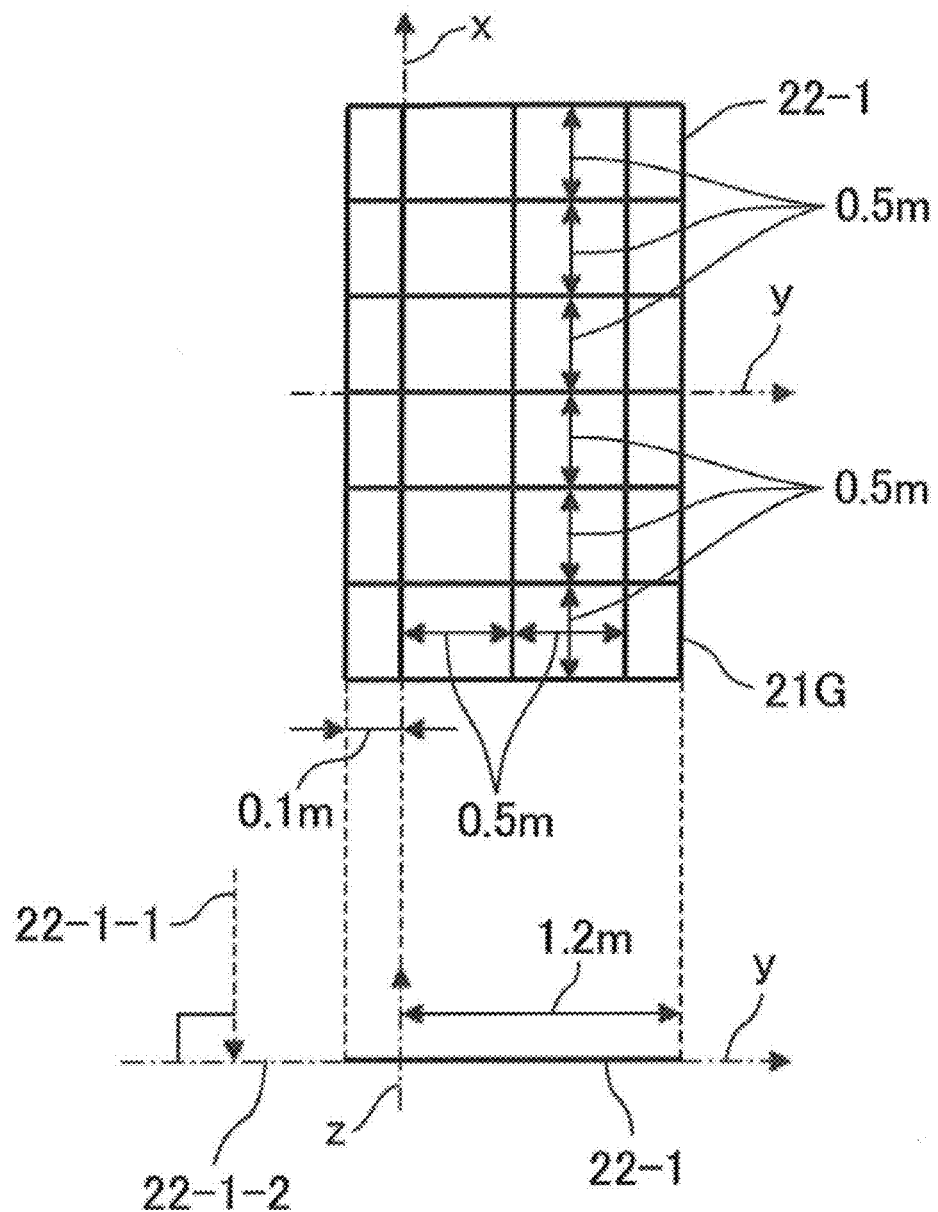
FIG. 7 is a conceptual diagram showing a subject imaged by the vehicle-mounted camera 2.

In FIG. 7, the reference sign 21G indicates the vehicle left-right direction straight line 21G shown in FIG. 6. The reference sign 22-1-1 indicates a downward virtual sight line inclined with respect to the y-axis at a downward angle of 90 degrees. The reference sign 22-1-2 indicates a downward plane being in perpendicular relationship with the downward virtual sight line 22-1-1 on the ground surface. The reference sign 22-1 indicates cells each aligned with one another at equal intervals of 0.5 m on the illustrated part of the downward plane 22-1-2. Each of the cells 22-1 is formed a square having a 0.5 m side being in parallel relationship with the vehicle left-right direction straight line 21G, and a 0.5 m side being in perpendicular relationship with the vehicle left-right direction straight line 21G. The reference sign 22-1 further indicates cells being on the downward plane. Each of the cells formed by the vehicle left-right direction straight line 21G and a straight line being in parallel relationship with the x-axis passing just under the vehicle-mounted camera 2 on the ground surface.

Figure 9:
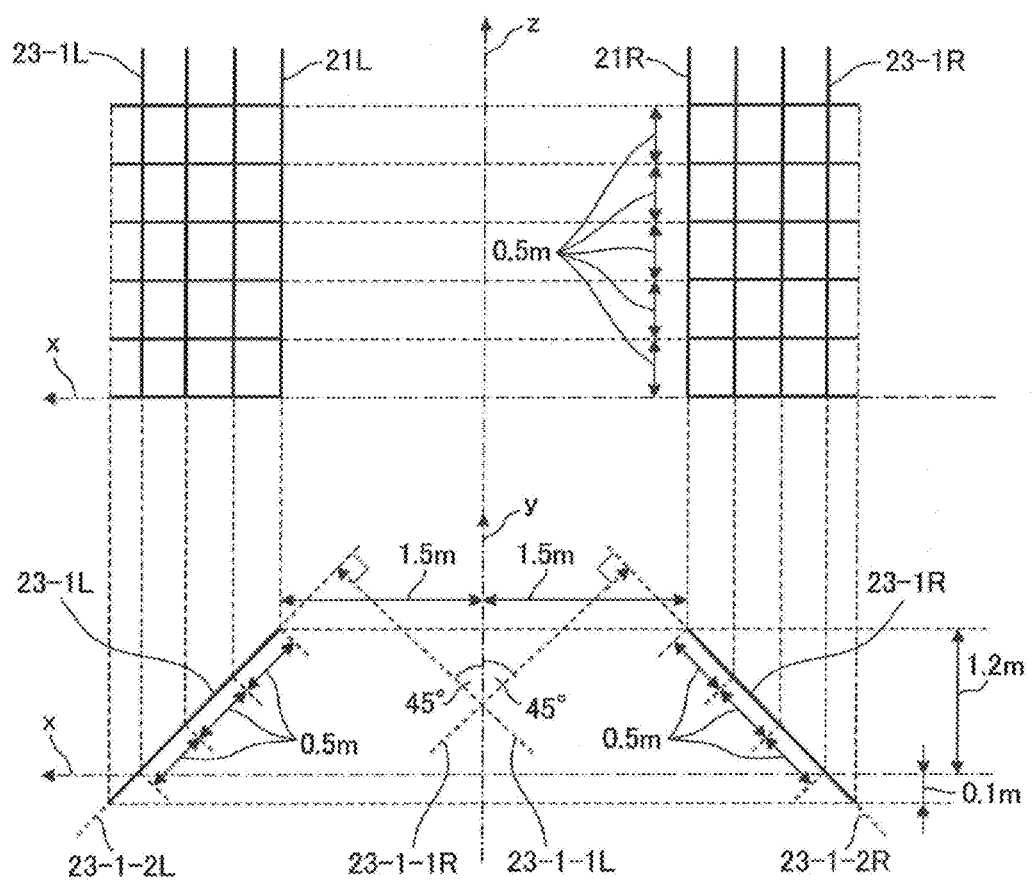
FIG. 9 is a conceptual diagram showing a subject imaged by the vehicle-mounted camera 2.

In FIG. 9, the reference signs 21L and 21R respectively indicate the vertical lines 21L and 21R shown in FIG. 6. The reference sign 23-1-1L indicates a leftward virtual sight line inclined with respect to the y-axis at a leftward angle of 45 degrees. The reference sign 23-1-2L indicates a leftward plane being in perpendicular relationship with the leftward virtual sight line 23-1-1L, and including a point at 1.5 m in the direction of the x-axis and 1.2 m in the direction of the y-axis from the vehicle origin 6. The reference sign 23-1L indicates cells each aligned with one another at equal intervals of 0.5 m on the illustrated part of the leftward plane 23-1-2L including the vertical line 21L. Each of the cells 23-1L is formed with a square having a 0.5 m side being in parallel relationship with the ground surface, and a 0.5 m side being in perpendicular relationship with the ground surface. The reference sign 23-1-1R indicates a rightward virtual sight line inclined with respect to the y-axis at a rightward angle of 45 degrees. The reference sign 23-1-2R indicates a rightward plane being in perpendicular relationship with the rightward virtual sight line 23-1-1R, and including a point at −1.5 m in the direction of the x-axis and 1.2 m in the direction of the y-axis from the vehicle origin 6. The reference sign 23-1R indicates cells each aligned with one another at equal intervals of 0.5 m on the illustrated part of the rightward plane 23-1-2R including the vertical line 21R. Each of the cell 23-1R is formed with a square having a 0.5 m side being in parallel relationship with the ground surface, and a 0.5 m side being in perpendicular relationship with the ground surface.

Figure 13:
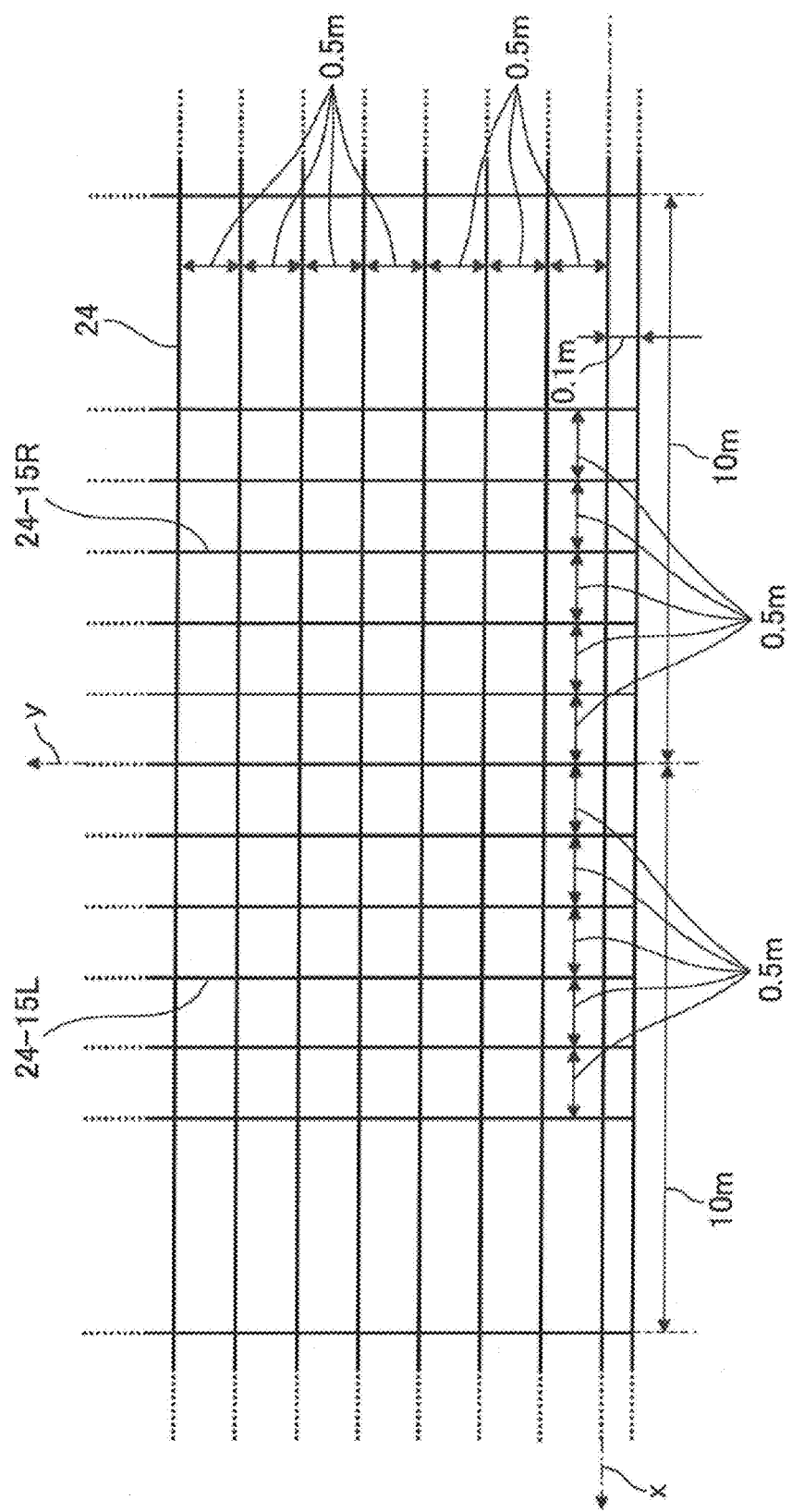
FIG. 13 is a conceptual diagram showing a subject imaged by the vehicle-mounted camera 2.

In FIG. 13, the reference sign 24 indicates 9 straight lines respectively passing at −0.1 m and points from 0 m to 3.5 m at 0.5 m intervals in the direction of the y-axis on the ground surface, and each having an infinite length in parallel relationship with the x-axis. The reference sign 24 further indicates 13 straight lines respectively passing at 10 m, −10 m, and points from −2.5 m to 2.5 m at 0.5 m intervals in the direction of the x-axis on the ground surface, and each having an infinite length toward the positive direction of the y-axis in parallel relationship with the y-axis. The reference sign 24-15L indicates a vehicle front-back direction straight line included in the straight lines 24 on the ground surface at 1.5 m in the direction of the x-axis. The reference sign 24-15R indicates a vehicle front-back direction straight line included in the straight lines 24 on the ground surface at −1.5 m in the direction of the x-axis.

Figure 15:
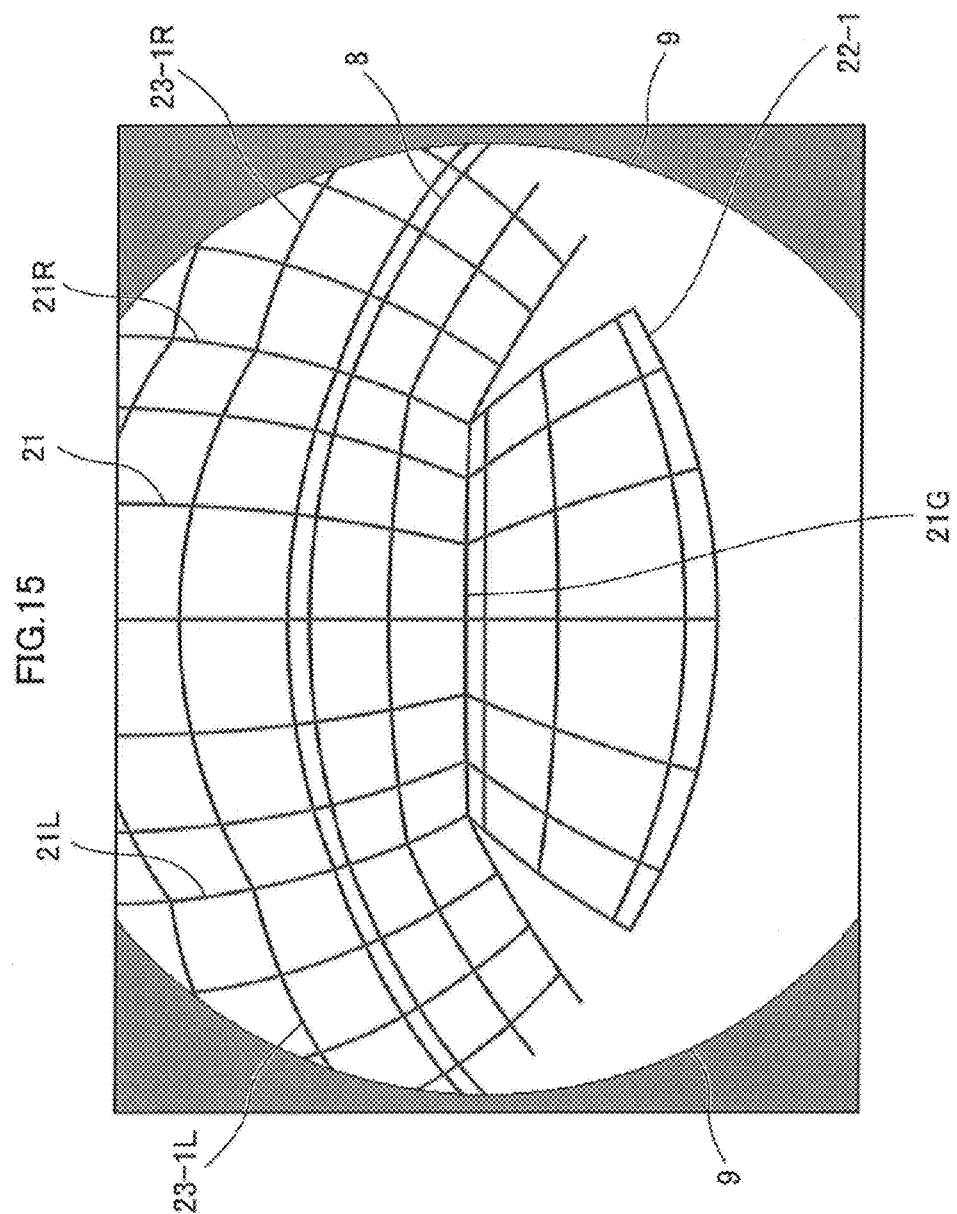
FIG. 15 is a conceptual diagram showing a taken image.

FIG. 15 shows a taken image before operated by an image processing.

In case that the cells 21 on the forward plane shown in FIG. 6, the cells 22-1 on the downward plane shown in FIG. 7, the cells 23-1L on the leftward plane and the cells 23-1R on the rightward plane shown in FIG. 9, and a horizon 8 are simultaneously taken under a mounted state as shown in FIGS. 4 and 5, the taken image is assumed to be shown as FIG. 15.

The reference sign 9 indicates an image circle assumed to be taken with an angle at 90 degrees around the optical axis of the lens.

In case that the image is taken by using the wide-angle lens, straight line subjects are imaged as variously carved as respective lines represented in the image circle.

The operation of the image processing section 3 will be described hereinafter.

FIGS. 16 to 25 each shows a display image displayed by the monitor 4. The display image is obtained from the taken image operated by the same operation of the image processing section 3.

In general, the taken image of the backward of the vehicle should be displayed as a mirrored image horizontally flipped the whole. However, in the first and following embodiments of the present invention, the taken image will be described as not horizontally flipped the whole for better understanding of the horizontal relationships between the taken image and the display image.

Figure 16:
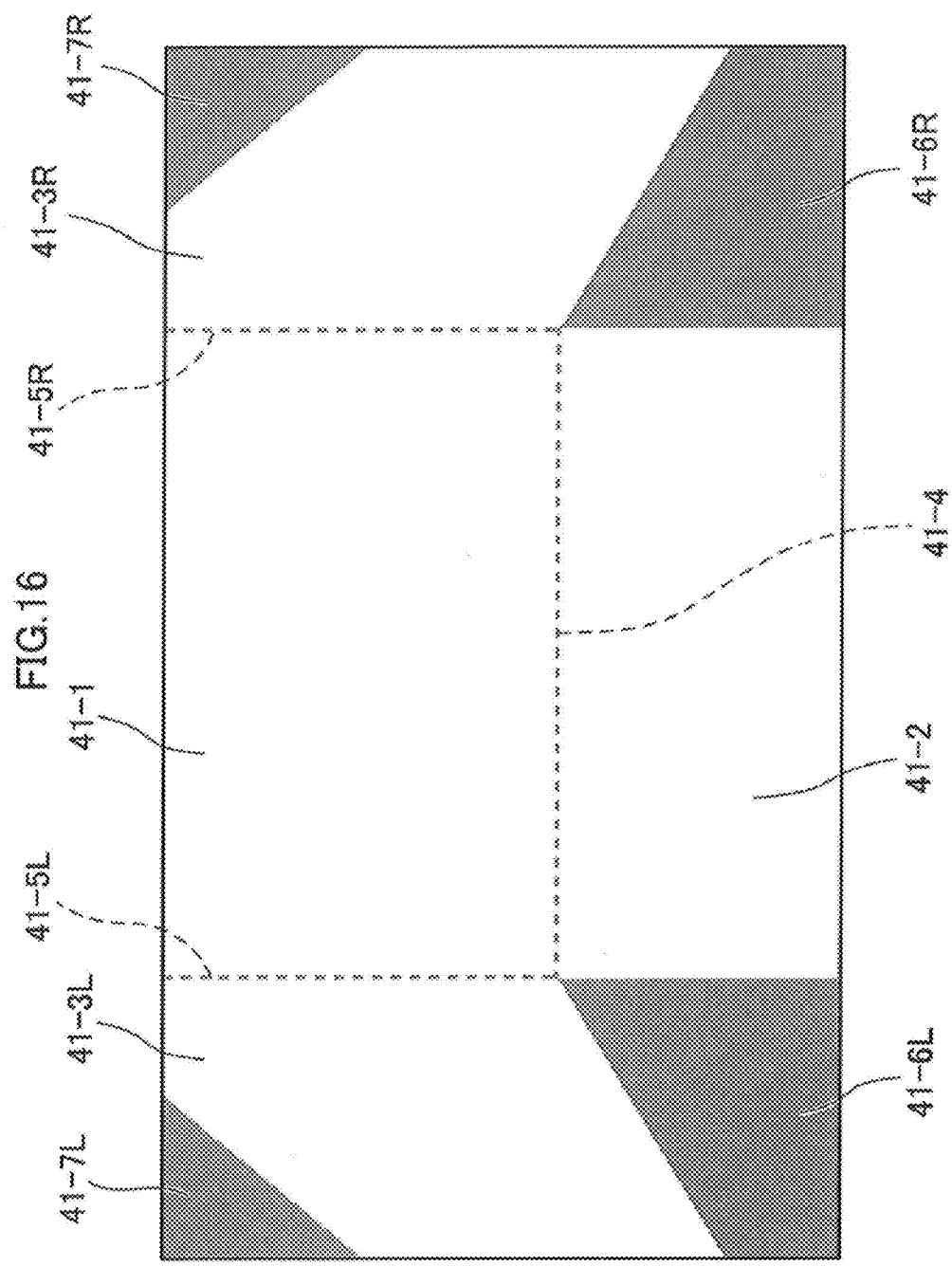
FIG. 16 is a conceptual diagram showing a processed display image according to the first embodiment of the present invention.

FIG. 16 shows an image arrangement of the display image operated by of the image processing section 3 for a display area of the monitor 4.

The reference sign 41-1 indicates a forward correction image display region allocated in the upside of the center of the display area. The reference sign 41-2 indicates a downward correction image display region allocated below the forward correction image display region 41-1. The reference sign 41-3L indicates a leftward correction image display region allocated to the left of the forward correction image display region 41-1. The reference sign 41-3R indicates a rightward correction image display region allocated to the right of the forward correction image display region 41-1. The reference sign 41-4 indicates a dotted line mask picture constantly displayed as a dotted line in arbitrary color at a display position of adjacent sides of the forward and downward correction image display regions 41-1 and 41-2. The reference sign 41-5L indicates a dotted line mask picture constantly displayed as a dotted line in arbitrary color at a display position of adjacent sides of the forward and leftward correction image display regions 41-1 and 41-3L. The reference sign 41-5R indicates a dotted line mask picture constantly displayed as a dotted line in arbitrary color at a display position of adjacent sides of the forward and rightward correction image display regions 41-1 and 41-3R. The reference signs 41-6L, 41-6R, 41-7L and 41-7R indicate plane mask pictures displayed on arbitrary color and allocated the display regions except the forward, downward, leftward and rightward correction image display regions 41-1, 41-2, 41-3L and 41-3R.

Figure 17:
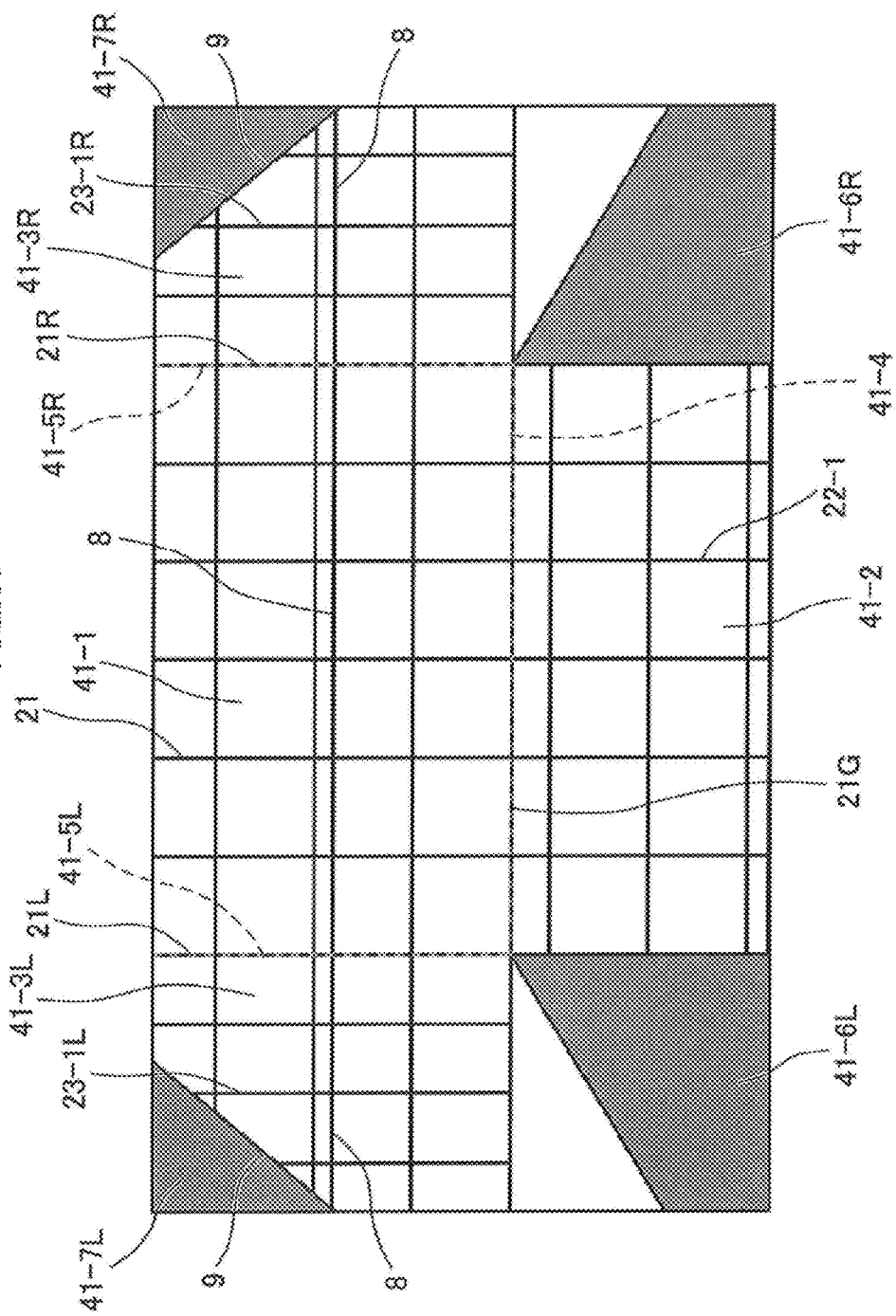
FIG. 17 is a conceptual diagram showing a processed display image according to the first embodiment of the present invention.

FIG. 17 shows the operated image of the taken image shown in FIG. 15 under the allocation shown in FIG. 16.

As shown in FIG. 17, when the subjects are the cells 21 on the forward plane, an image displayed on the forward correction image display region 41-1 is corrected in a manner that each of the cell 21 is displayed as a square formed by horizontal and vertical lines and having an area equal to one another.

The cells may be corrected to be displayed as rectangles.

The forward correction image display region 41-1 has a bottom side coincided with the vehicle left-right direction straight line 21G, a left side coincided with the vertical line 21L, and a right side coincided with the vertical line 21R.

When the subjects are the square cells included among the cells 22-1 on the downward plane, an image displayed on the downward correction image display region 41-2 is corrected in a manner that each of the square cells is displayed as a square formed by the horizontal and vertical lines and having an area equal to one another.

The cells may be corrected to be displayed as rectangles.

The downward correction image display region 41-2 has a top side coincided with the vehicle left-right direction straight line 21G, located adjacent to the bottom side of the forward correction image display region 41-1, and coincided in the position on the x-axis direction with the vehicle left-right direction straight line 21G corresponding to the bottom side of the forward correction image display region 41-1.

The downward correction image display region 41-2 has a left side coincided with the vehicle front-back direction straight line 24-15L positioned at the same distance in the x-axis direction with the vertical line 21L.

The downward correction image display region 41-2 has a right side coincided with the vehicle front-back direction straight line 24-15R positioned at the same distance in the x-axis direction with the vertical line 21L.

While the bottom side of the downward correction image display region 41-2 is coincided with the position at −0.1 m in the direction of the y-axis, the bottom side of the downward correction image display region 41-2 may be coincided with arbitrary position in the direction of the y-axis.

In case that the subjects are the cells 23-1L on the leftward plane, an image displayed on the leftward correction image display region 41-3L is corrected in a manner that each of the cells is displayed as a vertically long rectangle formed by the horizontal and vertical lines and having an area equal to one another.

In case that the subjects are the cells 23-1L infinitely expanding on the leftward plane, an image displayed on the leftward correction image display region 41-3L is corrected in a manner that rectangles are displayed on the whole of the leftward correction image display region 41-3L.

The cells may be corrected to be displayed as squares or horizontally long rectangles.

The leftward correction image display region 41-3L has a right side coincided with the vertical line 21L, located adjacent to the left side of the forward correction image display region 41-1, and coincided in the position on the z-axis direction with the vertical line 21L corresponding to the left side of the forward correction image display region 41-1.

The leftward correction image display region 41-3L has a bottom side coincided with the vehicle front-back direction straight line 24-15L positioned at the same distance in the x-axis direction with the vertical line 21L.

The leftward correction image display region 41-3L has a left-top side inclined down toward left in the left-top area and corresponding to the image circle 9. The left-top area over the left-top side has no taken image, thereby the left-top side being inclined as with a side of a plane mask picture 41-7L. If the left-top area has the taken image depending on the mounted state or the characteristic of the lens, the left-top side is not needed.

While the left side of the leftward correction image display region 41-3L is coincided with the position at −0.1 m in the direction of the y-axis, the left side of the leftward correction image display region 41-3L may be coincided with arbitrary position in the direction of the y-axis.

When the subjects are the cells 23-1R on the rightward plane, an image displayed on the rightward correction image display region 41-3R is corrected in a manner that each of the cells is displayed as a vertically long rectangle formed by the horizontal and vertical lines and having an area equal to one another.

When the subjects are the cells 23-1R infinitely expanding on the rightward plane, an image displayed on the rightward correction image display region 41-3R is corrected in a manner that rectangles are displayed on the whole of the rightward correction image display region 41-3R. The cells may be corrected to be displayed as squares or horizontally long rectangles.

The rightward correction image display region 41-3R has a left side coincided with the vertical line 21R, located adjacent to the right side of the forward correction image display region 41-1, and coincided in the position on the z-axis direction with the vertical line 21R corresponding to the right side of the forward correction image display region 41-1.

The rightward correction image display region 41-3R has a bottom side coincided with the vehicle front-back direction straight line 24-15R positioned at the same distance in the x-axis direction with the vertical line 21R.

The rightward correction image display region 41-3R has a right-top side inclined down toward right in the right-top area and corresponding to the image circle 9. The right-top area over the right-top side has no taken image, thereby the right-top side being inclined as with a side of a plane mask picture 41-7R. If the right-top area has the taken image depending on the mounted state or the characteristic of the lens, the left-top side is not needed.

While the right side of the rightward correction image display region 41-3R is coincided with the position at −0.1 m in the direction of the y-axis, the right side of the rightward correction image display region 41-3R may be coincided with arbitrary position in the direction of the y-axis.

Figure 18:
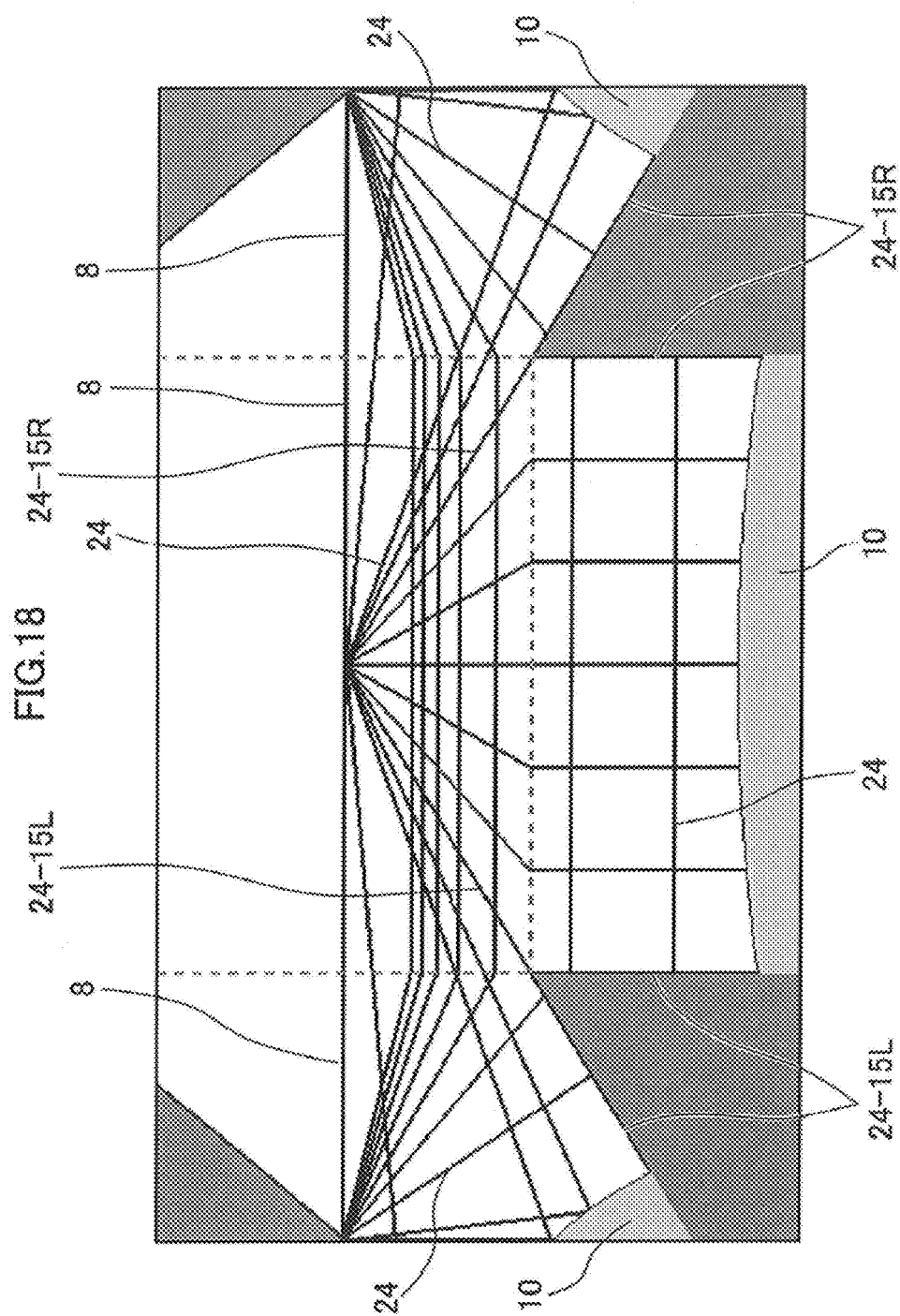
FIG. 18 is a conceptual diagram showing a processed display image according to the first embodiment of the present invention.

By the operation of the image processing section 3 described above, when the straight lines 24 on the ground surface, the horizon 8, and the bumper 10 of the vehicle 1 as shown in FIG. 13 are simultaneously imaged, the display image is shown as FIG. 18.

Under the state that a cuboid 11 formed with a cube having 1.5 m sides on the ground is imaged simultaneously with the straight lines 24, the horizon 8, and the bumper 10 of the vehicle 1, the image is displayed as following. When the cuboid 11 is at 1.5 m in the direction of the y-axis and 10 m in the direction of the x-axis, the display image is shown as FIG. 19. When the cuboid 11 is at 1.5 m in the direction of the y-axis and 2.5 m in the direction of the x-axis, the display image is shown as FIG. 20. When the cuboid 11 is at 1.5 m in the direction of the y-axis and 1.0 m in the direction of the x-axis, the display image is shown as FIG. 21. When the cuboid 11 is at 3.5 m in the direction of the y-axis and 2.5 m in the direction of the x-axis, the display image is shown as FIG. 22. When the cuboid 11 is at 2.5 m in the direction of the y-axis and 2.5 m in the direction of the x-axis, the display image is shown as FIG. 23. When the cuboid 11 is at 0.5 m in the direction of the y-axis and 2.5 m in the direction of the x-axis, the display image is shown as FIG. 24.

Figure 25:
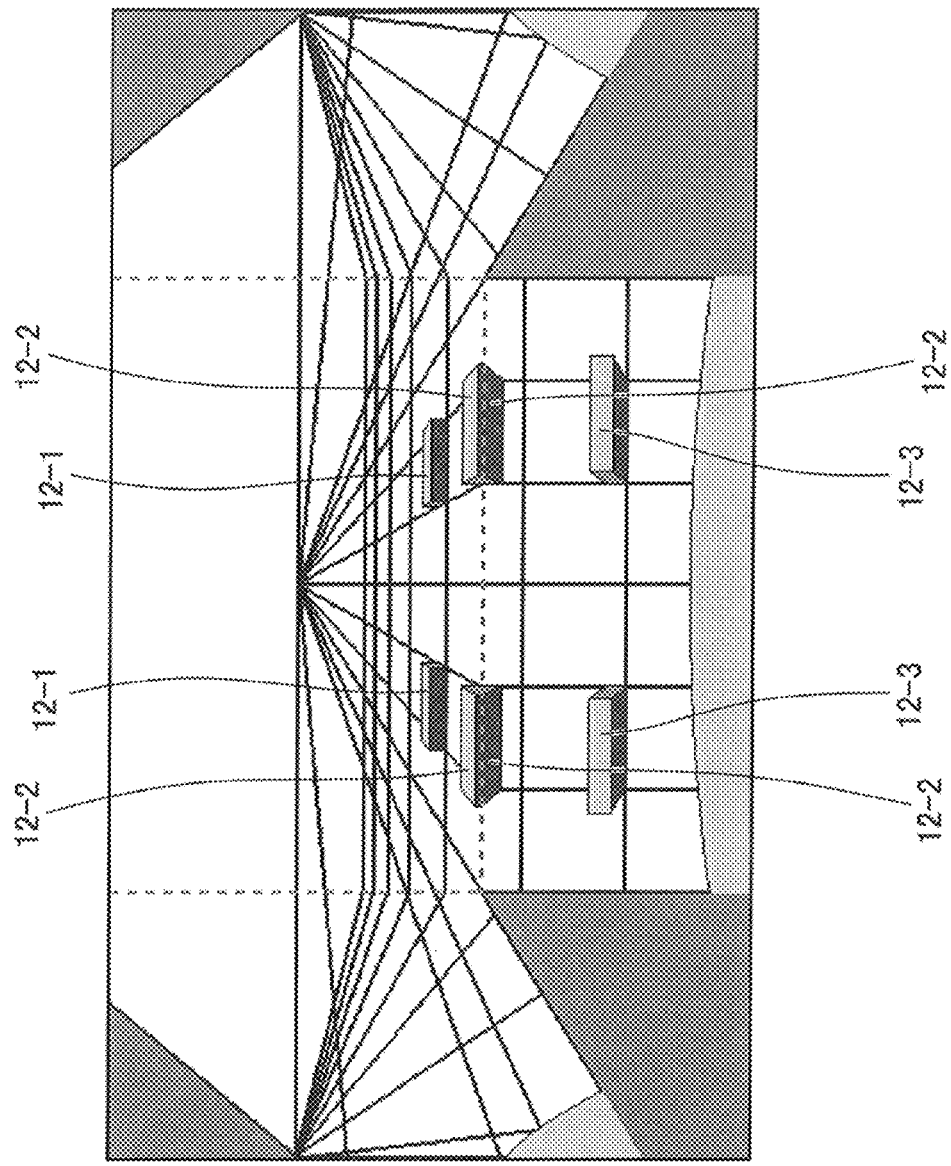
FIG. 25 is a conceptual diagram showing a processed display image according to the first embodiment of the present invention.

Under the state that: pairs of cuboids 12-1, 12-2 and 12-3 are imaged simultaneously with the straight lines 24 on the ground surface, the horizon 8, and the bumper 10 of the vehicle 1; each cuboids 12-1, 12-2 and 12-3 having a width of 0.5 m, a depth of 0.1 m and a height of 0.1 m; one of the pairs of cuboids 12-1, 12-2 and 12-3 being at 0.5 m in the direction of the x-axis; other of the pairs of cuboids 12-1, 12-2 and 12-3 being at −0.5 m in the direction of the x-axis; the pair of cuboids 12-1 being at 1.5 m in the direction of the y-axis; the pair of cuboids 12-2 being at 1.1 m in the direction of the y-axis; and the pair of cuboids 12-3 being at 0.5 m in the direction of the y-axis, the image is displayed as FIG. 25.

As will be seen from the comparison between FIGS. 15 and 17, it is to be understood that the cells 21 on the forward plane, the cells 22-1 on the downward plane, the cells 23-1L on the leftward plane and the cells 23-1R on the rightward plane is displayed as the squares or the rectangles. This leads to the fact that the operated image is converted in form similar to the view of a virtual sight line within a frontward angle of 0 degree, a leftward angle of 45 degrees, a rightward angle of 45 degrees, and a downward angle of 90 degrees with respect to the y-axis, i.e., the vehicle front-back direction.

The forward correction image display region 41-1, the downward correction image display region 41-2, the leftward correction image display region 41-3L and the rightward correction image display region 41-3R are displayed on relationships similar to the real sight.

This is clearly to be understood by the display position and the form of the straight lines 24 on the ground surface, the horizon 8, and the bumper 10, each located cuboid 11, and pairs of cuboids 12-1, 12-2 and 12-3 as shown in FIGS. 18 to 25.

All of the straight lines are displayed as the straight lines. The straight lines perpendicular to the ground surface are displayed as the vertical lines in the image displayed on the forward correction image display region 41-1, the leftward correction image display region 41-3L and the rightward correction image display region 41-3R useful for watching a left-right direction. The straight lines and the cuboids in the vehicle left-right direction parallel to the ground surface are displayed as the horizontal lines in the image displayed on the forward correction image display region 41-1 and the downward correction image display region 41-2 useful for watching an up-down direction.

As shown in FIG. 18, in the leftward correction image display region 41-3L and the rightward correction image display region 41-3R, the infinite straight line being parallel to the x-axis and being at −0.1 m on the y-axis in the straight lines 24 on the ground surface is displayed, and the intersection point of the infinite straight line with the horizon 8 is displayed, thereby resulting in the fact that the wide angle area within a horizontal angle of 180 degrees from the position of the vehicle-mounted camera 2 is displayed.

As shown in FIG. 17, the straight line being parallel to the x-axis, being at −0.1 m on the y-axis, and forming the cells 22-1 on the downward plane is displayed, thereby resulting in the fact that the position under the vehicle-mounted camera 2 is displayed.

As shown in FIG. 18, the vehicle front-back direction straight lines 24-15L and 24-15R are displayed on the downward correction image display region 41-2, the leftward correction image display region 41-3L and the rightward correction image display region 41-3R are displayed, thereby resulting in the fact that the areas in the vicinity of the vehicle front-back direction straight lines 24-15L and 24-15R are displayed without a missing part.

Figure 19:
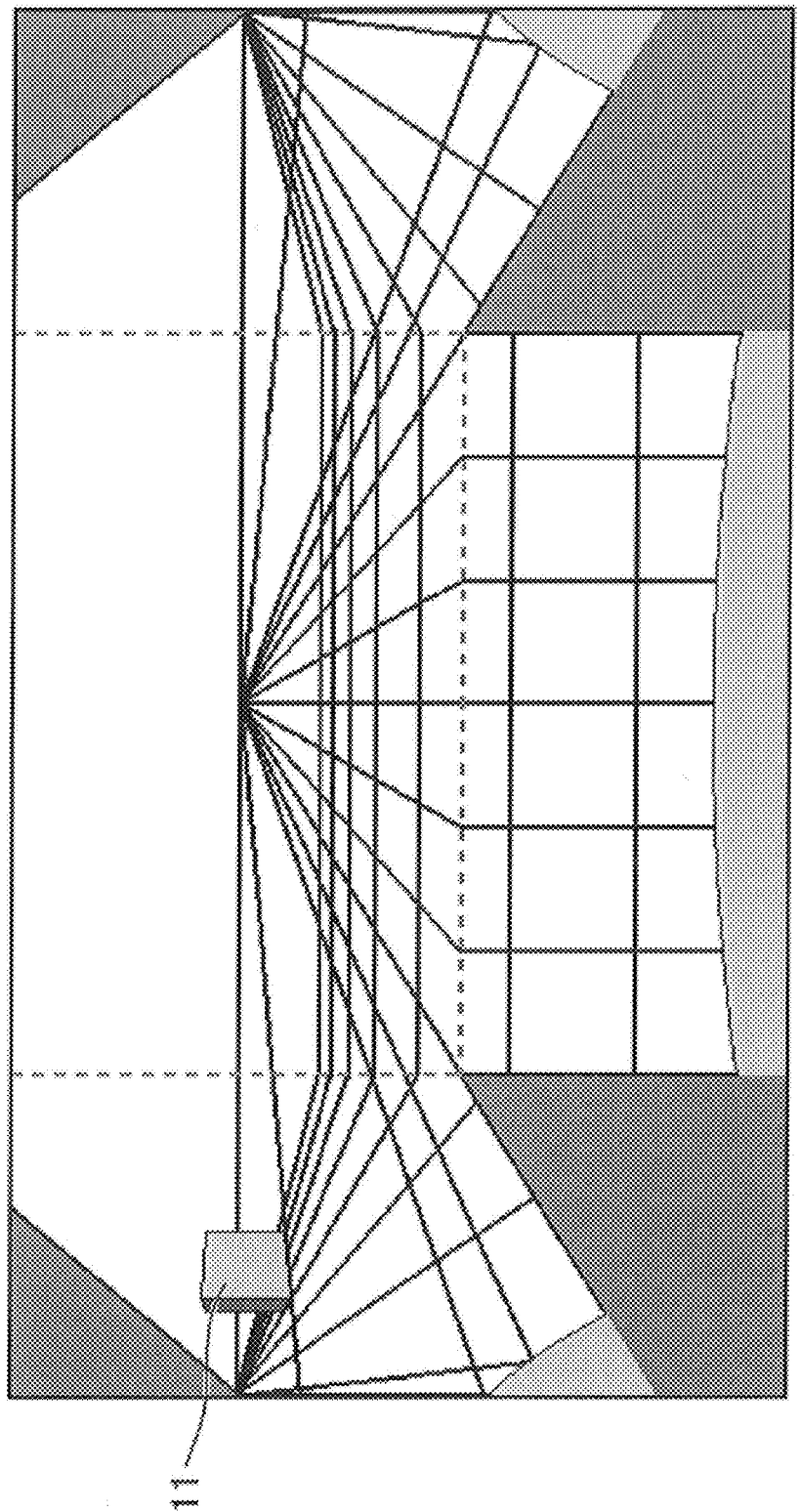
FIG. 19 is a conceptual diagram showing a processed display image according to the first embodiment of the present invention.
Figure 20:
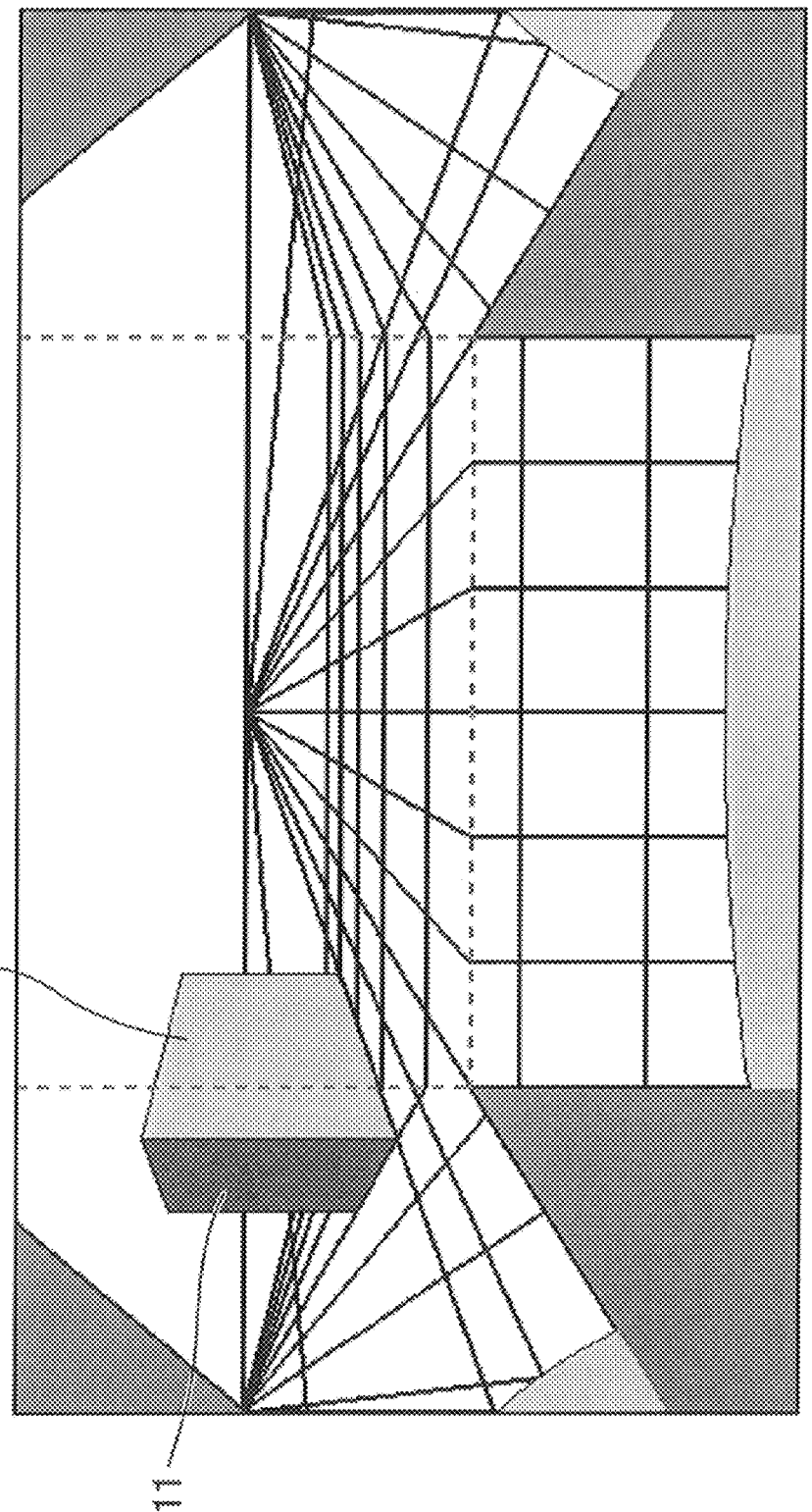
FIG. 20 is a conceptual diagram showing a processed display image according to the first embodiment of the present invention.
Figure 21:
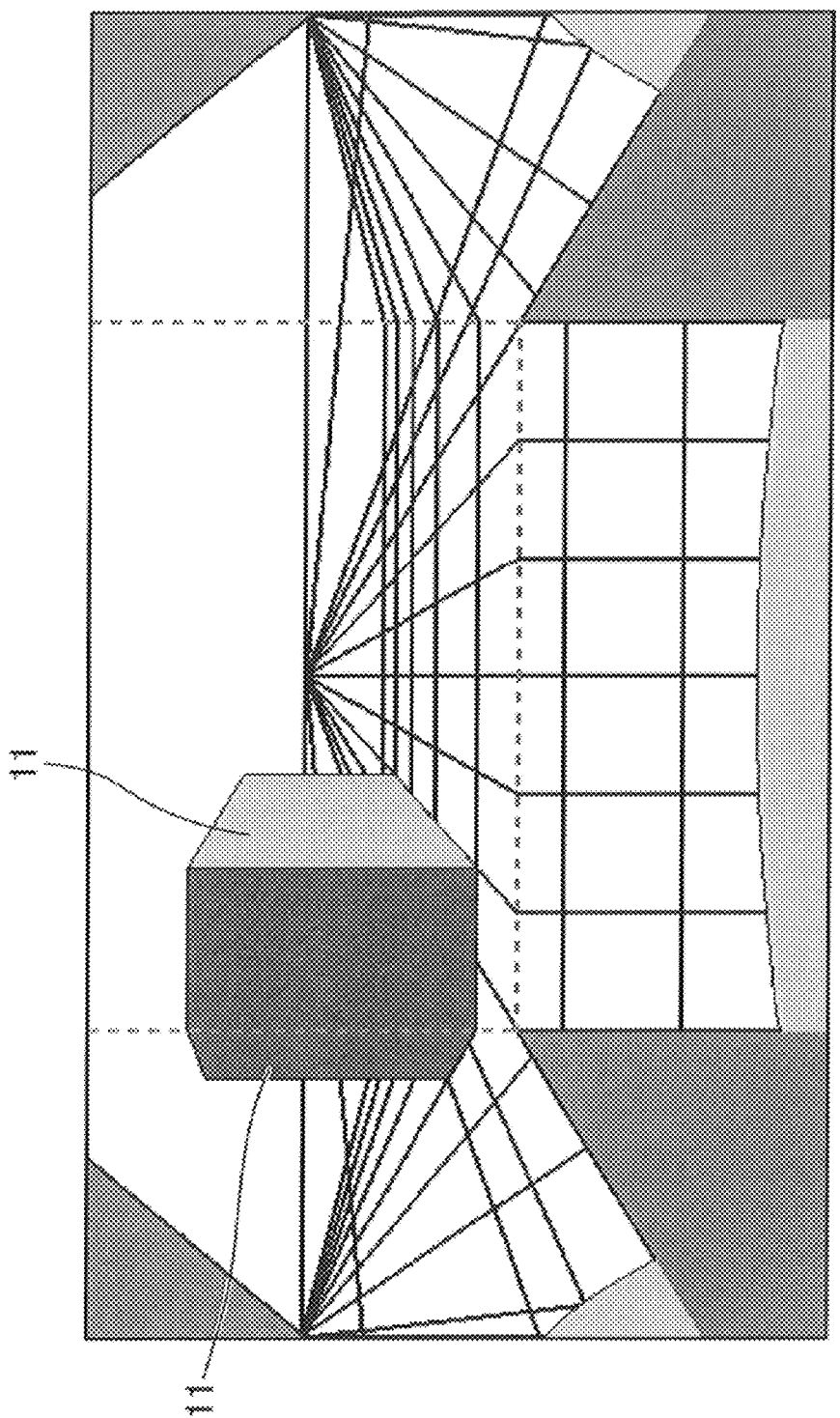
FIG. 21 is a conceptual diagram showing a processed display image according to the first embodiment of the present invention.

FIGS. 19 to 20 each shows an example of the display image when the cuboid 11 moves in the back of the vehicle 1 from left to right as similar to the moving object T shown in FIG. 61, thereby resulting in the fact that the display position of the cuboid 11 moves from the leftward correction image display region 41-3L to the forward correction image display region 41-1. In the example, although the sides of the cuboid 11 are polygonal at the boundary between the leftward correction image display region 41-3L and the forward correction image display region 41-1, the display position of the cuboid 11 moves without misalignment of the sides, and therefore the eye line continuously moves from left to right.

The relationship between the rightward correction image display region 41-3R and the forward correction image display region 41-1 is similar to the relationship between the leftward correction image display region 41-3L and the forward correction image display region 41-1.

Figure 22:
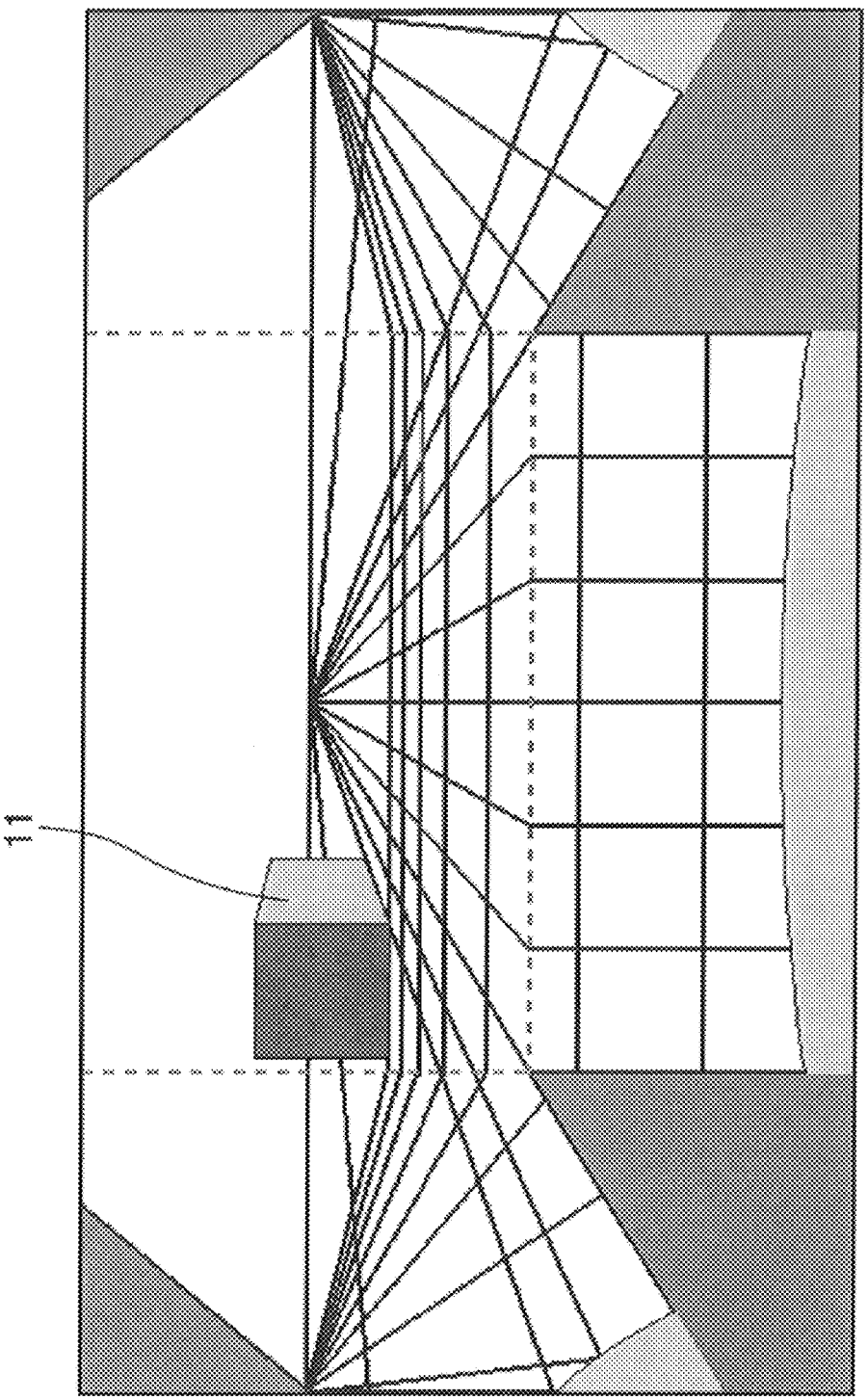
FIG. 22 is a conceptual diagram showing a processed display image according to the first embodiment of the present invention.
Figure 23:
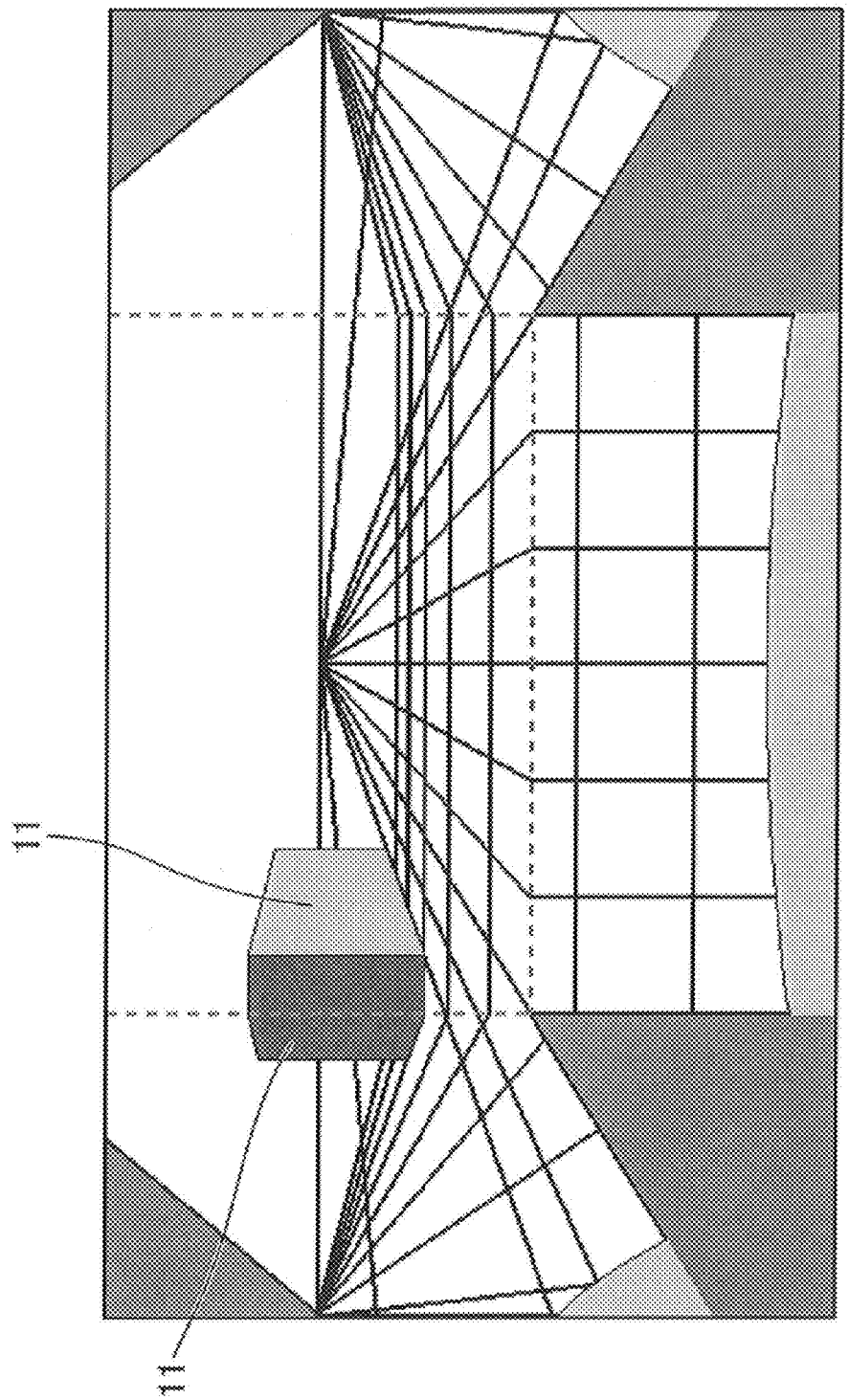
FIG. 23 is a conceptual diagram showing a processed display image according to the first embodiment of the present invention.
Figure 24:
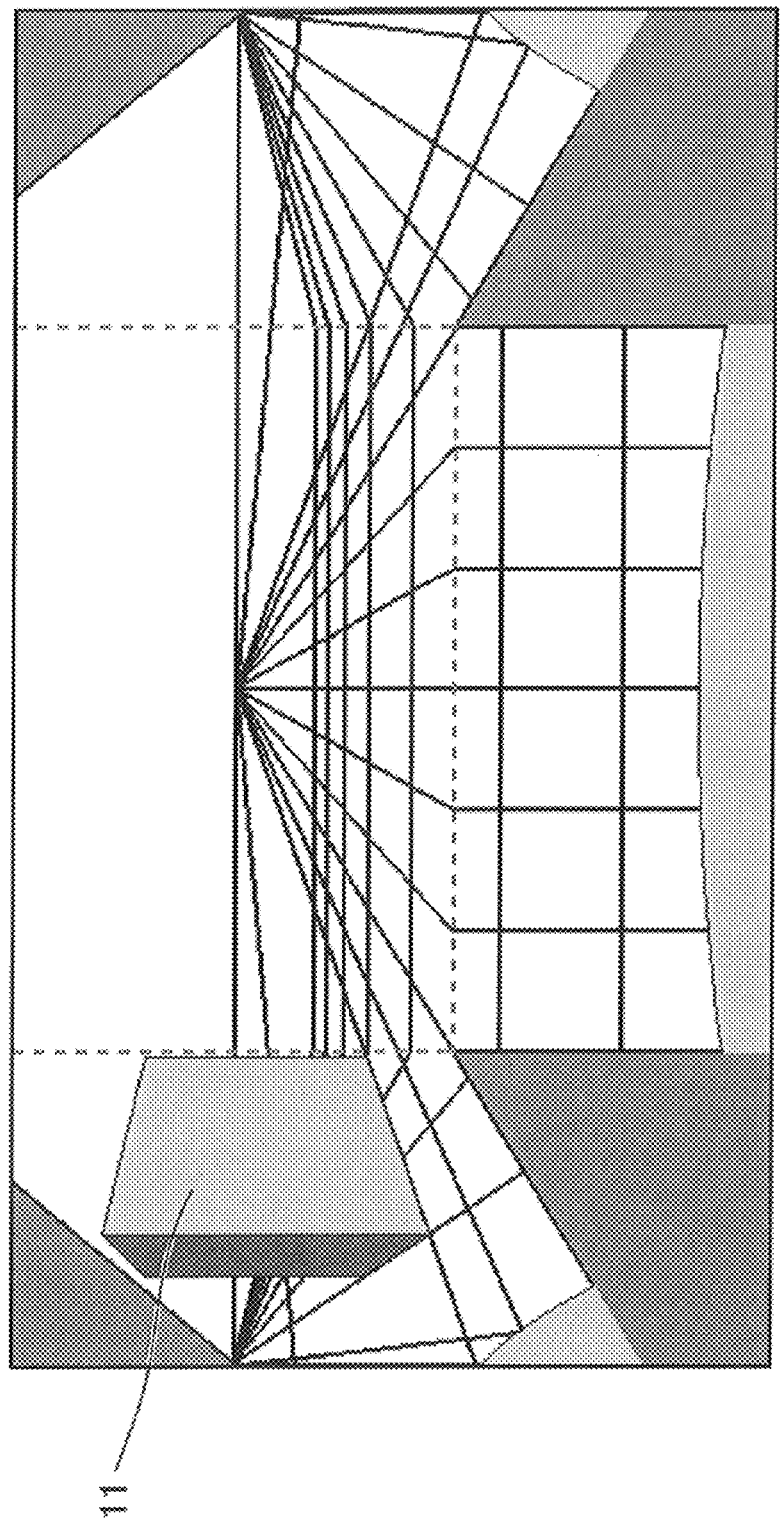
FIG. 24 is a conceptual diagram showing a processed display image according to the first embodiment of the present invention.

FIGS. 22 to 24 each shows an example of the display image when the cuboid 11 being back and lateral to the vehicle 1 approaches the vehicle 1 in the vehicle front-back direction, or where the vehicle 1 approaches the cuboid 11 being back and lateral to the vehicle 1 in the vehicle front-back direction. In the example, the display position of the cuboid 11 moves without misalignment as similar to the example shown in FIGS. 19 to 21, and therefore the eye line continuously moves from right to left. Additionally, the image of the cuboid 11 grows in height in response to the shortened distance between the cuboid 11 and the vehicle 1, thereby maintaining visibility of the distance.

In this case, the direction of the movement of the cuboid 11 is easily recognized on the basis of the inclination of the bottom side of the leftward correction image display region 41-3L.

FIG. 25 shows an example of the display image when the vehicle 1 backwardly approaches barrier curbs for the purpose of parking. The display image represents a case that the distance between the cuboids 12-1 to 12-3 and the vehicle 1 is shortened. In this case, although the lines are polygonal, the display position of the cuboids 12-1 to 12-3 move without misalignment of the lines, and therefore the eye line continuously moves from up to down as each shown in FIGS. 19 to 21.

Additionally, in this case, the directions of the movement of the cuboids 12-1 to 12-3 are easily recognized on the basis of the inclination of the left and right sides of the downward correction image display region 41-2.

The forward virtual sight line 21-1, the downward virtual sight line 21-1-1, the leftward virtual sight line 21-1-1L and the rightward virtual sight line 21-1-1R may respectively pass through any positions.

While there have been described in the figures about the fact that the crossed lines between the planes are coincided with the respective boundaries between the correction image display regions for easily illustrating about the fact that the same image is displayed on each boundary between the correction image display regions, the forward plane 21-2, the downward plane 21-1-2, the leftward plane 23-1-2L and the rightward plane 23-1-2R may respectively pass through any positions under conditions of maintaining the angle with respect to the virtual sight lines and conditions of the cells 21, the cells 21-1, the cells 23-1L and the cells 23-1R respectively formed squares on the forward plane 21-2, the downward plane 22-1-2, the leftward plane 23-1-2L and the rightward plane 23-1-2R.

On the other hands, the directions of the leftward virtual sight line 21-1-1L and the rightward virtual sight line 21-1-1R are not respectively leftward and rightward inclined at an angle of 0 or 90 degrees with respect to the y-axis.

Figure 11:
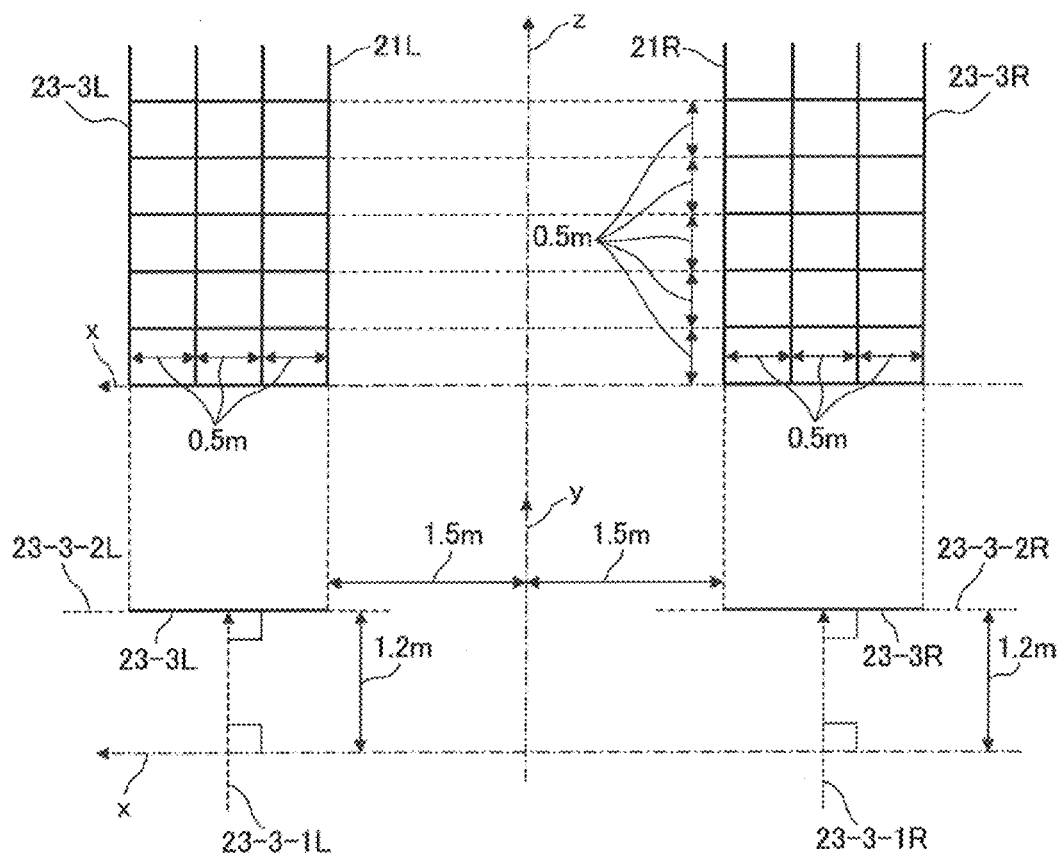
FIG. 11 is a conceptual diagram showing a subject imaged by the vehicle-mounted camera 2.

If the directions of the leftward virtual sight line 21-1-1L and the rightward virtual sight line 21-1-1R are respectively inclined leftward and rightward at an angle of 0 degree with respect to the y-axis, the cells corresponding to the cells 23-1L on the leftward plane 23-1-2L and the cells 23-1R on the rightward plane 23-1-2R as shown in FIG. 9 are respectively appeared as the cells 23-3L on the leftward plane and the cells 23-1R on the rightward plane as shown in FIG. 11.

Figure 26:
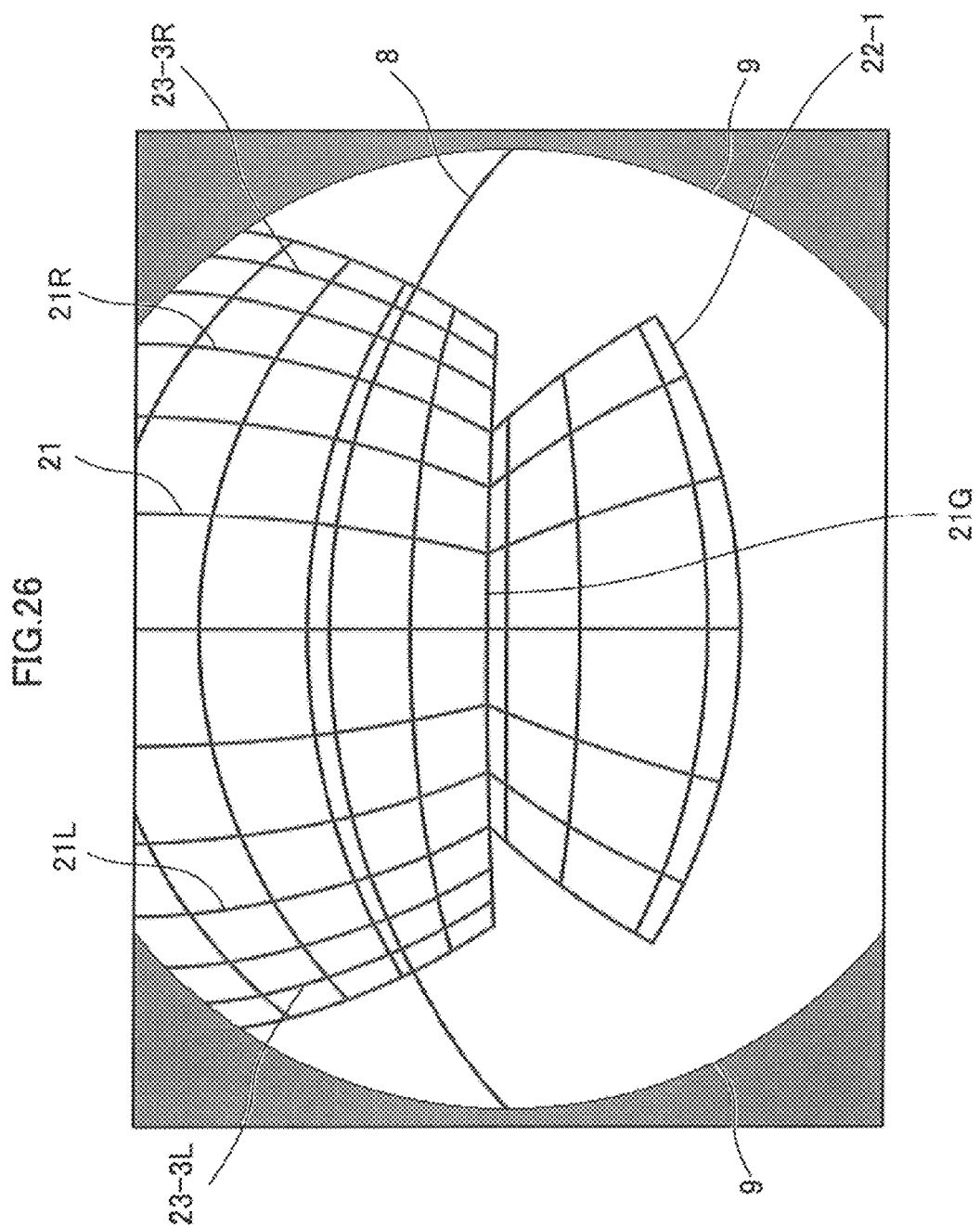
FIG. 26 is a conceptual diagram showing a taken image.
Figure 27:
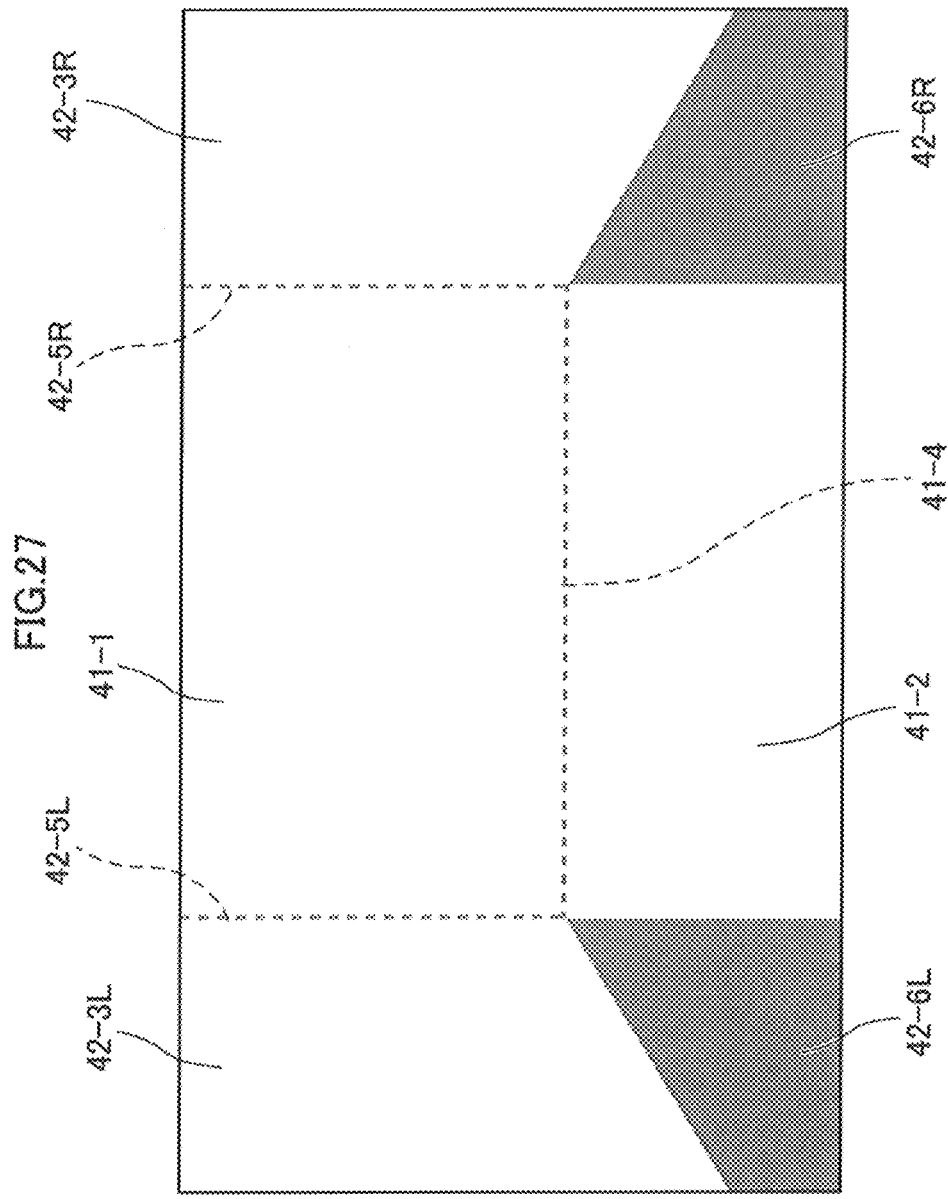
FIG. 27 is a conceptual diagram showing a display image except processing targets according to the first embodiment of the present invention.

Accordingly, if the cells 2l on the forward plane 21-2 shown as FIG. 6, the cells 21-1 on the downward plane 21-1-2 shown as FIG. 7, the leftward and rightward planes 23-3L, 23-3R shown as FIG. 11 and the horizon 8 are simultaneously imaged, the image is taken as FIG. 26 and the image arrangement is made as shown in FIG. 27 in contrasted with FIG. 16.

Figure 28:
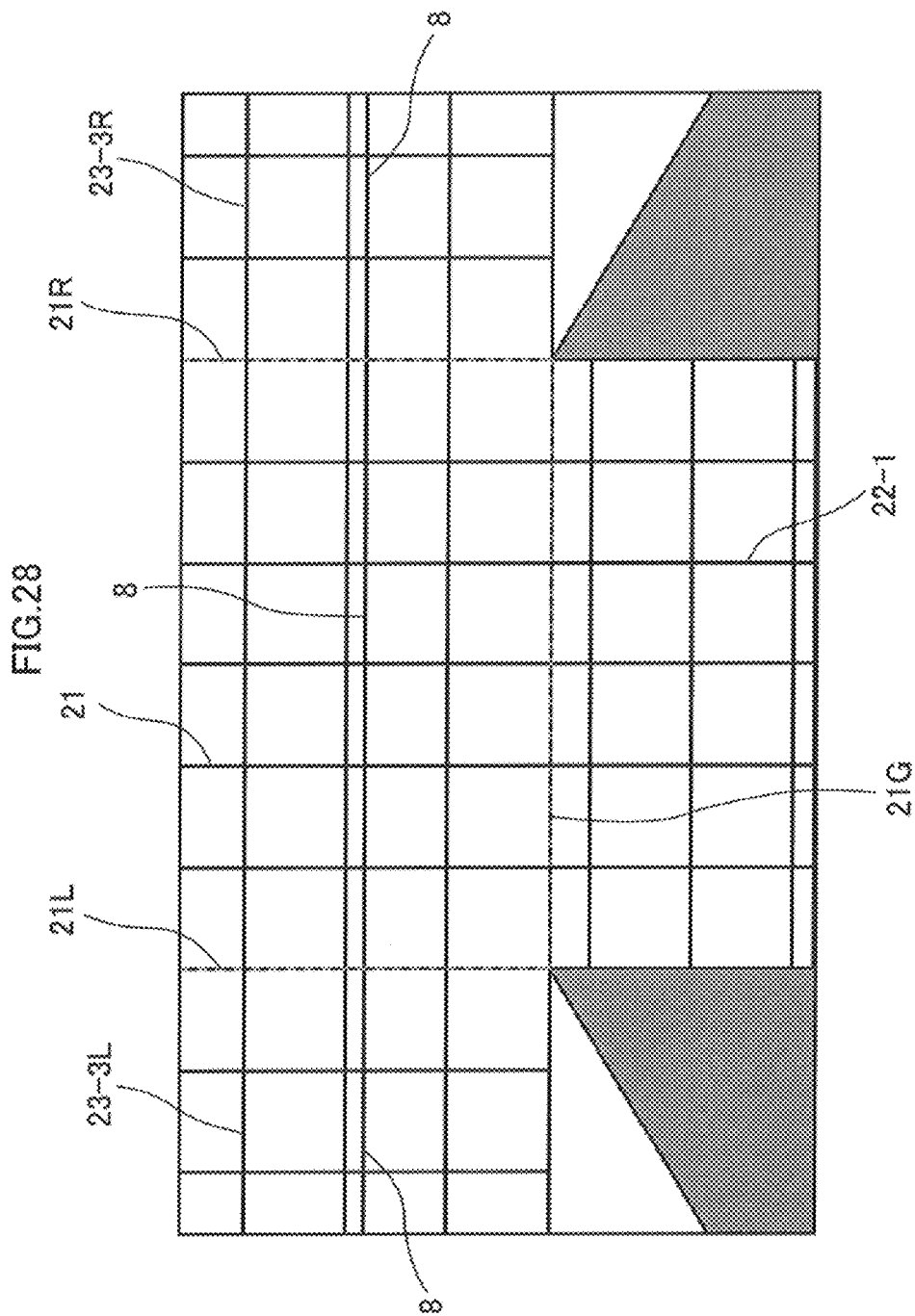
FIG. 28 is a conceptual diagram showing a display image except processing targets according to the first embodiment of the present invention.

In FIG. 27, the reference signs 41-1, 41-2 and 41-4 are respectively equal to the reference signs 41-1, 41-2 and 41-4 in FIG. 16. The reference sign 42-3L indicates a leftward correction image display region displayed therein the corrected image corresponding to the cells 23-3L on the leftward plane. The reference sign 42-3R indicates a rightward correction image display region displayed therein the corrected image corresponding to the cells 23-3R on the rightward plane. The reference sign 42-5L indicates a dotted line mask picture equivalent to the dotted line mask picture 41-5L. The reference sign 42-5R indicates a dotted line mask picture equivalent to the dotted line mask picture 41-5R. The reference sign 42-6L and 42-6R respectively indicates plane mask pictures equivalent to the plane line mask pictures 41-6L and 41-6R. The taken picture shown in FIG. 26 is displayed as shown in FIG. 28.

The leftward correction image display region 42-3L displays therein the image to the left-top, and the rightward correction image display region 42-3R displays therein the image to the right-top. Therefore, the leftward correction image display region 42-3L has no left-top area such as the area displaying the plane mask picture 41-7L, and the rightward correction image display region 42-3R has no right-top area such as the area displaying the plane mask picture 41-7R.

Figure 29:
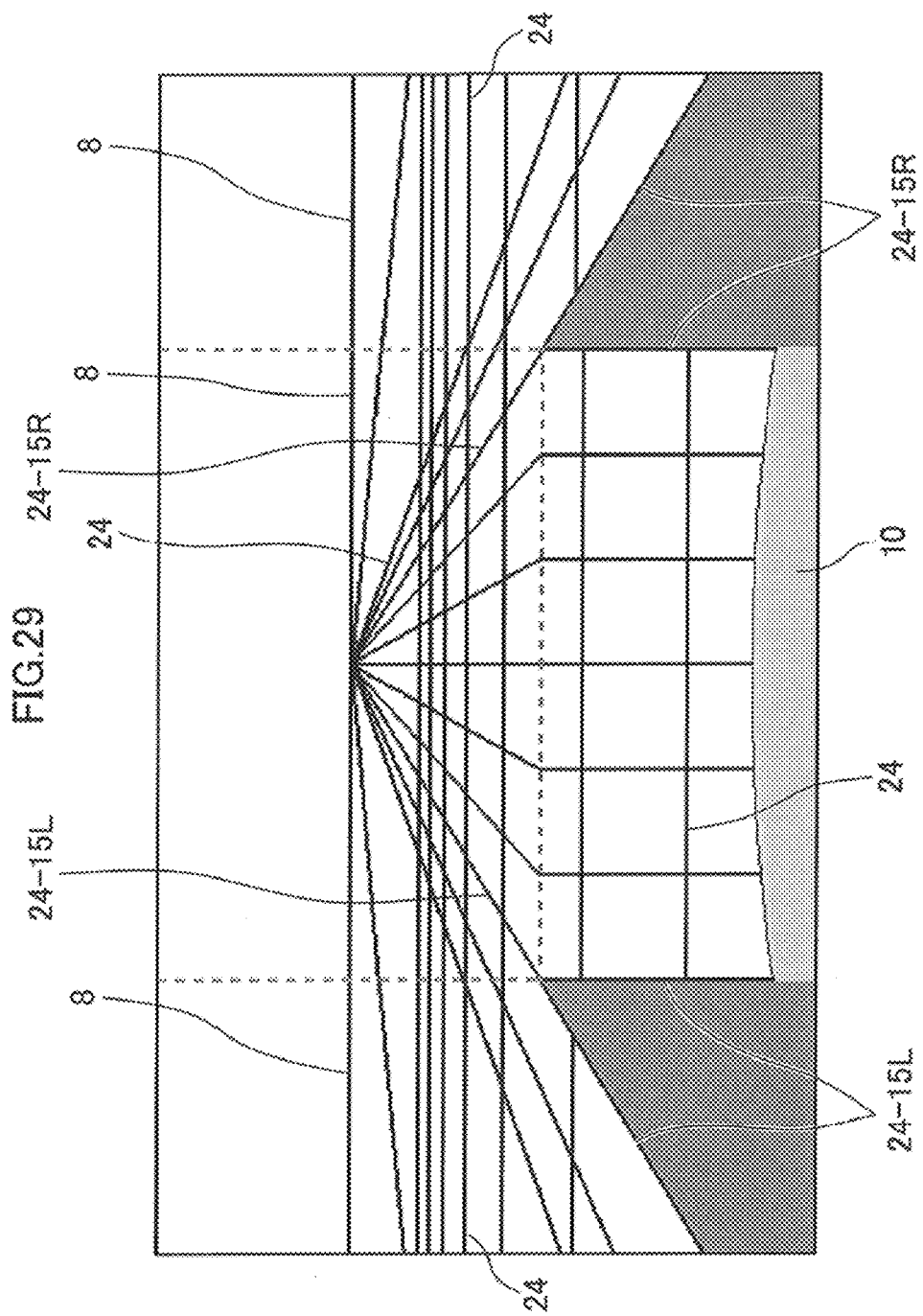
FIG. 29 is a conceptual diagram showing a display image except processing targets according to the first embodiment of the present invention.

FIG. 29 shows the display image when the straight lines 24 on the ground surface shown in FIG. 13, the horizon 8 and the bumper 10 of the vehicle 1 are simultaneously imaged.

Specifically, displaying the image taken at angle of 180 degrees in the left-right direction is impossible, because it is corresponding to displaying the infinite vehicle left-right direction straight line.

This leads to the fact that the leftward and rightward display regions are narrow. As will be seen from FIG. 29, it is to be understood that the leftward and rightward display regions shown in FIG. 29 are clearly narrower than the leftward and rightward display regions shown in FIG. 18. In addition, the image corresponding to the direction of a horizontal eye line is corrected to the image in the direction of a front eye line, thereby resulting in the fact that the image is unnaturally formed as expanding horizontally.

Figure 12:
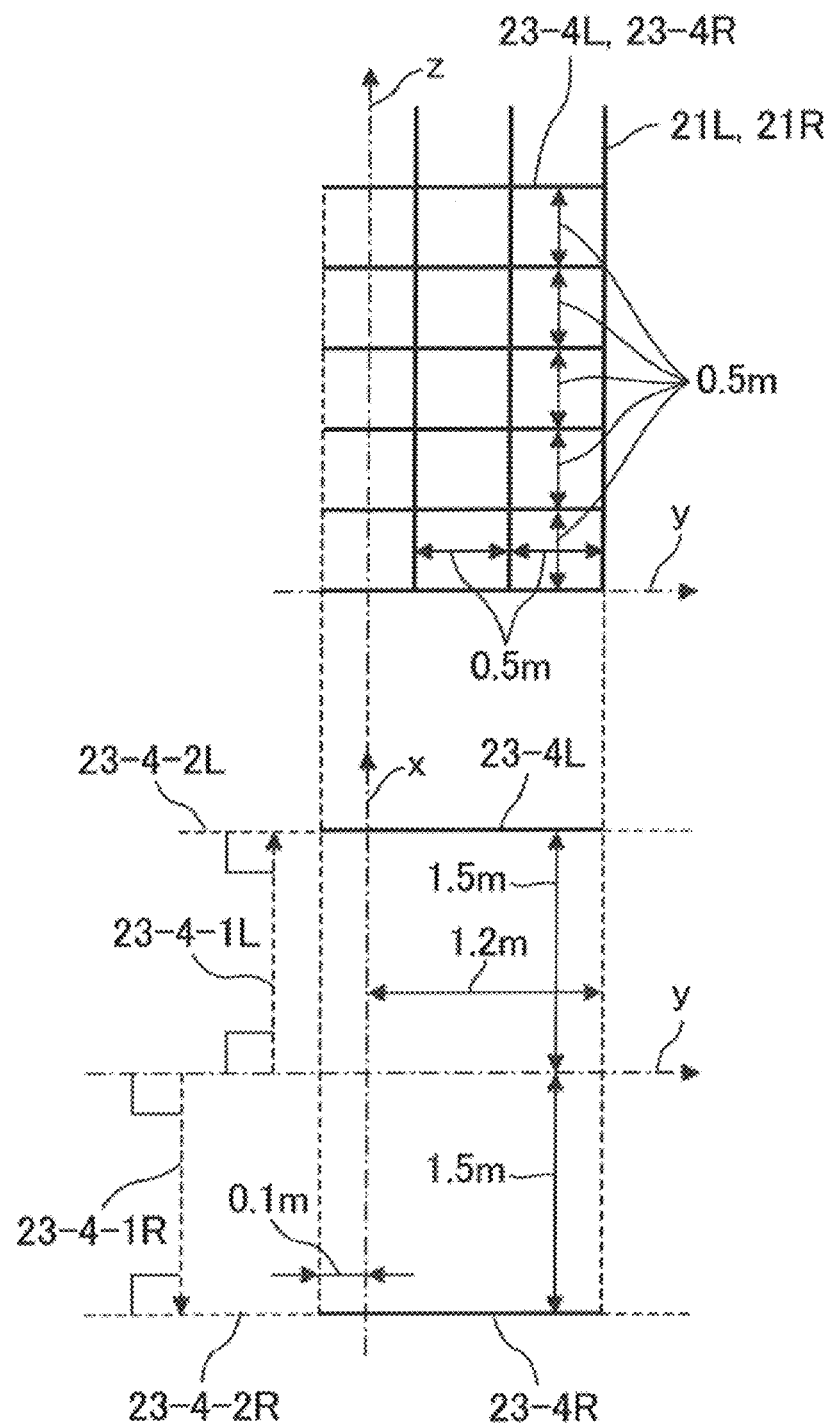
FIG. 12 is a conceptual diagram showing a subject imaged by the vehicle-mounted camera 2.

If the directions of the leftward virtual sight line 21-1-1L and the rightward virtual sight line 21-1-1R are respectively inclined leftward and rightward at an angle of 90 degrees with respect to the y-axis, the cells corresponding to the cells 23-1L on the leftward plane 23-1-2L and the cells 23-1R on the rightward plane 23-1-2R as shown in FIG. 9 are respectively appeared as the cells 23-4L on the leftward plane and the cells 23-4R on the rightward plane as shown in FIG. 12.

Figure 30:
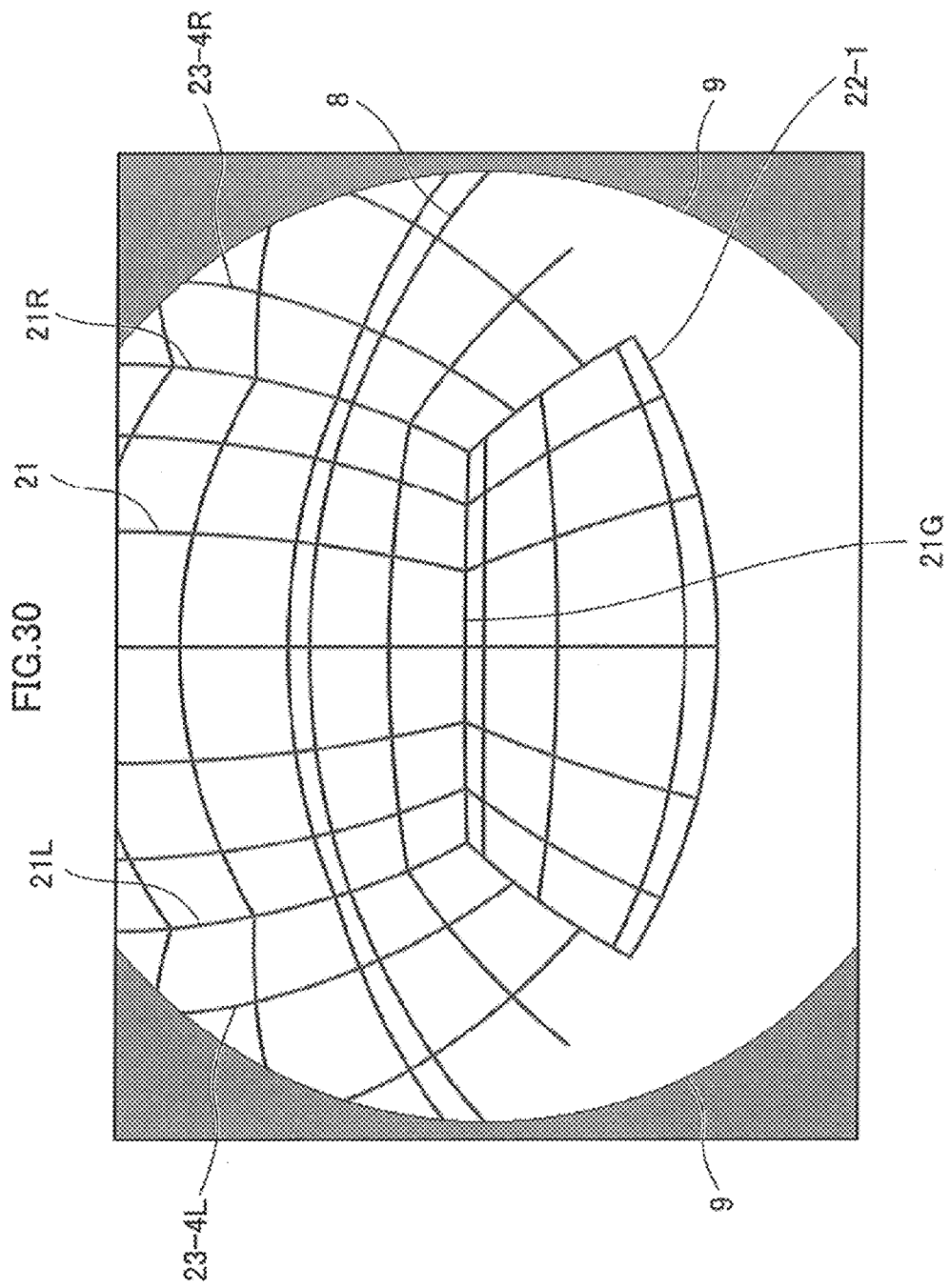
FIG. 30 is a conceptual diagram showing a taken image.
Figure 31:
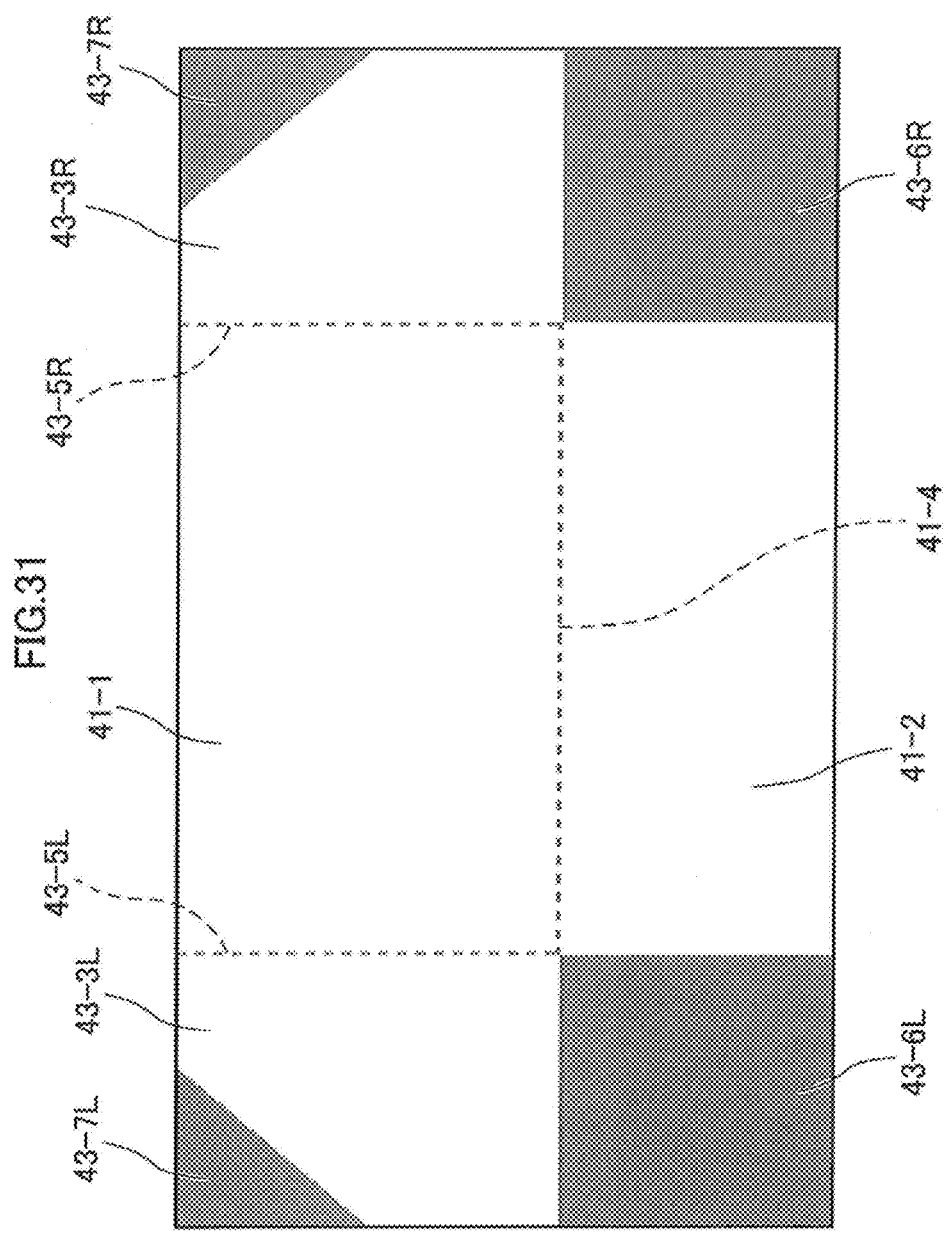
FIG. 31 is a conceptual diagram showing a display image except processing targets according to the first embodiment of the present invention.

Accordingly, if the cells 21 on the forward plane 21-2 shown as FIG. 6, the cells 21-1 on the downward plane 21-1-2 shown as FIG. 7, the leftward and rightward planes 23-3L, 23-3R shown as FIG. 12 and the horizon 8 are simultaneously imaged, the image is taken as FIG. 30 and the image arrangement is made as shown in FIG. 31 in contrasted with FIG. 16.

Figure 32:
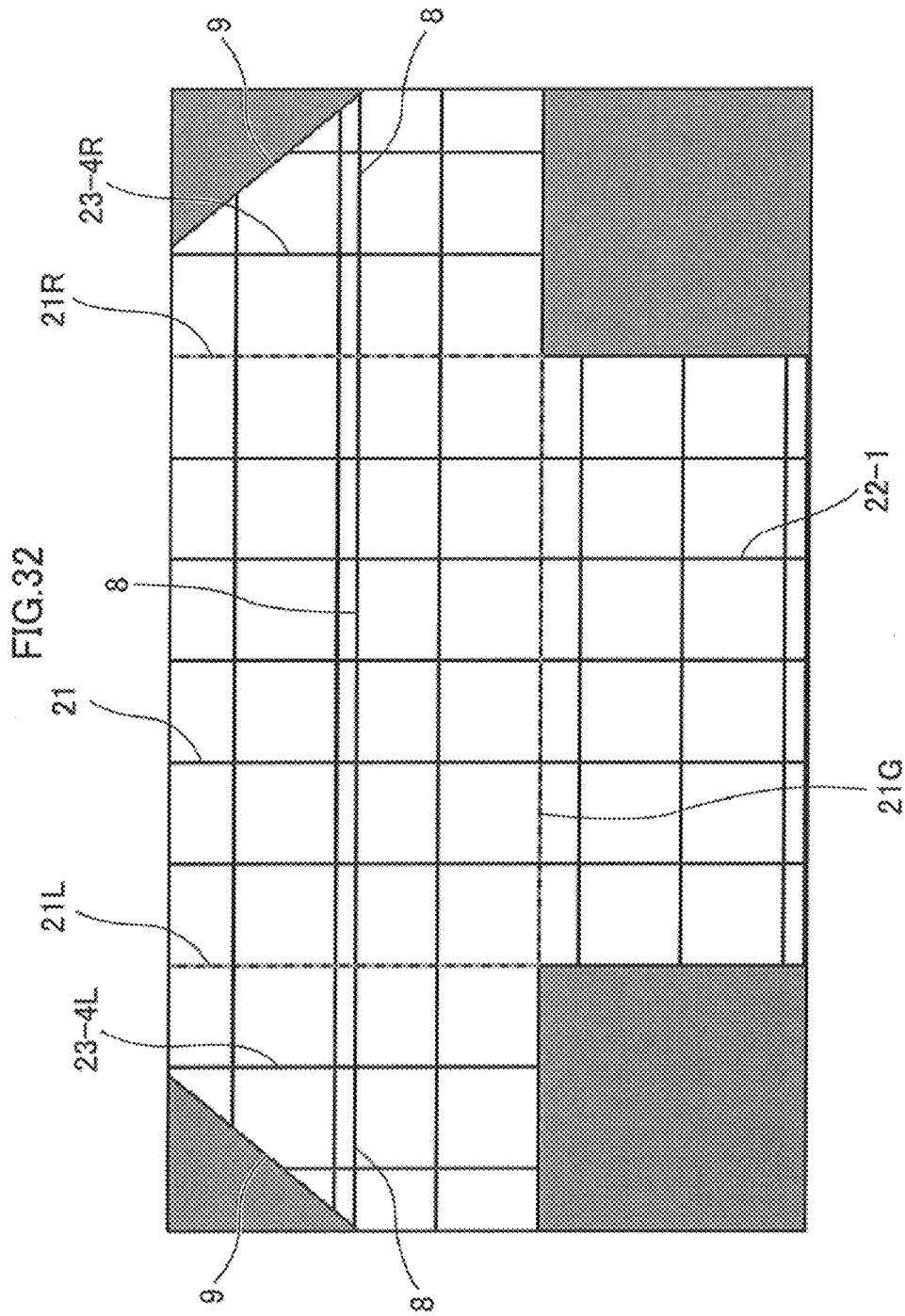
FIG. 32 is a conceptual diagram showing a display image except processing targets according to the first embodiment of the present invention.

In FIG. 31, the reference signs 41-1, 41-2 and 41-4 are respectively equal to the reference signs 41-1, 41-2 and 41-4 in FIG. 16. The reference sign 43-3L indicates a leftward correction image display region displayed therein the corrected image corresponding to the cells 23-4L on the leftward plane. The reference sign 43-3R indicates a rightward correction image display region displayed therein the corrected image corresponding to the cells 23-4R on the rightward plane. The reference sign 43-5L indicates a dotted line mask picture equivalent to the dotted line mask picture 41-5L. The reference sign 43-5R indicates a dotted line mask picture equivalent to the dotted line mask picture 41-5R. The reference sign 43-6L, 43-6R, 43-7L and 43-7R respectively indicates plane mask pictures equivalent to the plane mask pictures 41-6L, 41-6R, 41-7L and 41-7R. The taken picture shown in FIG. 30 is displayed as shown in FIG. 32.

Figure 33:
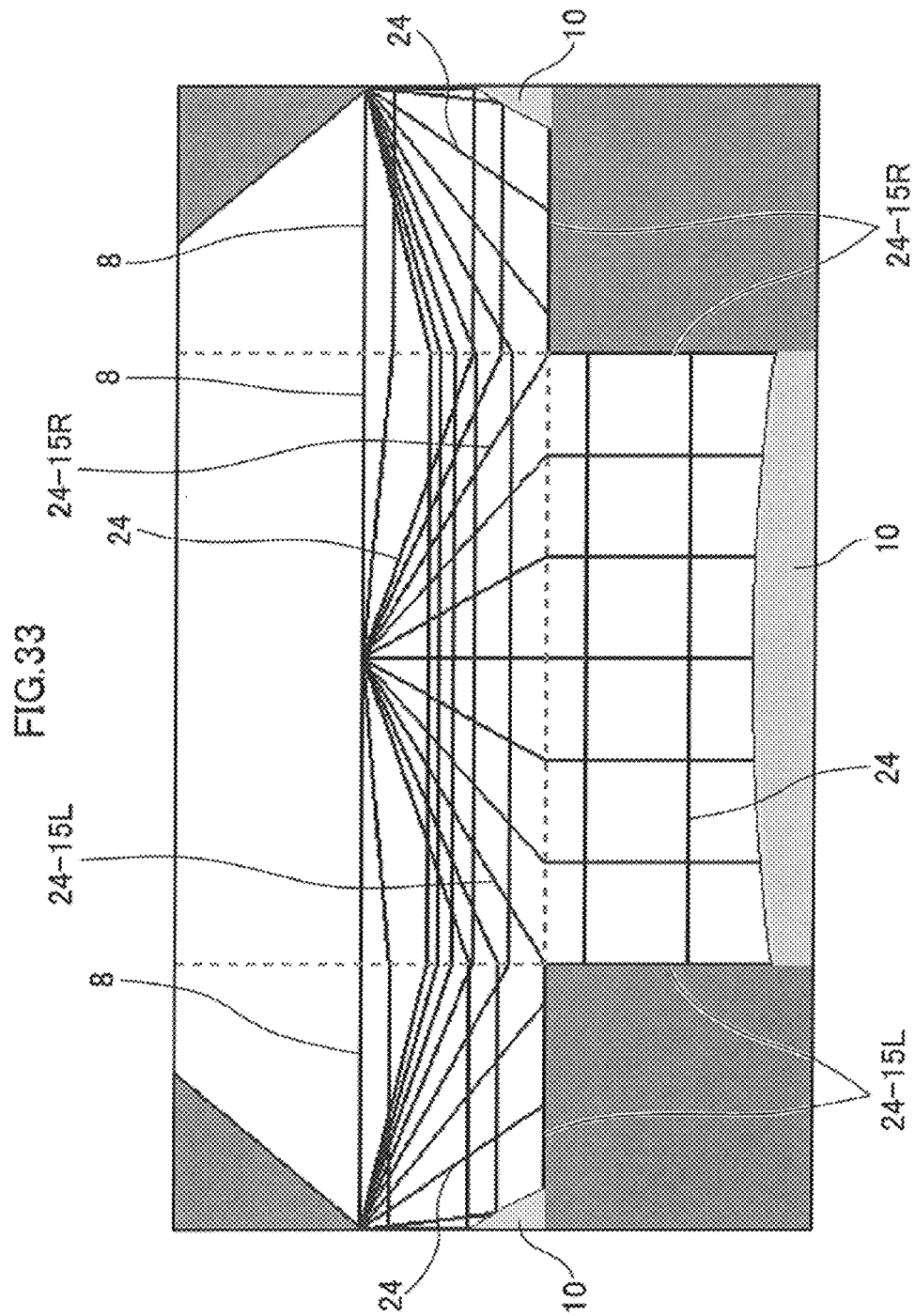
FIG. 33 is a conceptual diagram showing a display image except processing targets according to the first embodiment of the present invention.

FIG. 33 shows the display image when the straight lines 24 on the ground surface shown in FIG. 13, the horizon 8 and the bumper 10 of the vehicle 1 are simultaneously imaged.

As will be seen from FIG. 33, it is to be understood that the vehicle left-right direction straight lines displayed on the leftward correction image display region 41-1 and the vehicle front-back direction straight lines displayed on the respective leftward and rightward correction image display region 43-3L and 43-3R are displayed horizontally, thereby resulting in the fact that front-back relationships and left-right relationships are indistinguishable from each other.

As the same reason of the directions of the leftward virtual sight line 21-1-1L and the rightward virtual sight line 23-1-1R, the direction of the downward virtual sight line 22-1-1 is not downward inclined at an angle of 0 degree with respect to the y-axis.

As will be seen from the foregoing description, it is to be understood that: the front, left, right and down wide area is displayed without a missing part; the whole image is displayed similar in form and location to the real sight; and the horizon is displayed horizontally across three display regions. This leads to the fact that the whole image is improved visibility as subjects from an adjacent place to a distant place are overlooked from a place.

The subject moving along the front-back direction or the distantly-positioned left-right direction is displayed without discontinuity and misalignment. This results in the fact that the movement of the eye line useful for the drive assist toward the front-back direction or the left-right direction is facilitated.

The straight line subjects are respectively displayed as the straight lines in the display regions, thereby resulting in improving visibility of directionality. The straight lines perpendicular to the ground surface is displayed as the vertical lines in the image useful for watching a left-right direction, thereby resulting in improving visibility of up and down relationships useful for the drive assist between the ground surface and an obstacles. The straight lines directed along an crosswise direction of the vehicle is displayed as the horizontal lines in the image useful for watching an up-down direction, thereby resulting in reducing the deformation of the image of the edge portion of the vehicle such as, for example, the bumper and improving visibility of relationships of directionality of the vehicle with respect to the crosswise direction. The display regions are matched in sides and forms, thereby resulting in improving visibility of the vehicle front-back direction useful for the drive assist.

Although the straight lines formed the boundaries of the display regions adjacent to one another are polygonal, the boundaries are recognized by the mask pictures. This results in the fact that the driver recognize that the sight line is needed to change in accordance with the display regions.

(Second Embodiment)

Figure 37:
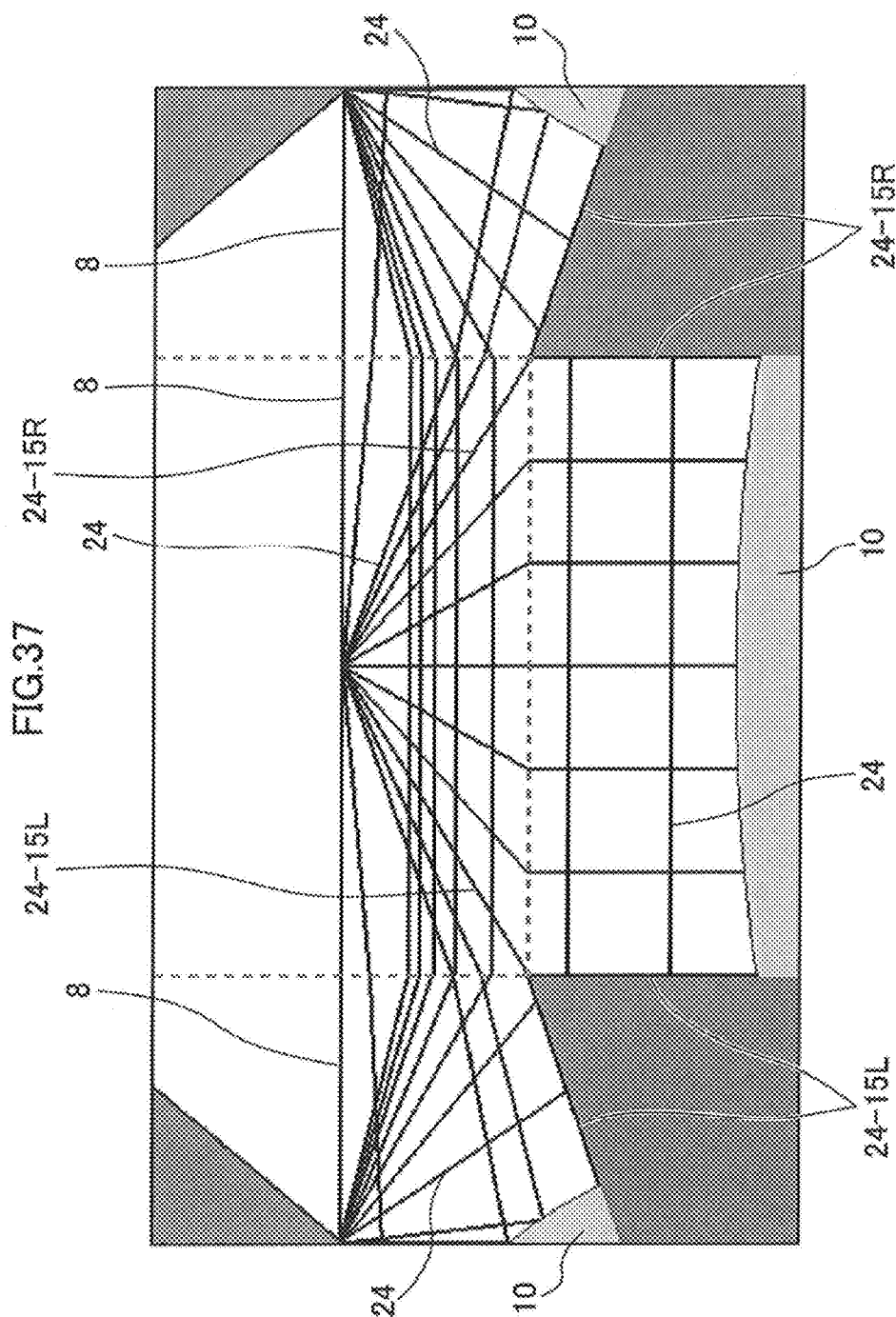
FIG. 37 is a conceptual diagram showing a processed display image according to the second embodiment of the present invention.

FIG. 37 shows the display image of the second embodiment of the present invention, which adjusted the leftward and rightward correction image display regions of the first embodiment of the present invention.

Figure 10:
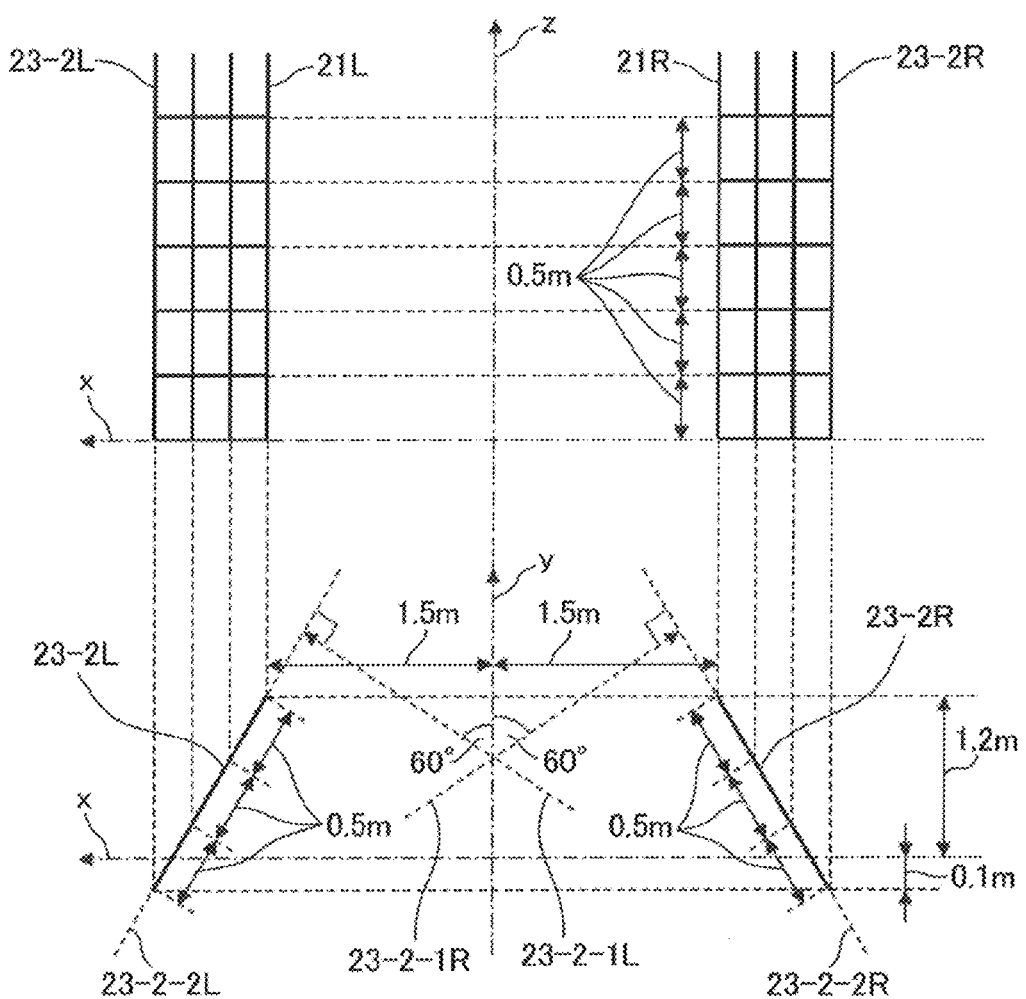
FIG. 10 is a conceptual diagram showing a subject imaged by the vehicle-mounted camera 2.

In FIG. 10, the reference sign 23-2-1L indicates a leftward virtual sight line adjusted from the leftward virtual sight line 23-1-1L inclined with respect to the y-axis at a leftward angle of 45 degrees as inclined with respect to the y-axis at a leftward angle of 60 degrees. The reference sign 23-2-2L indicates a leftward plane being in perpendicular relationship with the leftward virtual sight line 23-2-1L, and including a point at 1.5 m in the direction of the x-axis and 1.2 m in the direction of the y-axis as similar to the leftward plane 23-1-2L. The reference sign 23-2-1R indicates a rightward virtual sight line adjusted from the rightward virtual sight line 23-1-1R inclined with respect to the y-axis at a rightward angle of 45 degrees as inclined with respect to the y-axis at a rightward angle of 60 degrees. The reference sign 23-2-2R indicates a rightward plane being in perpendicular relationship with the rightward virtual sight line 23-2-1R, and including a point at −1.5 m in the direction of the x-axis and 1.2 m in the direction of the y-axis as similar to the rightward plane 23-1-2R. The reference sign 23-2L indicates cells on the illustrated part of the leftward plane 23-2-2L, the cells 23-2L equivalent to the cells 23-1L on the leftward plane. The reference sign 23-2R indicates cells on the illustrated part of the rightward plane 23-2-2R, the cells 23-2R equivalent to the cells 23-1R on the rightward plane.

Figure 34:
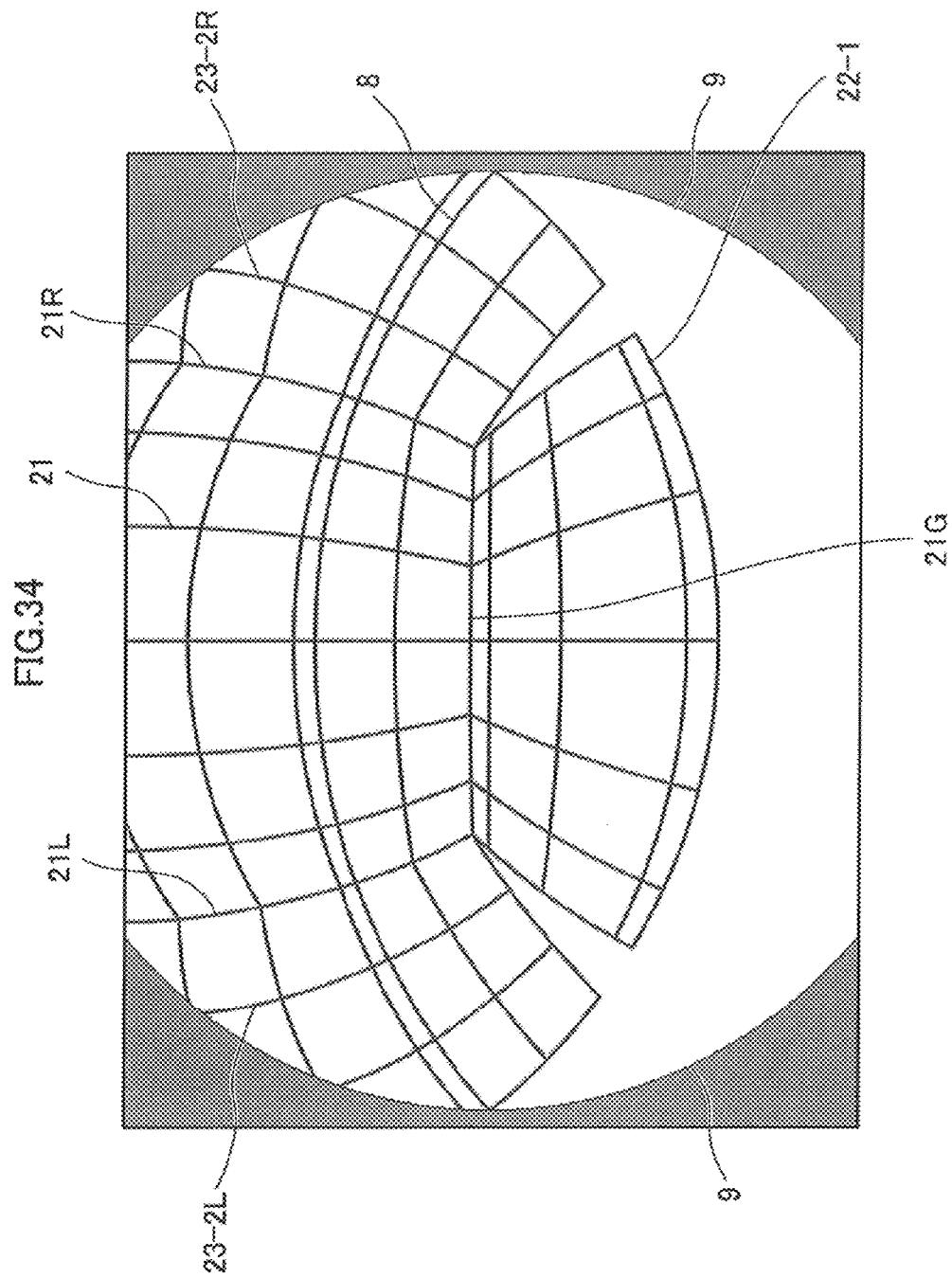
FIG. 34 is a conceptual diagram showing a taken image.
Figure 35:
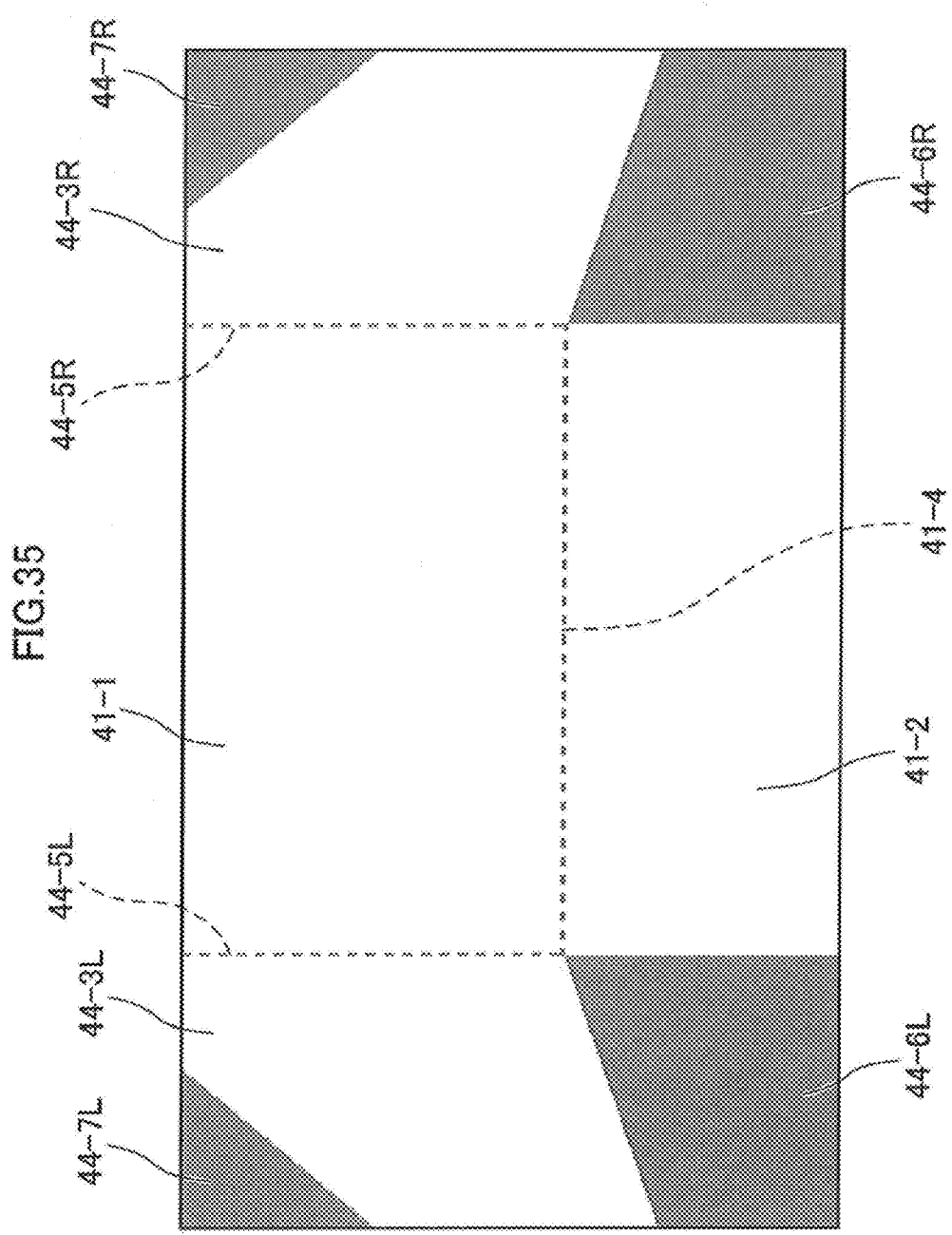
FIG. 35 is a conceptual diagram showing a processed display image according to the second embodiment of the present invention.

If the cells 21 on the forward plane 21-2 shown as FIG. 6, the cells 21-1 on the downward plane 21-1-2 shown as FIG. 7, the leftward and rightward planes 23-3L, 23-3R shown as FIG. 10 and the horizon 8 are simultaneously imaged, the image is taken as FIG. 34 and the image arrangement is made as shown in FIG. 35 in contrasted with FIG. 16.

Figure 36:
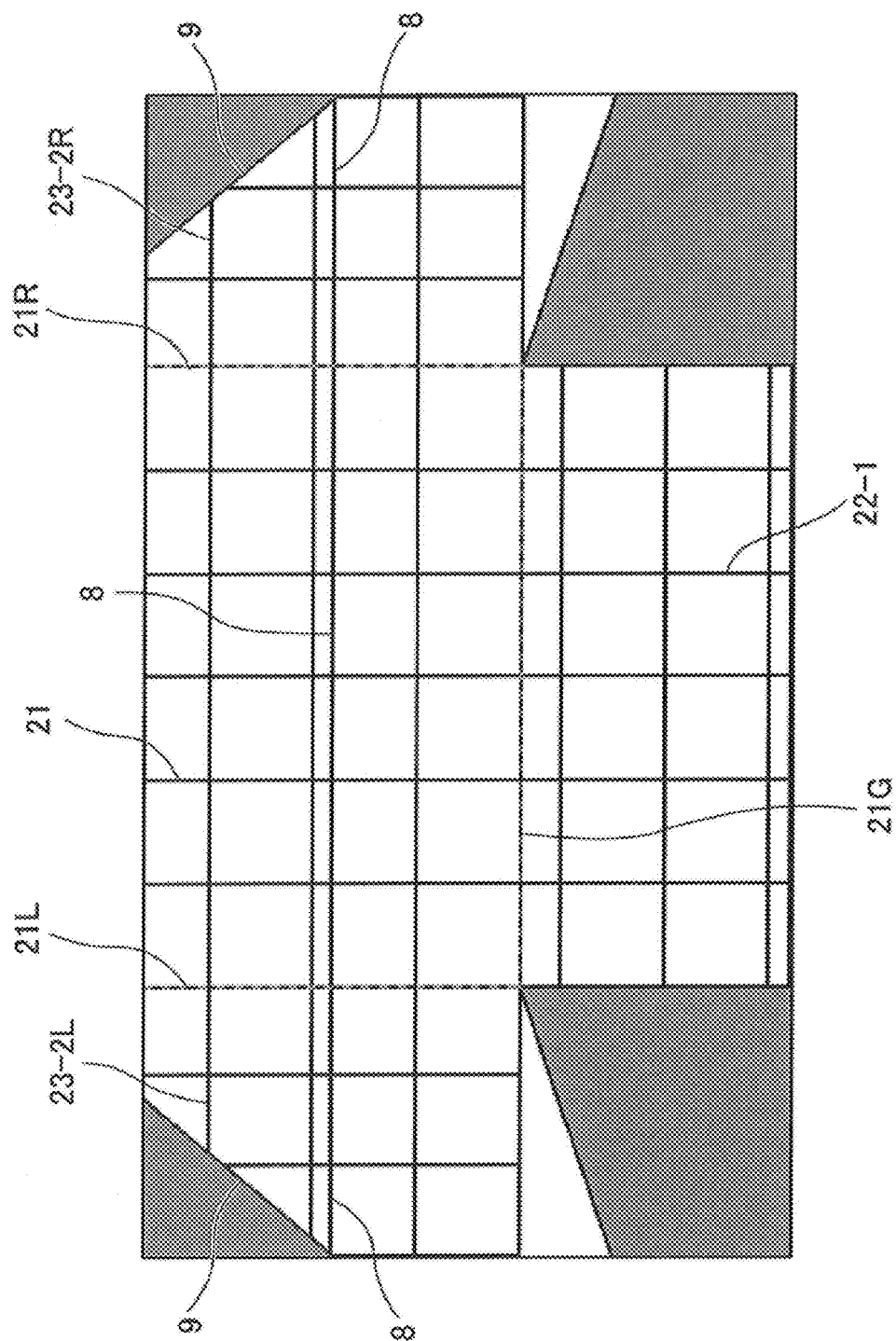
FIG. 36 is a conceptual diagram showing a processed display image according to the second embodiment of the present invention.

In FIG. 35, the reference signs 41-1, 41-2 and 41-4 are respectively equal to the reference signs 41-1, 41-2 and 41-4 in FIG. 16. The reference sign 44-3L indicates a leftward correction image display region displayed therein the corrected image corresponding to the cells 23-2L on the leftward plane. The reference sign 44-3R indicates a rightward correction image display region displayed therein the corrected image corresponding to the cells 23-3R on the rightward plane. The reference sign 44-5L indicates a dotted line mask picture equivalent to the dotted line mask picture 41-5L. The reference sign 44-5R indicates a dotted line mask picture equivalent to the dotted line mask picture 41-5R. The reference sign 44-6L, 44-6R, 44-7L and 44-7R respectively indicates plane mask pictures equivalent to the plane mask pictures 41-6L, 41-6R, 41-7L and 41-7R. The taken picture shown in FIG. 34 is displayed as shown in FIG. 36.

FIG. 37 shows the display image when the straight lines 24 on the ground surface shown in FIG. 13, the horizon 8 and the bumper 10 of the vehicle 1 are simultaneously imaged.

The leftward correction image display region 44-3L has a bottom side coincided with the vehicle front-back direction straight line 24-15L, and inclined more gradual than the bottom side of the leftward correction image display region 41-3L.

The rightward correction image display region 44-3R has a bottom side coincided with the vehicle front-back direction straight line 24-15R, and inclined more gradual than the bottom side of the rightward correction image display region 41-3R.

As will be seen from the foregoing description, it is to be understood that, by the adjustment of the angles of the leftward virtual sight line and the rightward virtual sight line, the vehicle front-back direction straight line is inclined gradually with respect to the forward correction image display region without changing the inclination of the horizon 8 in the display image.

Figure 39:
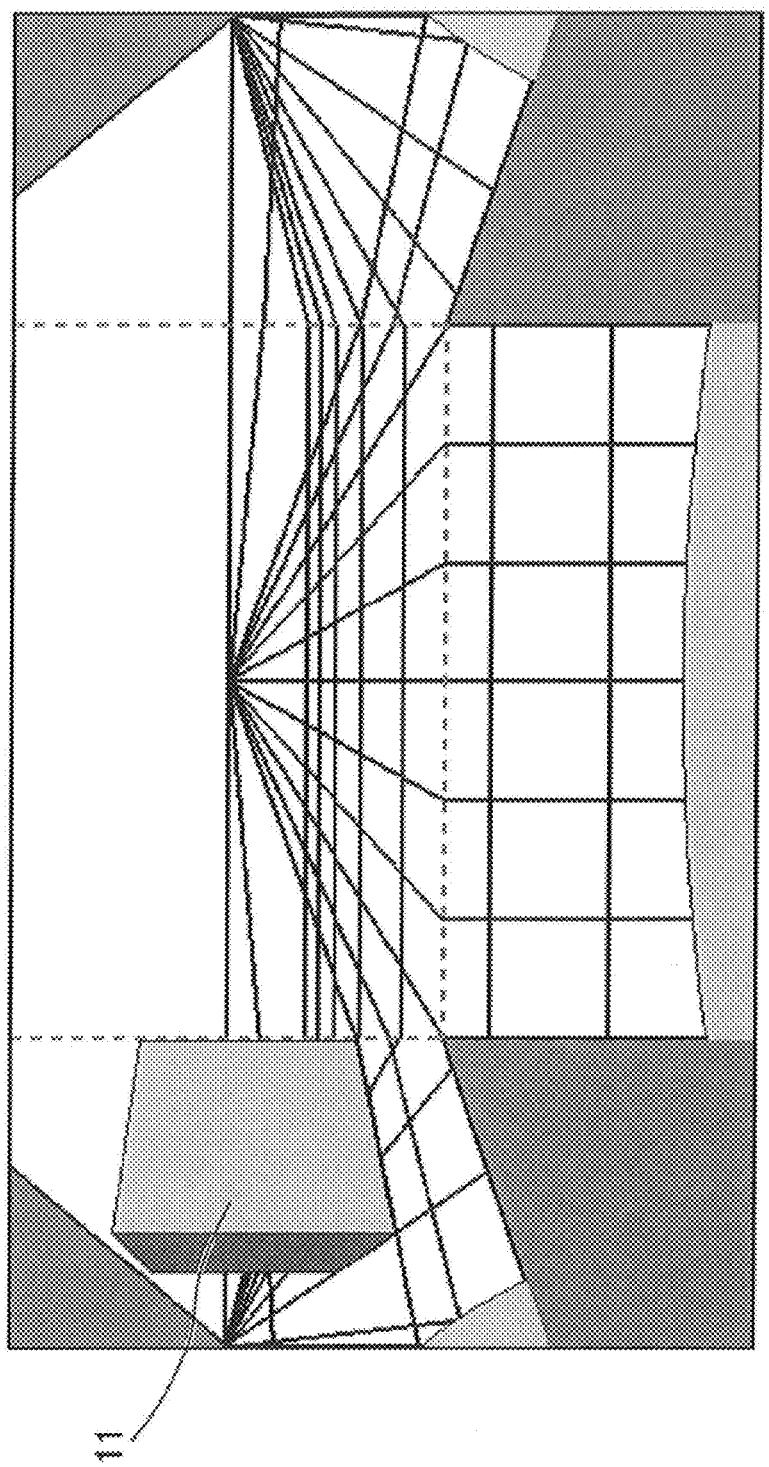
FIG. 39 is a conceptual diagram showing a processed display image according to the second or sixth embodiment of the present invention.

FIG. 39 shows the display image under the imaging condition similar to the imaging condition of the display image shown in FIG. 24 concerned with the first embodiment of the present invention.

While the cuboid 11 shown in FIG. 24 is a trapezoid leftward opened in form, the cuboid 11 shown in FIG. 39 is resembled to a rectangle in form with remaining the inclination in the vehicle front-back direction.

The relationship of the inclination of the vehicle front-back direction straight line with respect to the display image is adjustable, without adjusting the angles of the leftward virtual sight line and the rightward virtual sight line, by expanding horizontally the leftward and rightward correction image display regions 41-3L and 41-3R, and expanding horizontally the corrected images displayed on the respective expanded leftward and rightward correction image display regions 41-3L and 41-3R with maintaining the state that the corrected image of each cells on the planed is formed a rectangle having the same area with one another.

The relationship of the inclination of the vehicle front-back direction straight line with respect to the display image is adjustable by both of adjusting the angles of the leftward virtual sight line and the rightward virtual sight line and expanding the correction image display regions toward the leftward and rightward direction.

These adjustments have only to take into account the relationships between the whole display region and the areas of the frontward and downward correction image display regions.

As will be seen from the foregoing description, it is to be understood that the vehicle front-back direction straight lines on the ground surface are displayed on the leftward or rightward correction image display region as inclined closely to the horizon with increasing distance from the vehicle, thereby resulting in maintaining visibility of the depth of the vehicle front-back direction and decreasing the inclination of the image of the subject in the vehicle front-back direction. This leads to the fact that the image of the subject is displayed similar to the real subject, thereby resulting in improving visibility of the subject.

(Third Embodiment)

Figure 42:
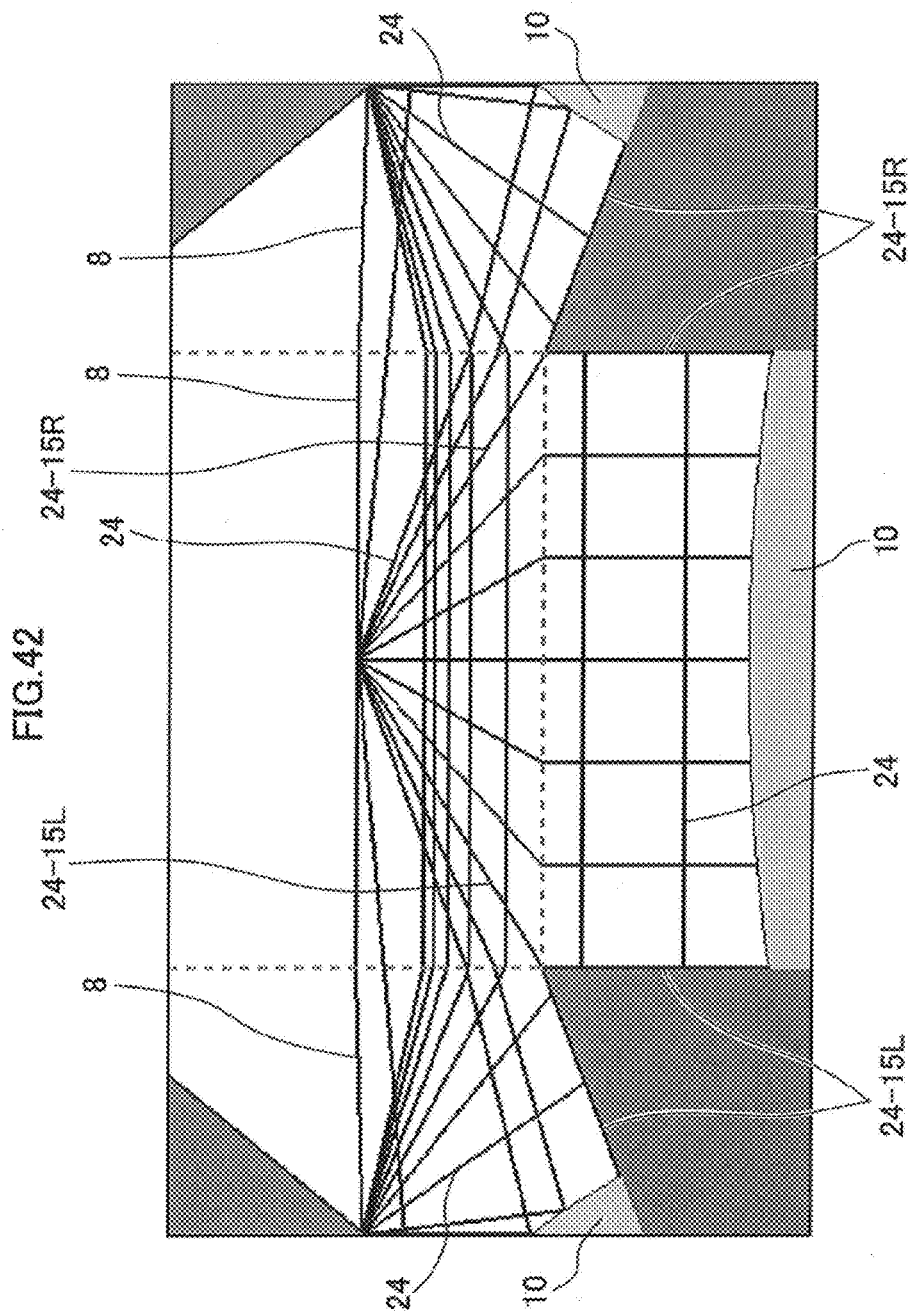
FIG. 42 is a conceptual diagram showing a processed display image according to the third embodiment of the present invention.

FIG. 42 shows the display image of the third embodiment of the present invention, which adjusted the leftward and rightward correction image display regions of the second embodiment of the present invention.

Figure 40:
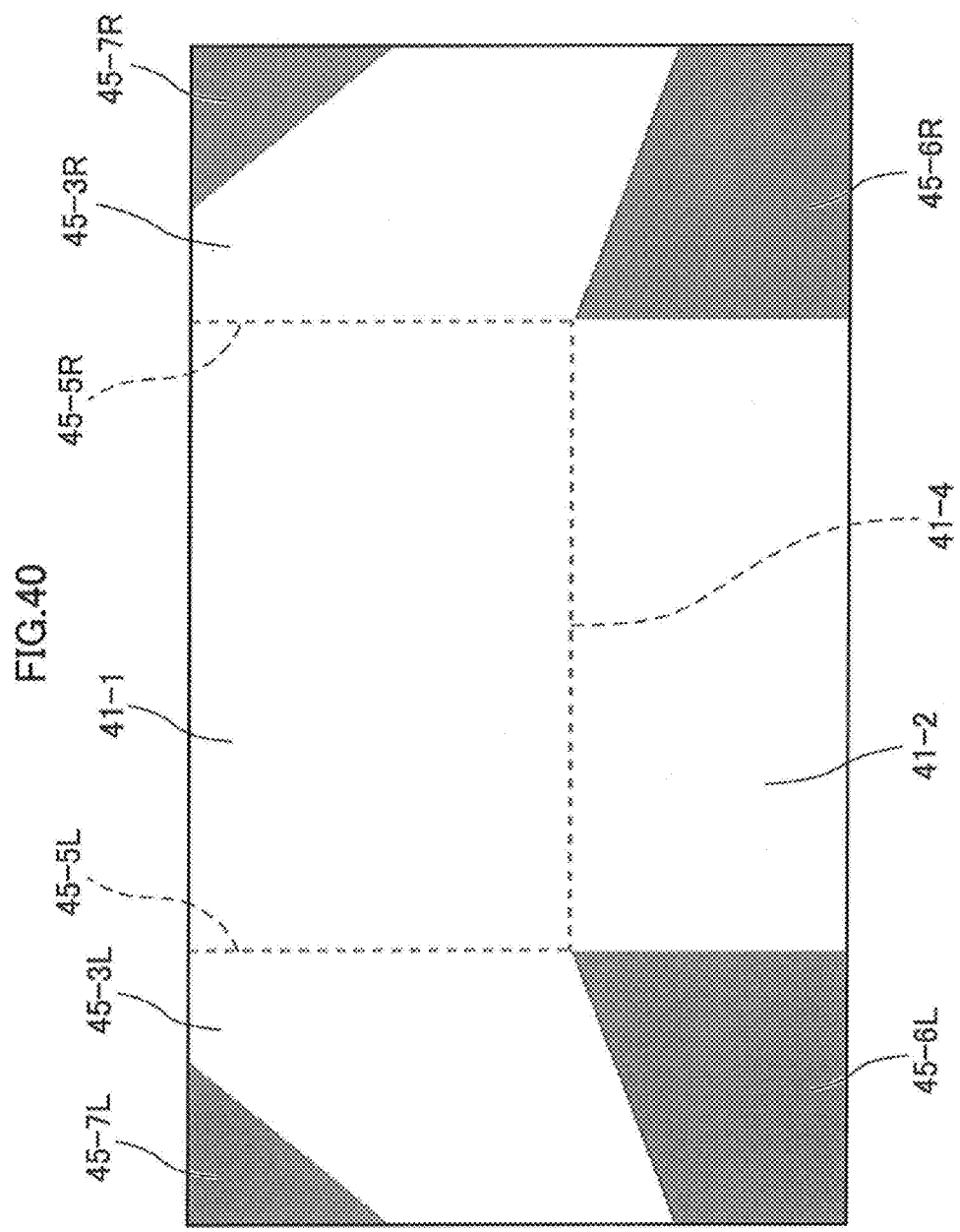
FIG. 40 is a conceptual diagram showing a processed display image according to the third embodiment of the present invention.
Figure 41:
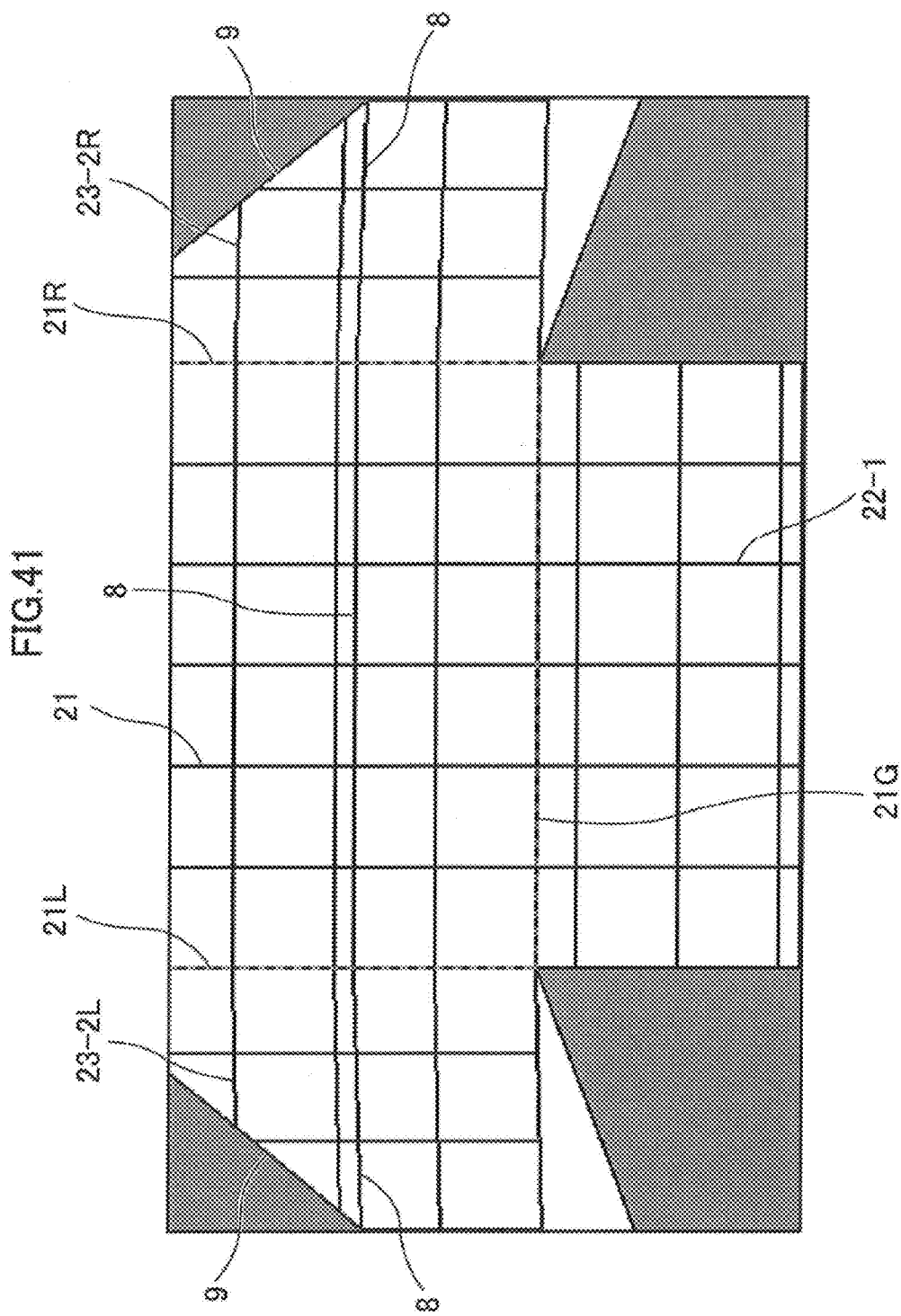
FIG. 41 is a conceptual diagram showing a processed display image according to the third embodiment of the present invention.

In FIG. 40, the reference signs 41-1, 41-2 and 41-4 are respectively equal to the reference signs 41-1, 41-2 and 41-4 in FIG. 16. The reference sign 45-3L indicates a leftward correction image display region deformed from the leftward correction image display region 44-3L. The reference sign 45-3R indicates a rightward correction image display region deformed from the rightward correction image display region 44-3R. The reference sign 45-5L indicates a dotted line mask picture equivalent to the dotted line mask picture 44-5L. The reference sign 45-5R indicates a dotted line mask picture equivalent to the dotted line mask picture 44-5R. The reference sign 45-6L, 45-6R, 45-7L and 45-7R respectively indicates plane mask pictures equivalent to the plane mask pictures 44-6L, 44-6R, 44-7L and 44-7R. The taken picture shown in FIG. 34 is displayed as shown in FIG. 41.

The corrected image displayed on the leftward correction image display region 45-3L is deformed in a manner that the cells 23-2L on the leftward plane are appeared as parallelogram cells each having an area equal to one another and inclined down toward left gradually at a degree that the cells 23-2L are visible. The leftward correction image display region 45-3L is deformed in response to the deformation of the cells 23-2L.

The corrected image displayed on the rightward correction image display region 45-3R is deformed in a manner that the cells 23-2R on the leftward plane are appeared as parallelogram cells each having an area equal to one another and inclined down toward right gradually at a degree that the cells 23-2R are visible. The rightward correction image display region 45-3R is deformed in response to the deformation of the cells 23-2R.

FIG. 42 shows the display image deformed as previous mentioned, when the straight lines 24 on the ground surface shown in FIG. 13, the horizon 8 and the bumper 10 of the vehicle 1 are simultaneously imaged.

The horizon 8 is displayed horizontally in the forward correction image display region 41-1. The horizon 8 displayed on the leftward correction image display region 45-3L is connected to the horizon 8 displayed on the forward correction image display region 41-1 and inclined down toward left gradually at a degree that the horizon 8 is visible. The horizon 8 displayed on the rightward correction image display region 45-3R is connected to the horizon 8 displayed on the forward correction image display region 41-1 and inclined down toward right gradually at a degree that the horizon 8 is visible.

Figure 38:
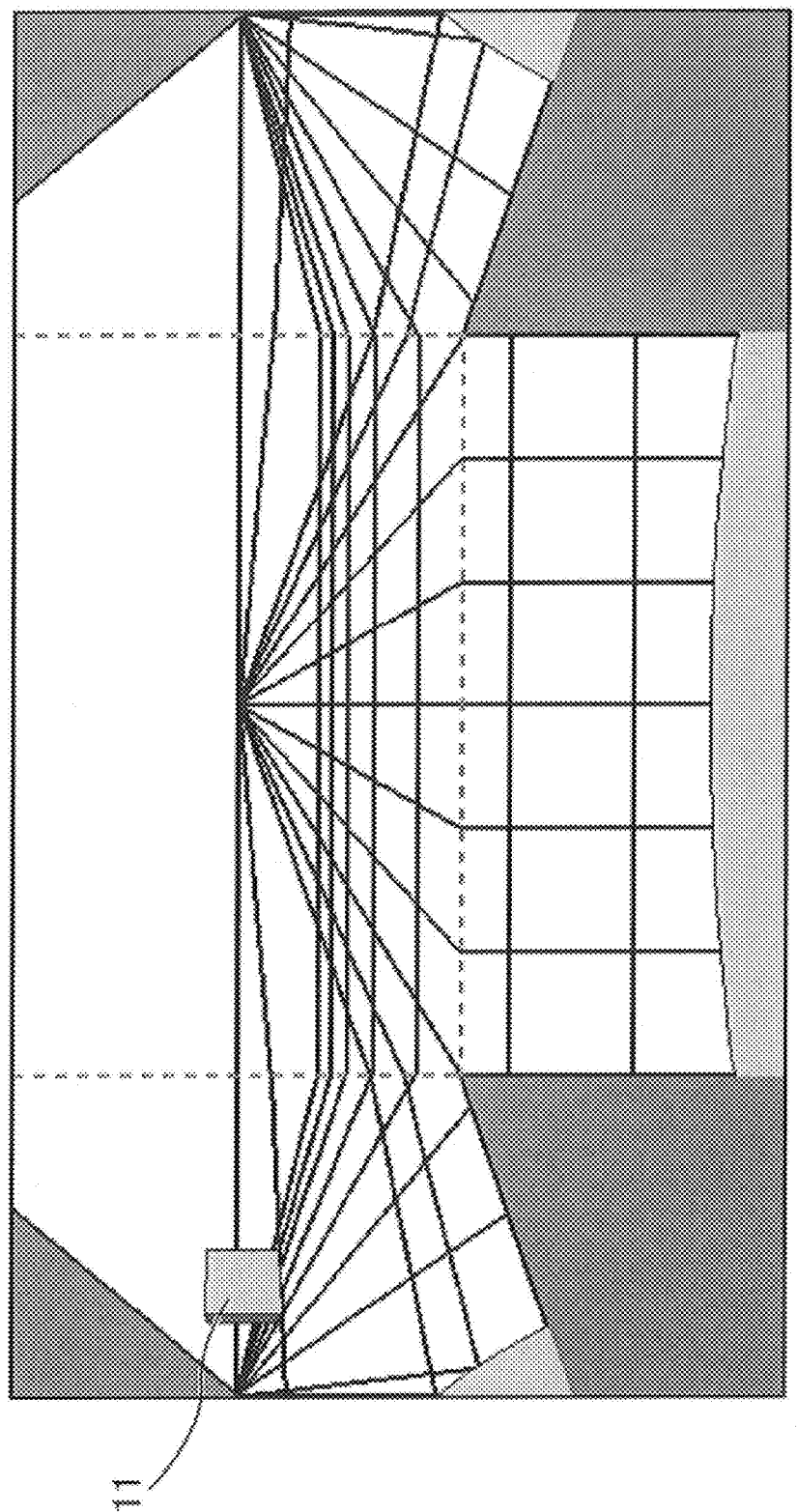
FIG. 38 is a conceptual diagram showing a processed display image according to the second embodiment of the present invention.
Figure 43:
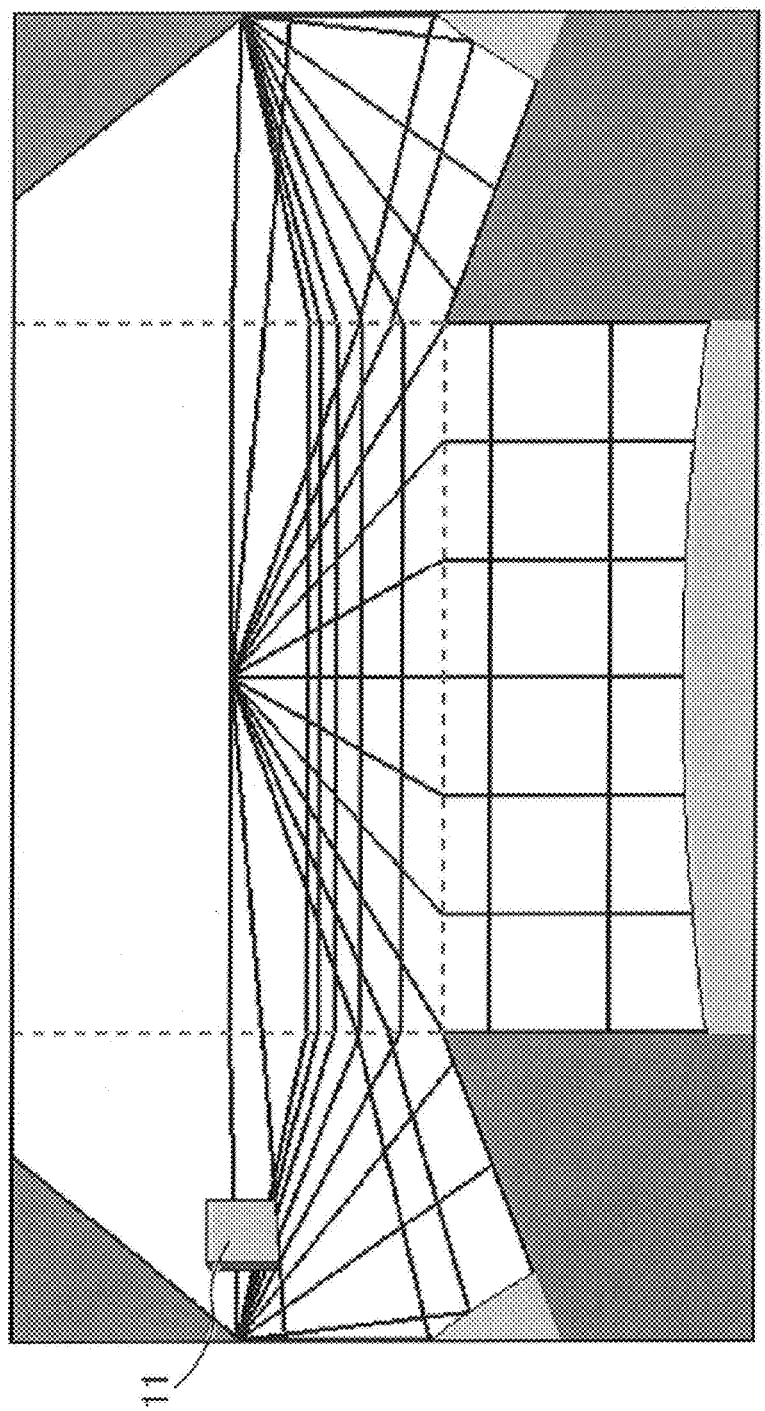
FIG. 43 is a conceptual diagram showing a processed display image according to the third embodiment of the present invention.

FIG. 43 shows the display image under the imaging condition similar to the imaging condition of the display image shown in FIG. 19 concerned with the first embodiment of the present invention. FIG. 38 shows the before deformed display image concerned with the second embodiment of the present invention.

Under the same imaging condition of the cuboid 11 located as shown in FIG. 19, the top side of the cuboid 11 in the vehicle front-back direction is displayed as inclined gradually down toward right in similar to the real sight in FIG. 38, but the top side of the cuboid 11 in the vehicle front-back direction is displayed on horizontal in FIG. 43.

As described above, the form in the vehicle front-back direction is slightly different from the real sight in a limited area on the horizon 8, but the whole leftward or rightward correction image display region is almost unaffected in visibility.

As will be seen from the foregoing description, it is to be understood that, when the image of the infinite ground surface without the solid subjects and patterns is taken, the horizon is appeared as arcuate shape on the display image. This leads to the fact that the forward, leftward and rightward correction image display regions are respectively recognized to display the forward, leftward and rightward directions.

(Fourth Embodiment)

Figure 47:
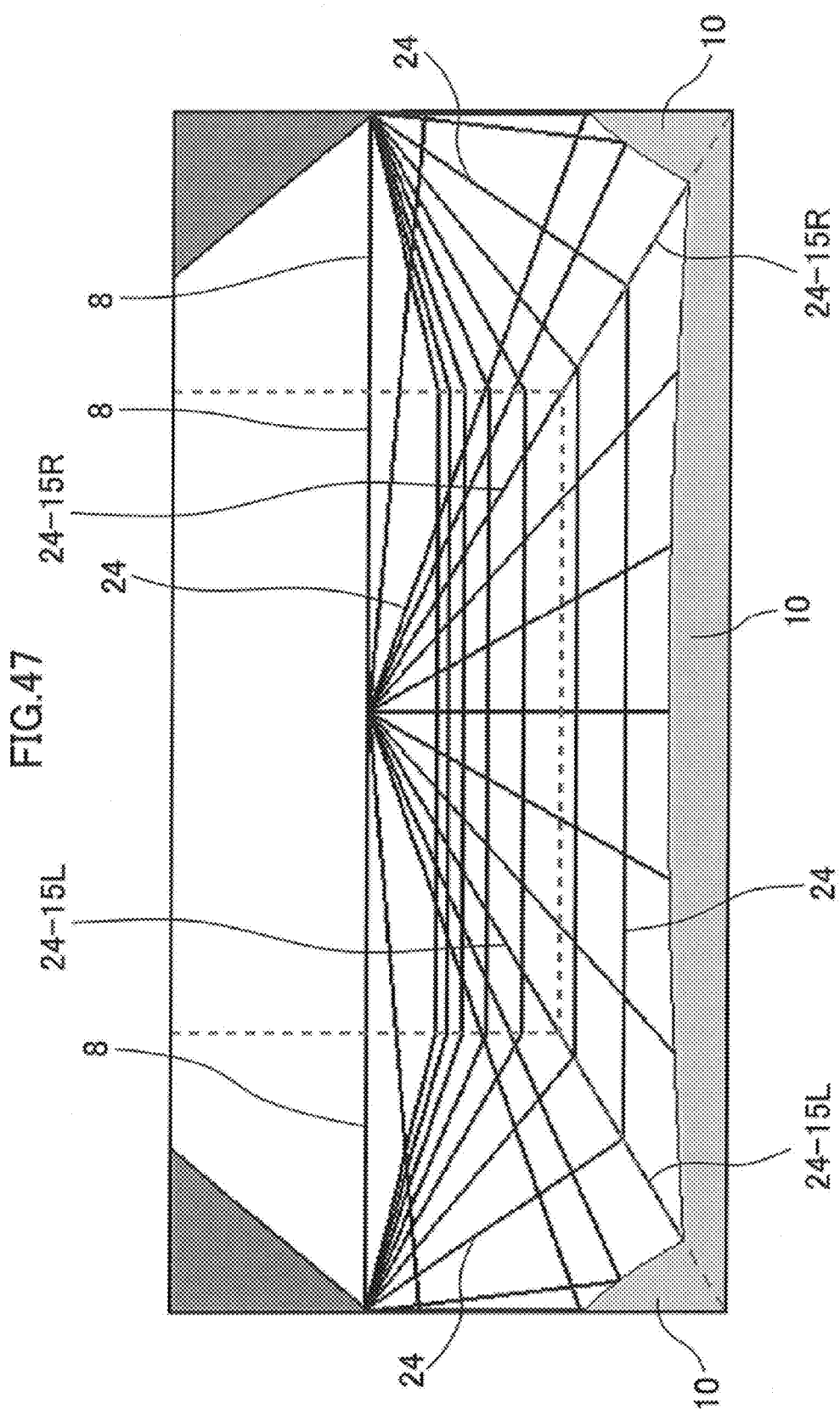
FIG. 47 is a conceptual diagram showing a processed display image according to the fourth embodiment of the present invention.

FIG. 47 shows the display image of the fourth embodiment of the present invention, which adjusted the downward correction image display region of the first embodiment of the present invention.

Figure 8:
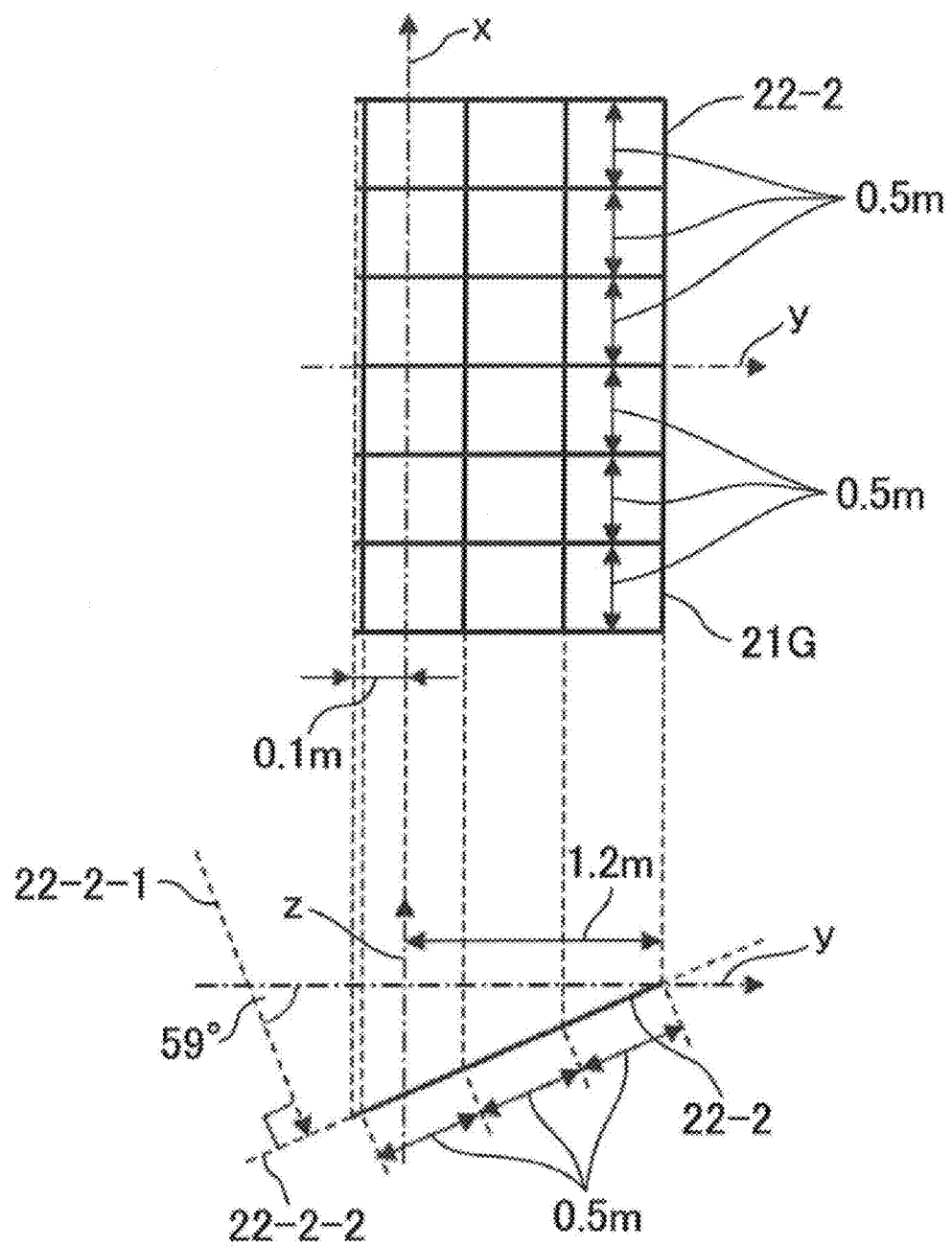
FIG. 8 is a conceptual diagram showing a subject imaged by the vehicle-mounted camera 2.

In FIG. 8, the reference sign 22-2-1 indicates a downward virtual sight line adjusted from the downward virtual sight line 22-1-1 inclined with respect to the y-axis at a downward angle of 90 degrees as inclined with respect to the y-axis at a downward angle of 59 degrees. The reference sign 22-2-2 indicates a downward plane being in perpendicular relationship with the downward virtual sight line 22-2-1, and including a point at 1.2 m in the direction of the y-axis and 0m in the direction of the z-axis as similar to the downward plane 22-1-2. The reference sign 22-2 indicates cells on the illustrated part of the downward plane 22-2-2, the cells 22-2 equivalent to the cells 22-1 on the downward plane.

Each of the vehicle left-right direction straight lines is assumed to be at 0.5 m intervals with respect to the vehicle left-right direction straight line 21G.

Figure 44:
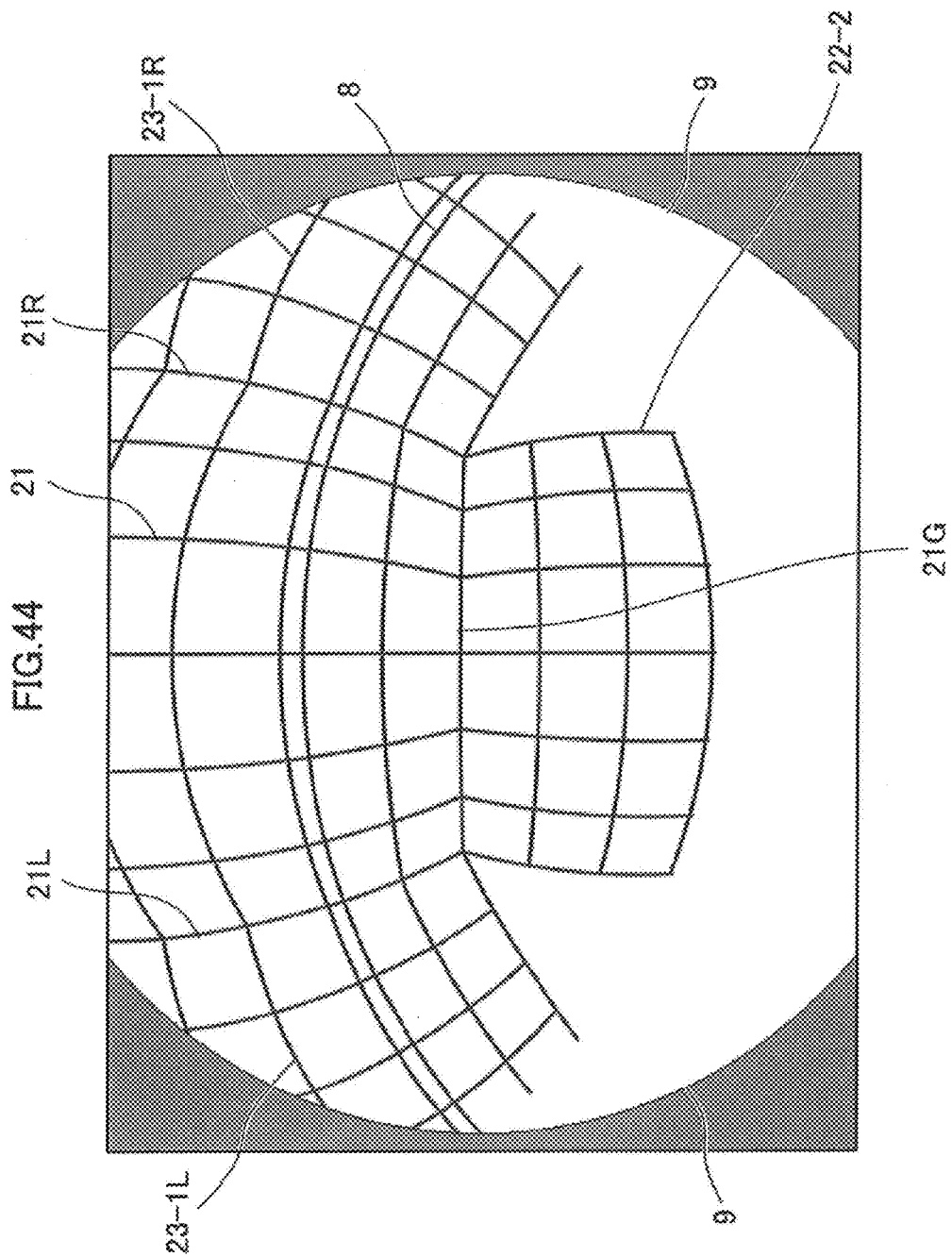
FIG. 44 is a conceptual diagram showing a taken image.
Figure 45:
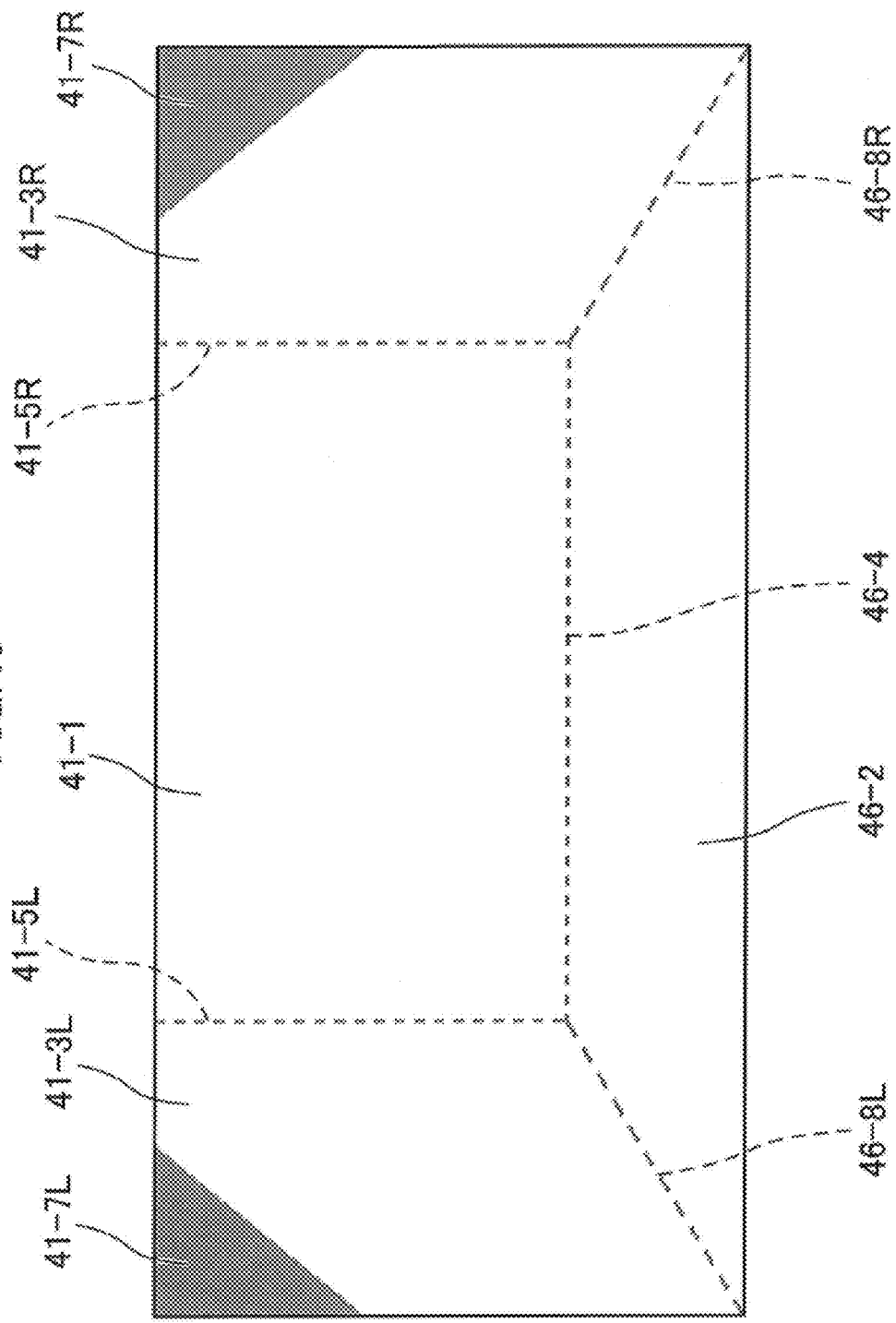
FIG. 45 is a conceptual diagram showing a processed display image according to the fourth embodiment of the present invention.

If the cells 2l on the forward plane shown as FIG. 6, the cells 21-2 on the downward plane 21-1-2 shown as FIG. 8, the leftward and rightward planes 23-1L, 23-1R shown as FIG. 9 and the horizon 8 are simultaneously imaged, the image is taken as FIG. 44 and the image arrangement is made as shown in FIG. 45 in contrasted with FIG. 16.

The cells 22-2 on the downward plane are assumed to be imaged through the ground surface.

In FIG. 45, the reference signs 41-1, 41-3L, 41-3R, 41-5L, 41-5R, 41-7L and 41-7R are respectively equal to the reference signs 41-1, 41-3L, 41-3R, 41-5L, 41-5R, 41-7L and 41-7R in FIG. 16. The reference sign 46-2 indicates a downward correction image display region displayed therein the corrected image corresponding to the cells 22-2 on the downward plane. The reference sign 46-4 indicates a dotted line mask picture equivalent to the dotted line mask picture 41-4. The reference sign 46-8L indicates a dotted line mask picture constantly displayed as a dotted line in arbitrary color at a display position of adjacent sides of the leftward and downward correction image display regions 41-3L and 46-2. The reference sign 46-8R indicates a dotted line mask picture constantly displayed as a dotted line in arbitrary color at a display position of adjacent sides of the rightward and downward correction image display regions 41-3R and 46-2.

Figure 46:
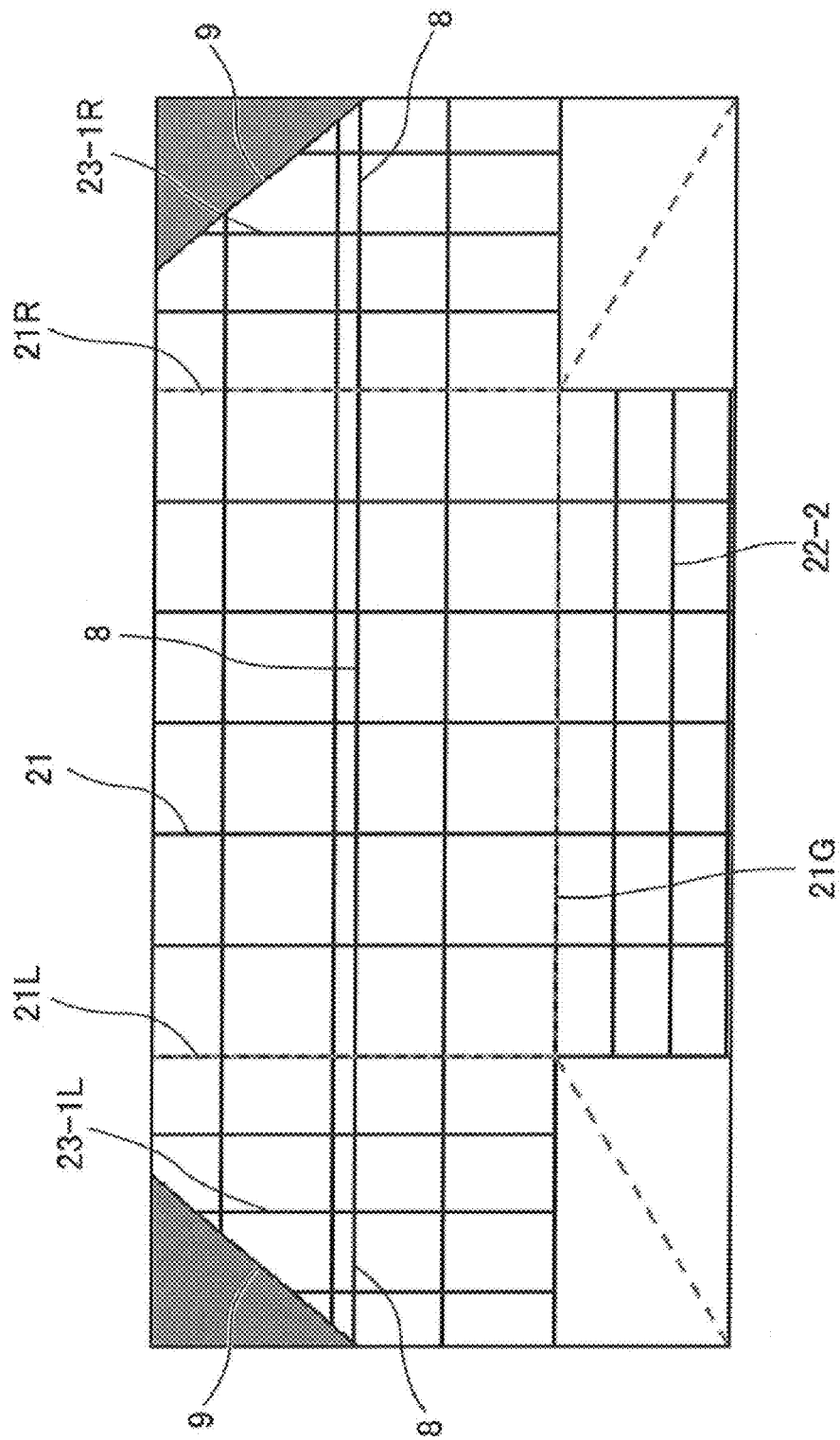
FIG. 46 is a conceptual diagram showing a processed display image according to the fourth embodiment of the present invention.

FIG. 46 shows the operated image of the taken image shown in FIG. 44 under the allocation shown in FIG. 45.

As shown in FIG. 46, when the subjects are the cells 22-2 on the downward plane, an image displayed on the downward correction image display region 46-2 is corrected in a manner that each of the cell 22-2 is displayed as a horizontally long rectangle formed by horizontal and vertical lines and having an area equal to one another.

In case that the subjects are the cells 22-2 infinitely expanding on the downward plane, an image displayed on the downward correction image display region 46-2 is corrected in a manner that rectangles are displayed on the whole of the downward correction image display region 46-2.

The cells may be corrected to be displayed as squares or vertically long rectangles depending on the relationships among the forward correction image display region 41-1, the leftward correction image display region 41-3L and the rightward correction image display region 41-3R.

The downward correction image display region 46-2 has a top side coincided with the vehicle left-right direction straight line 21G, located adjacent to the bottom side of the forward correction image display region 41-1, and coincided in the position on the x-axis direction with the vehicle left-right direction straight line 21G corresponding to the bottom side of the forward correction image display region 41-1.

FIG. 47 shows the display image when the straight lines 24 on the ground surface shown in FIG. 13, the horizon 8 and the bumper 10 of the vehicle 1 are simultaneously imaged.

The downward correction image display region 46-2 has a left side coincided with the vehicle front-back direction straight line 24-15L, located adjacent to the bottom side of the leftward correction image display region 41-3L, and coincided in the position on the y-axis direction with the vehicle front-back direction straight line 24-15L corresponding to the bottom side of the leftward correction image display region 41-3L.

The downward correction image display region 46-2 has a right side coincided with the vehicle front-back direction straight line 24-15R, located adjacent to the bottom side of the rightward correction image display region 41-3R, and coincided in the position on the y-axis direction with the vehicle front-back direction straight line 24-15R corresponding to the bottom side of the rightward correction image display region 41-3R.

Under the state that a cuboid 13 formed with a cube having 1 m sides on the ground is imaged simultaneously with the straight lines 24, the horizon 8, and the bumper 10 of the vehicle 1, the image is displayed as following. When the cuboid 13 is at 0.5 m in the direction of the y-axis and 2 m in the direction of the x-axis, the display image is shown as FIG. 49. When the cuboid 13 is at 0.5 m in the direction of the y-axis and 1 m in the direction of the x-axis, the display image is shown as FIG. 50. When the cuboid 13 is at 0.5 m in the direction of the y-axis and the center in the direction of the x-axis, the display image is shown as FIG. 51.

Figure 49:
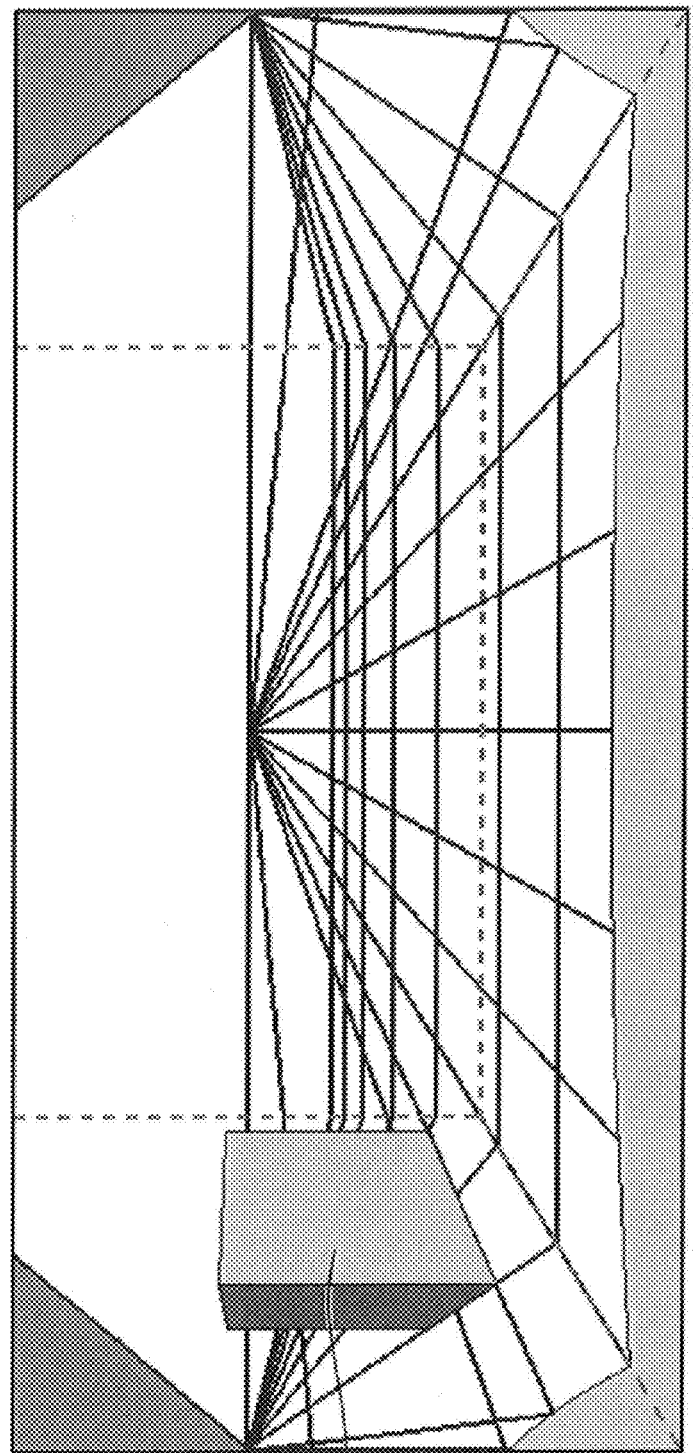
FIG. 49 is a conceptual diagram showing a processed display image according to the fourth embodiment of the present invention.
Figure 50:
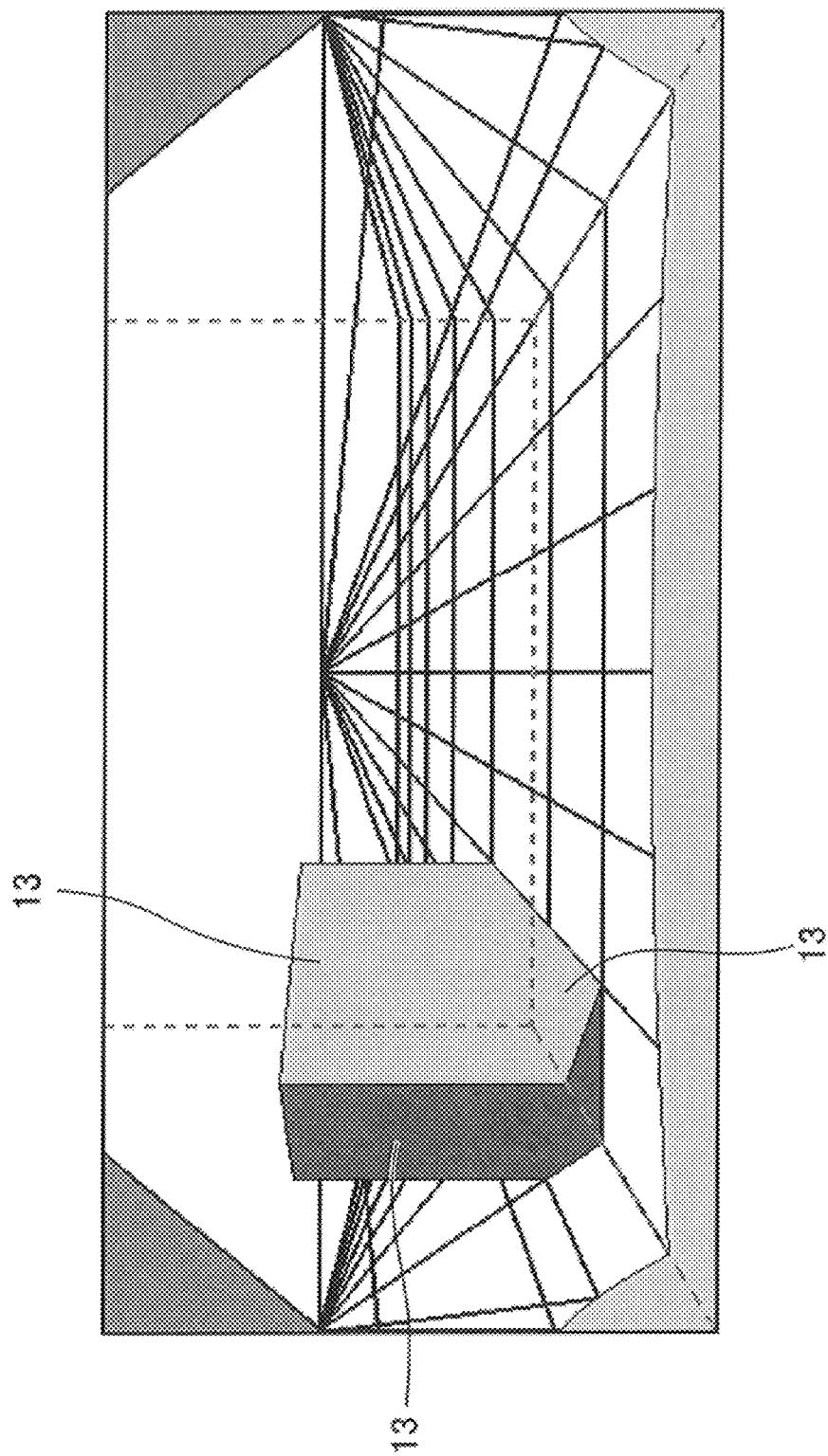
FIG. 50 is a conceptual diagram showing a processed display image according to the fourth embodiment of the present invention.
Figure 51:
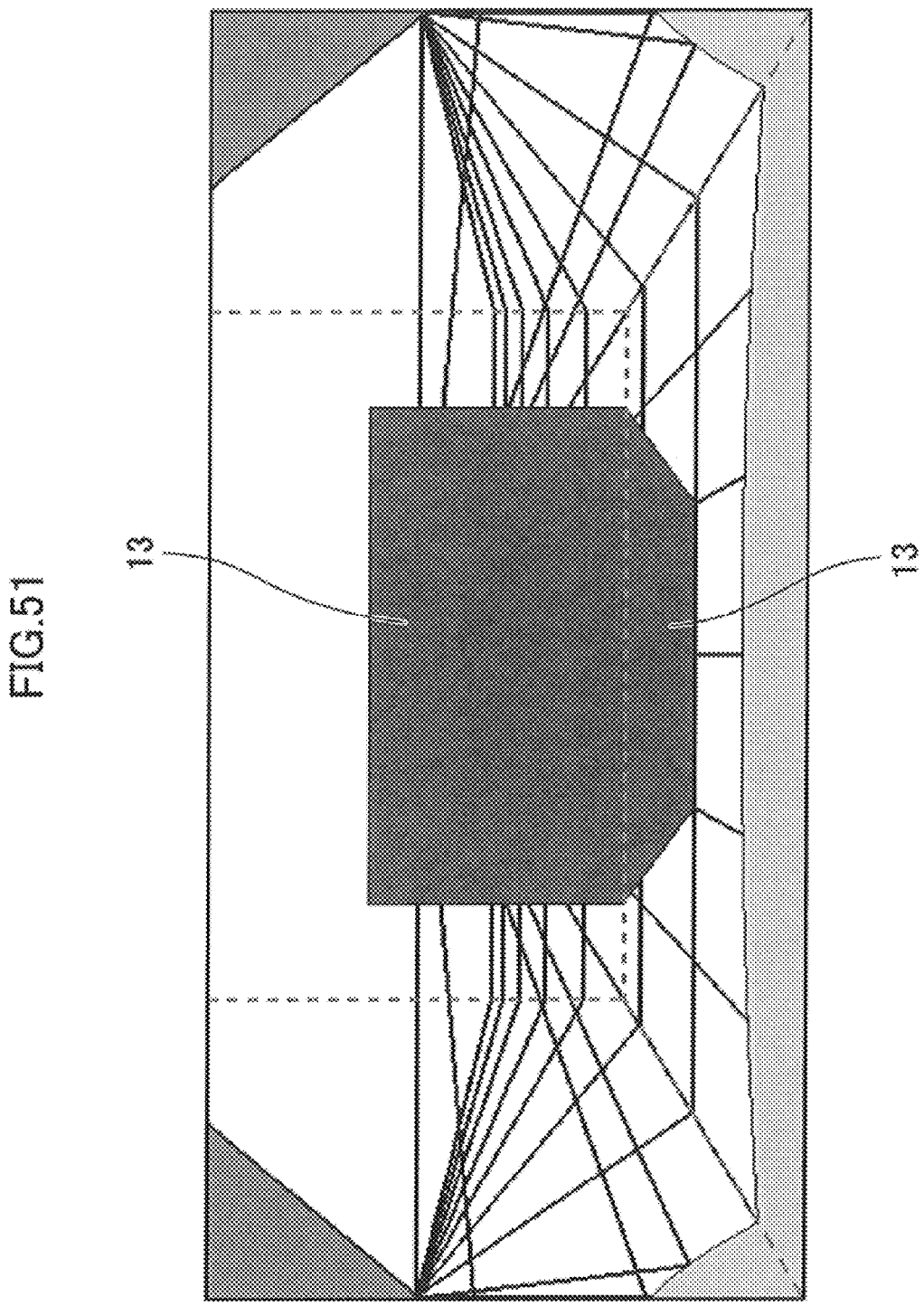
FIG. 51 is a conceptual diagram showing a processed display image according to the fourth embodiment of the present invention.

FIGS. 49 to 51 each shows an example of the display image when the cuboid 13 moves in the back of the vehicle 1 from left to right, thereby resulting in the fact that the display position of the cuboid 13 moves from the leftward correction image display region 41-3L to the downward and forward correction image display regions 46-2 and 41-1. In the example, although the sides of the cuboid 13 are polygonal at the boundary among the leftward correction image display region 41-3L and the downward correction image display region 46-2 and the forward correction image display region 41-1, the display position of the cuboid 13 moves without misalignment of the sides, and therefore the eye line toward a bottom part of the cuboid 13 continuously moves from left to bottom. The relationship between the rightward correction image display region 47-3R and the downward or forward correction image display region 46-2, 41-1 is similar to the relationship between the leftward correction image display region 41-3L and the downward correction image display region 46-2.

In the fourth embodiment of the present invention, the downward virtual sight line is not inclined downward at an angle of 90 degrees with respect to the y-axis.

If the downward virtual sight line is inclined downward at an angle of 90 degrees with respect to the y-axis, the left and right sides of the downward correction image display region are displayed in vertical as similar to the first to third embodiments of the present invention, thereby resulting in the fact that each of the left and right sides of the downward correction image display region is not adjacent to the bottom side of the leftward or rightward correction image display region. The downward virtual sight line is therefore inclined downward at an angle under 90 degrees with respect to the y-axis. This leads to the fact that the image is approximately the view in the direction of the front eye line as seen from the vehicle front-back direction straight lines displayed on the downward correction image display region 46-2 shown in FIG. 47.

As will be seen from the foregoing description, it is to be understood that, although the direction of eye line toward the downward correction image display region is limited to be inclined forward, the image is displayed without discontinuity and misalignment from the left-right direction to the down direction, thereby resulting in improving visibility of the relationships in the whole image, and facilitating the movement of the eye line targeting to the subject moving in the whole display image.

(Fifth Embodiment)

Figure 54:
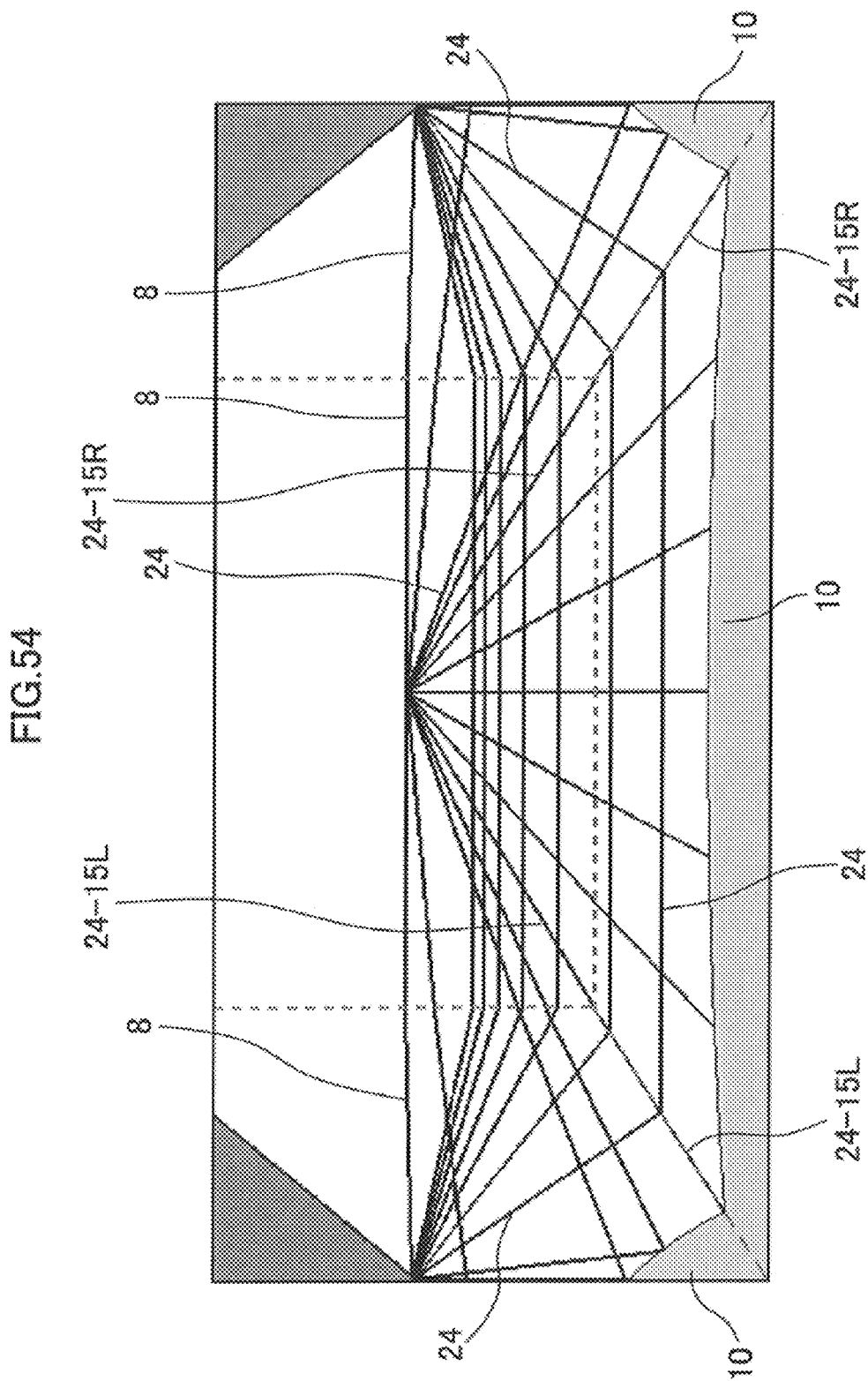
FIG. 54 is a conceptual diagram showing a processed display image according to the fifth embodiment of the present invention.

FIG. 54 shows the display image of the fifth embodiment of the present invention, which adjusted the leftward, rightward and downward correction image display regions of the fourth embodiment of the present invention.

Figure 52:
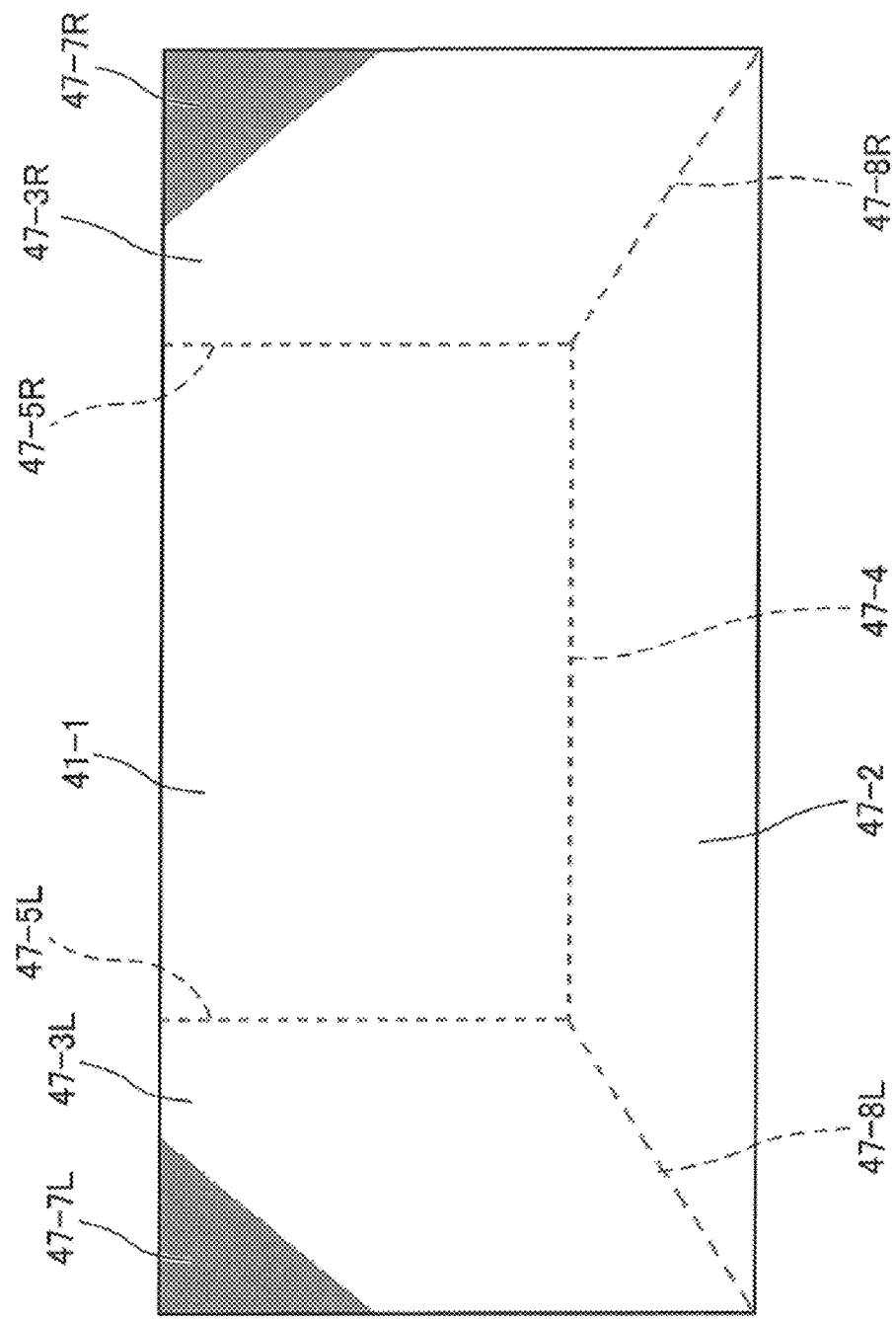
FIG. 52 is a conceptual diagram showing a processed display image according to the fifth embodiment of the present invention.
Figure 53:
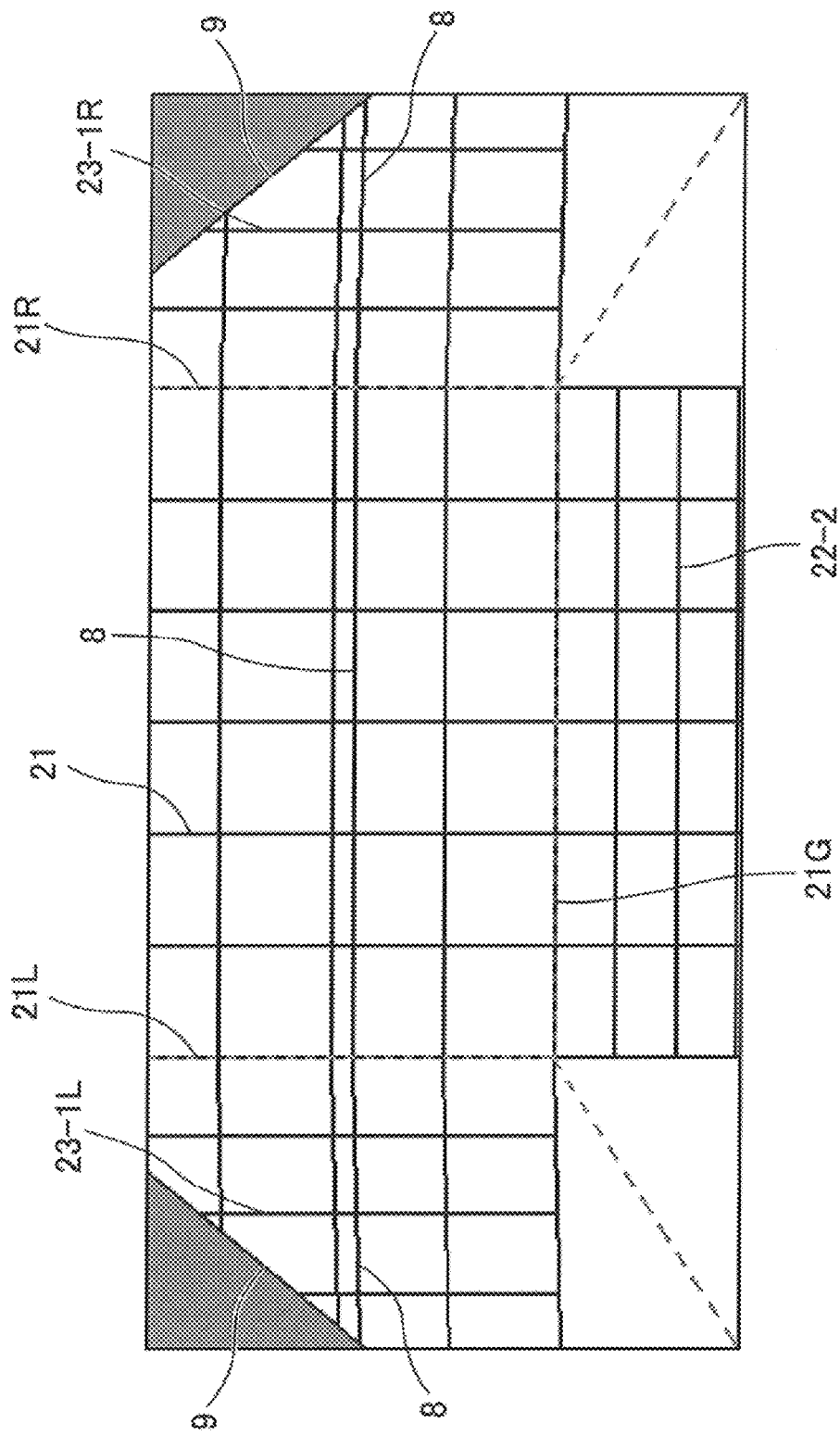
FIG. 53 is a conceptual diagram showing a processed display image according to the fifth embodiment of the present invention.

In FIG. 52, the reference sign 41-1 is equal to the reference sign 41-1 in FIG. 16. The reference sign 47-3L indicates a leftward correction image display region deformed from the leftward correction image display region 41-3L. The reference sign 47-3R indicates a rightward correction image display region deformed from the rightward correction image display region 41-3R. The reference sign 47-2 indicates a downward correction image display region deformed from the downward correction image display region 46-2 The reference sign 47-5L indicates a dotted line mask picture equivalent to the dotted line mask picture 41-5L. The reference sign 47-5R indicates a dotted line mask picture equivalent to the dotted line mask picture 41-5R. The reference sign 47-4 indicates a dotted line mask picture equivalent to the dotted line mask picture 46-4. The reference sign 47-8L indicates a dotted line mask picture equivalent to the dotted line mask picture 46-8L. The reference sign 45-8L indicates a dotted line mask picture equivalent to the dotted line mask picture 46-8R. The reference signs 47-7L and 47-7R respectively indicate plane mask pictures equivalent to the plane mask pictures 41-7L and 41-7R. The taken image shown in FIG. 44 is displayed as FIG. 53.

The corrected image displayed on the leftward correction image display region 47-3L is deformed in a manner that the cells 23-1L on the leftward plane are appeared as parallelogram cells each having an area equal to one another and inclined down toward left gradually at a degree that the cells 23-1L are visible. The leftward correction image display region 47-3L is deformed in response to the deformation of the cells 23-1L.

The corrected image displayed on the rightward correction image display region 47-3R is deformed in a manner that the cells 23-1R on the rightward plane are appeared as parallelogram cells each having an area equal to one another and inclined down toward right gradually at a degree that the cells 23-1R are visible. The rightward correction image display region 47-3R is deformed in response to the deformation of the cells 23-1R.

Each of the parallelogram rightward cells is equal in form and size to each parallelogram rightward cell as if horizontally flipped.

The corrected image displayed on the downward correction image display region 47-2 is downwardly expanded in response to the deformation of the leftward correction image display region 47-3L and the rightward correction image display region 47-3R. The vertical sides of the rectangle cells displayed as the rectangle cells 22-2 on the downward correction image display region are respectively deformed longer than that of the rectangle cells displayed on the downward correction image display region 46-2.

FIG. 54 shows the display image deformed as previous mentioned, when the straight lines 24 on the ground surface shown in FIG. 13, the horizon 8 and the bumper 10 of the vehicle 1 are simultaneously imaged.

Although the angles of the leftward and rightward planes in the fifth embodiment of the present invention are respectively different from the angles of the leftward and rightward planes in the third embodiment of the present invention, the displayed horizon 8 is inclined as similar in the third embodiment of the present invention.

Figure 48:
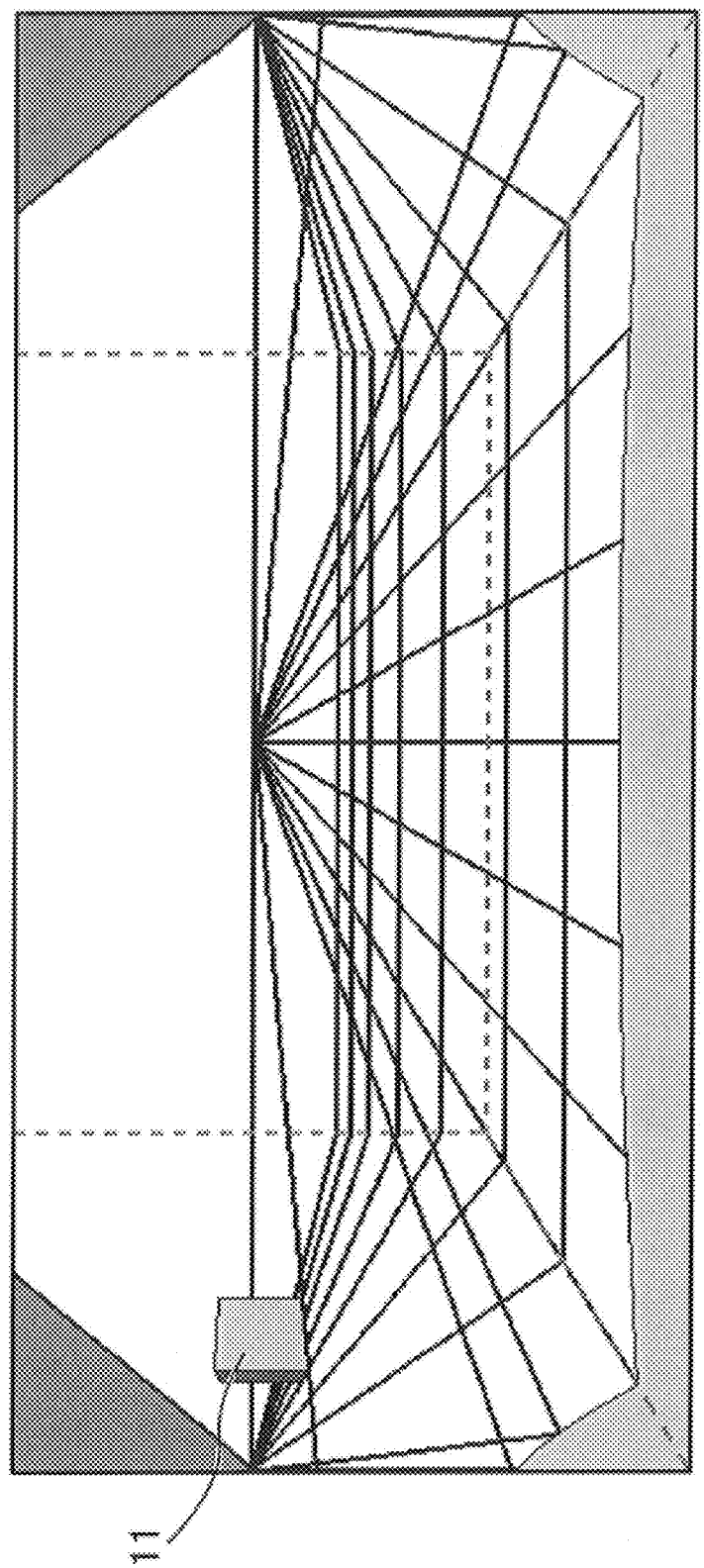
FIG. 48 is a conceptual diagram showing a processed display image according to the fourth embodiment of the present invention.
Figure 55:
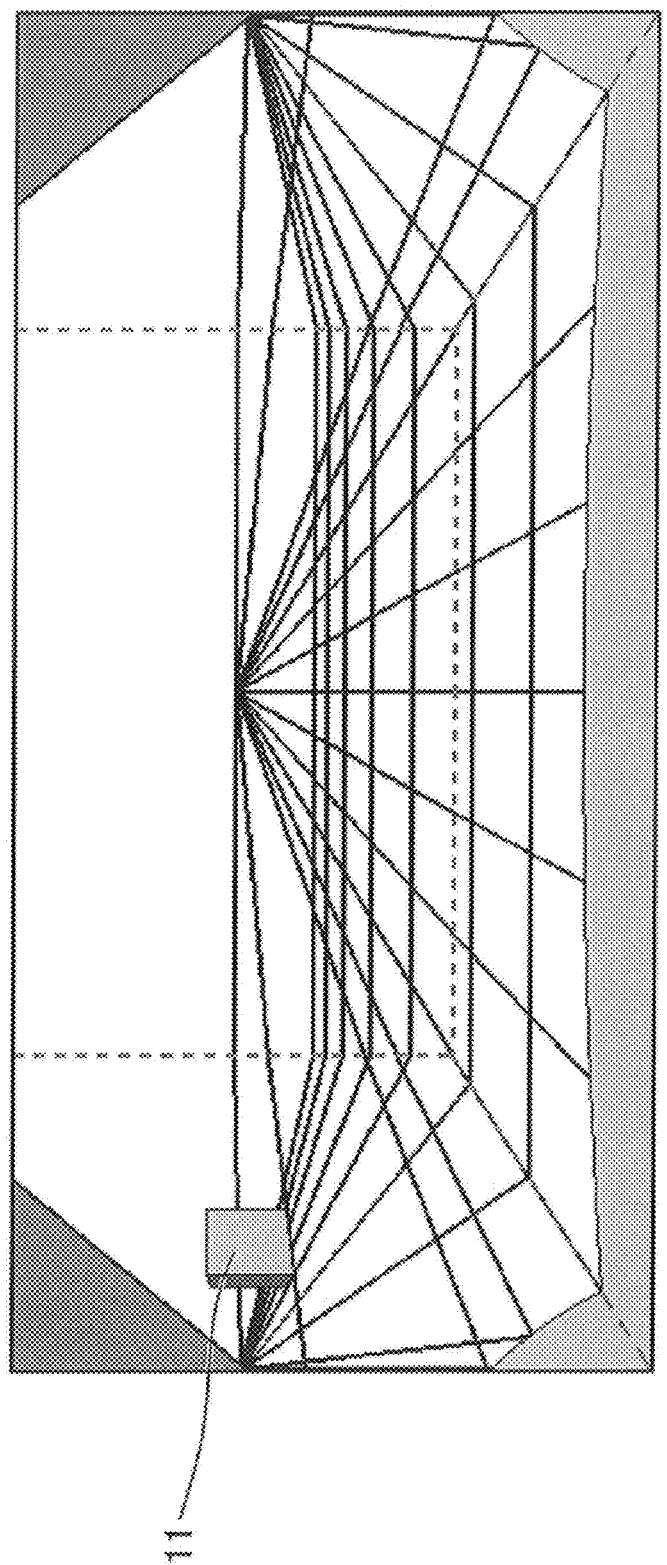
FIG. 55 is a conceptual diagram showing a processed display image according to the fifth embodiment of the present invention.

FIG. 55 shows the display image under the imaging condition similar to the imaging condition of the display image shown in FIG. 19 concerned with the first embodiment of the present invention. FIG. 48 shows the before deformed display image concerned with the fourth embodiment of the present invention.

Although the leftward and rightward planes are respectively different in angles from that of the third embodiment of the present invention, the inclination of the top side of the cuboid 11 in the vehicle front-back direction is similar to that of the third embodiment of the present invention.

On the other hand, the corrected image displayed on the downward correction image display region 47-2 as shown in FIG. 54 is not visibly different from the corrected image displayed on the downward correction image display region 46-2 as shown in FIG. 47.

As will be seen from the foregoing description, it is to be understood that the fifth embodiment has visibility similar to the third embodiment without influence of visibility of the downward correction image display region under the state that the downward correction image display region is in contact with each leftward and rightward correction image display region.

(Sixth Embodiment)

Figure 14:
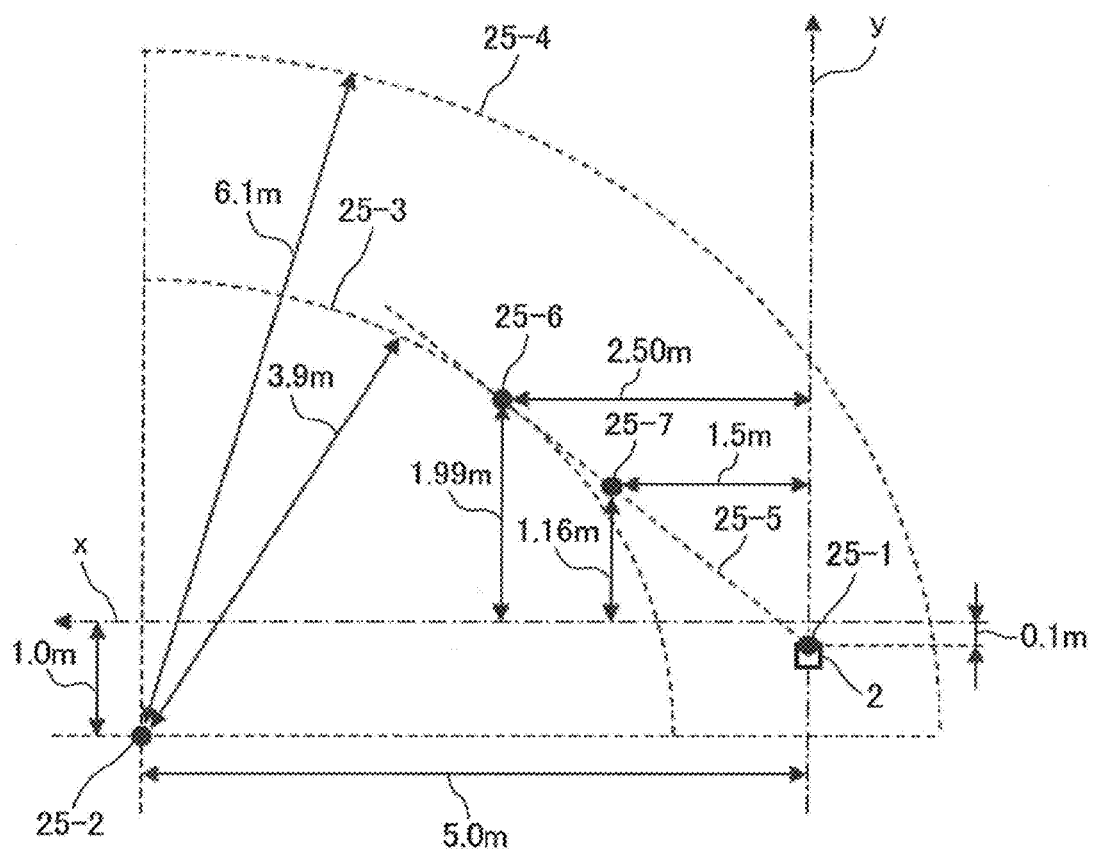
FIG. 14 is a conceptual diagram showing a relationship of a vehicle travelling way.
Figure 56:
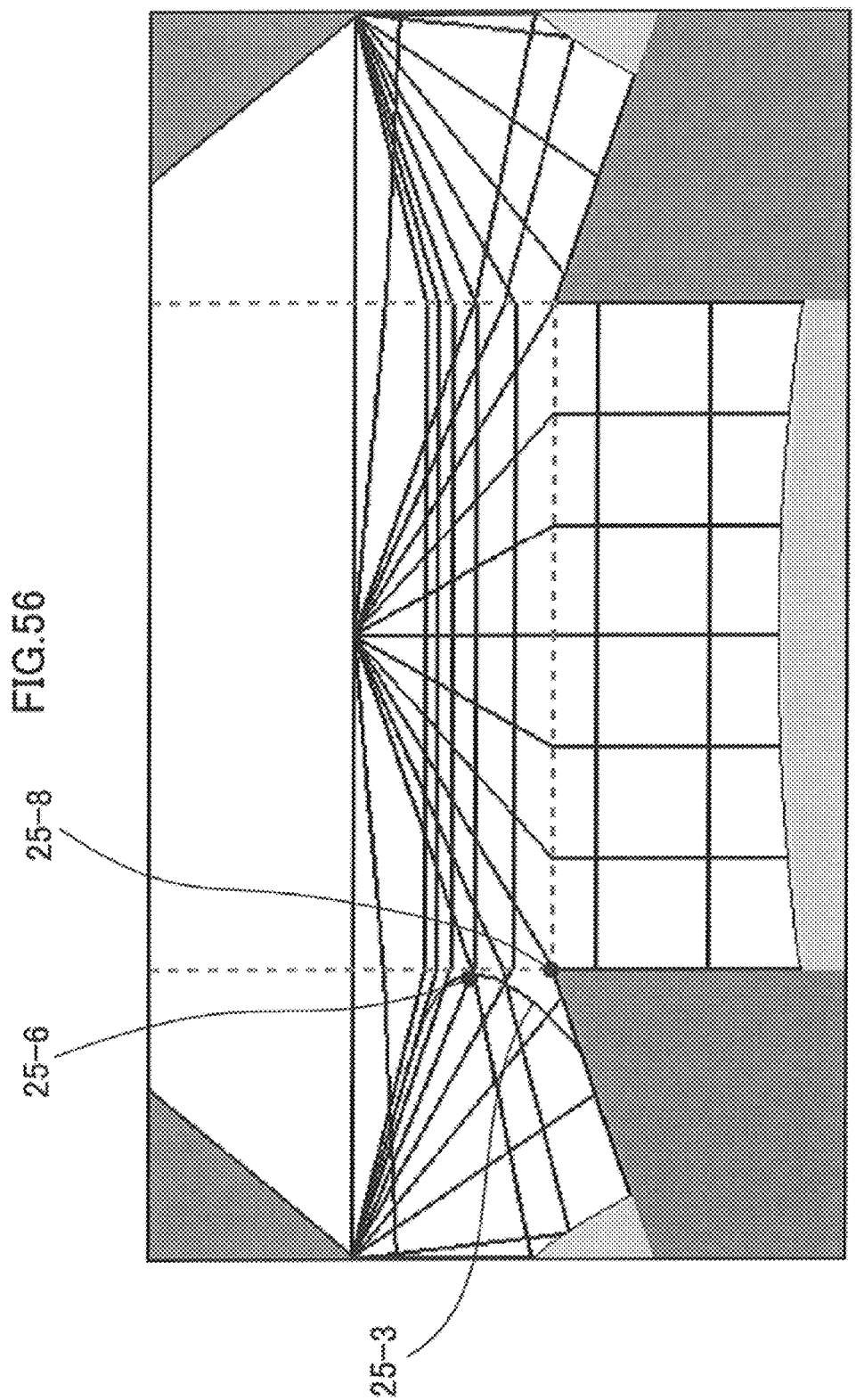
FIG. 56 is a conceptual diagram showing a processed display image according to the second or sixth embodiment of the present invention.
Figure 57:
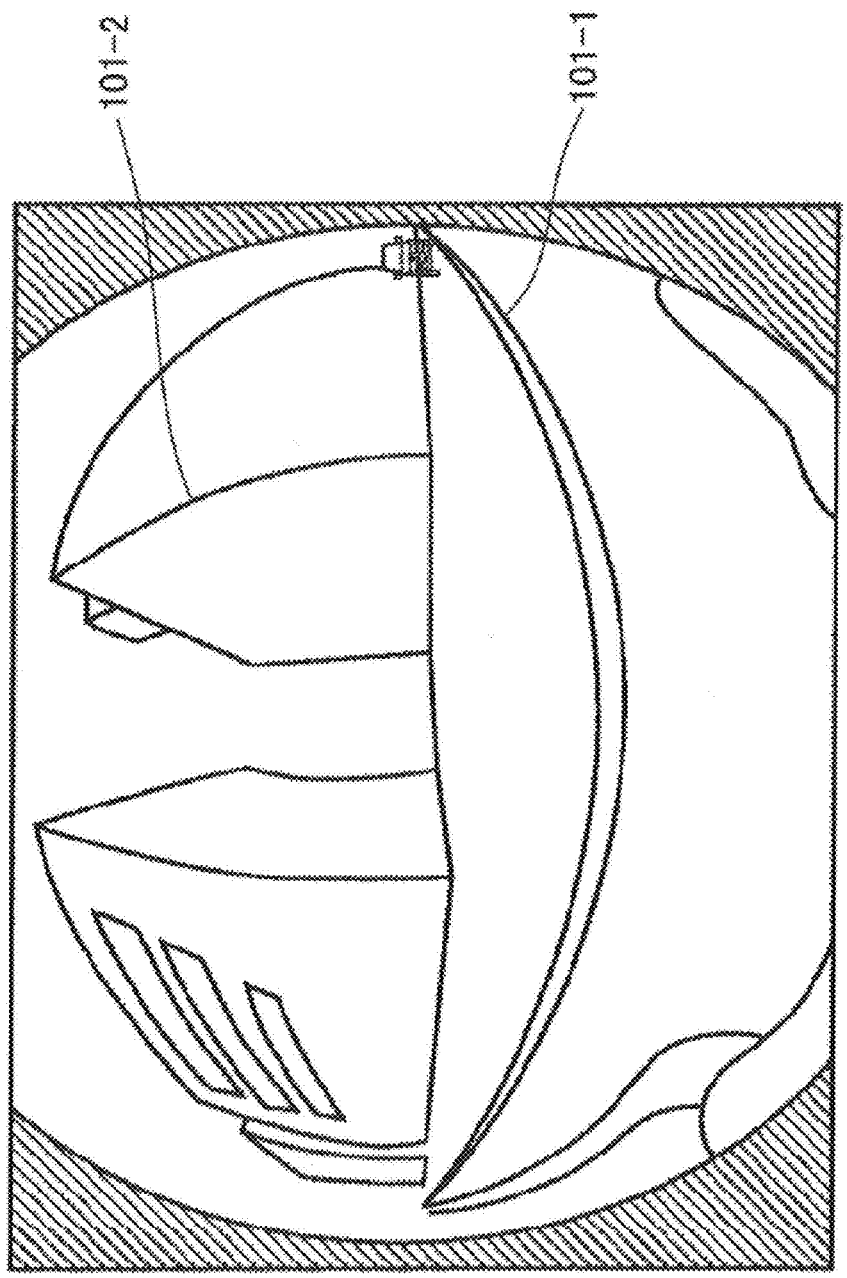
FIG. 57 is a conceptual diagram showing a taken image by using the wide-angle lens.
Figure 58:
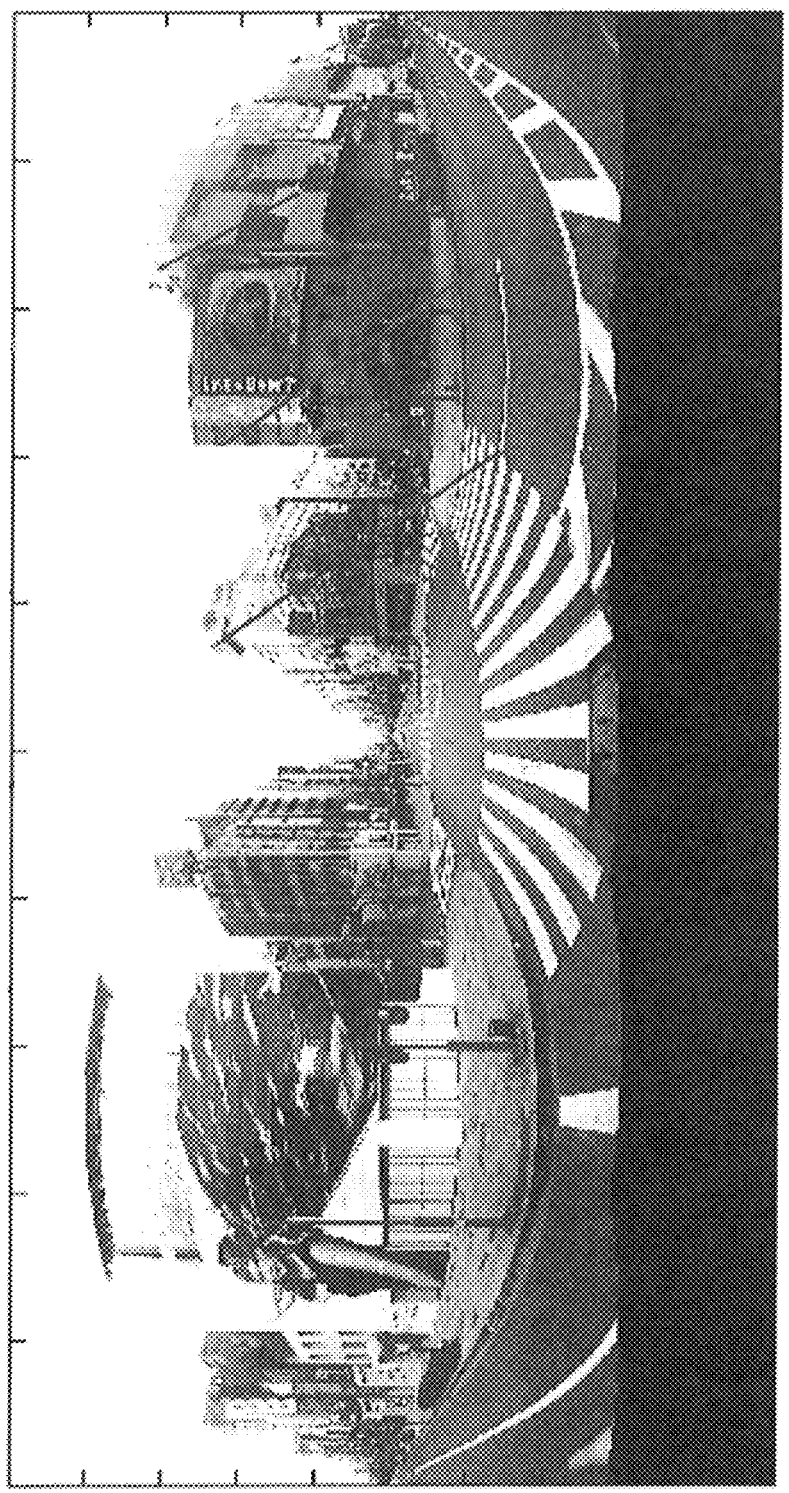
FIG. 58 is a conceptual diagram showing a taken image developed by a Mercator projection.
Figure 59:
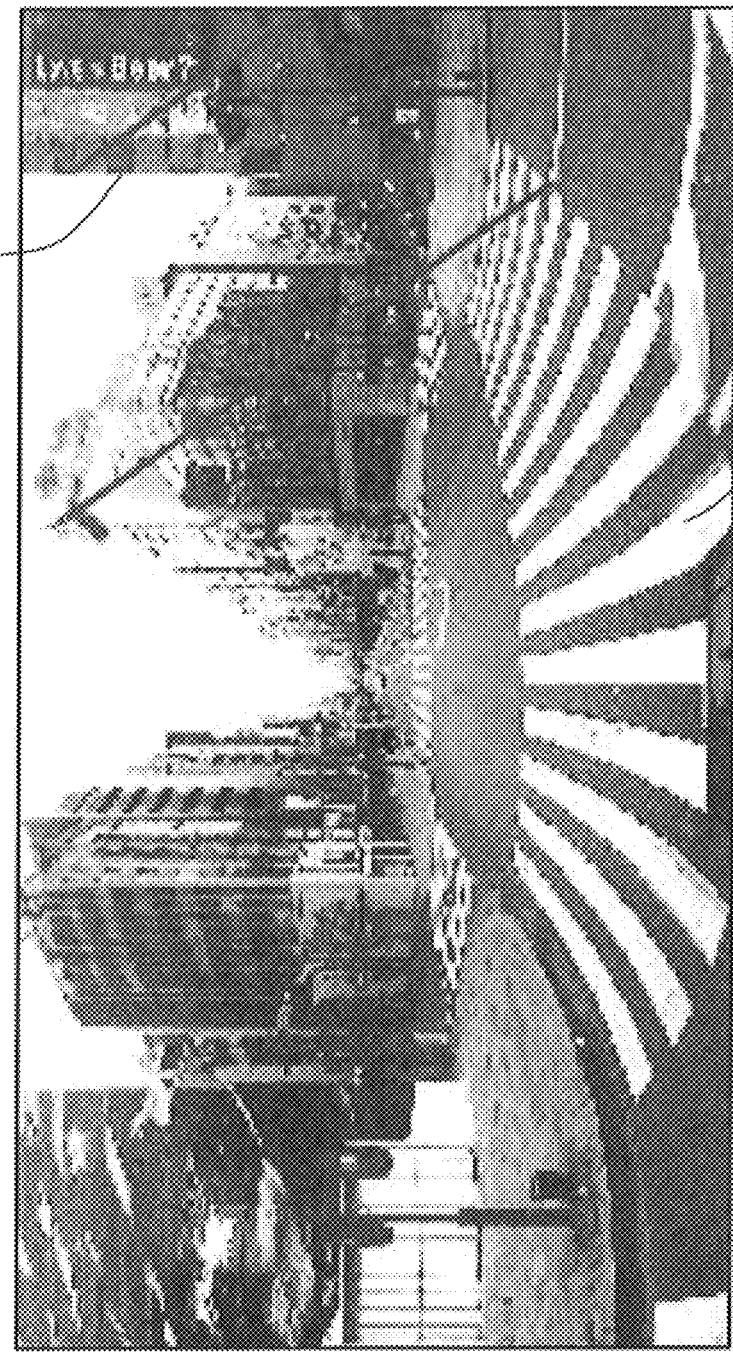
FIG. 59 is a conceptual diagram showing a corrected image clipped from an omnidirectional image.
Figure 60:
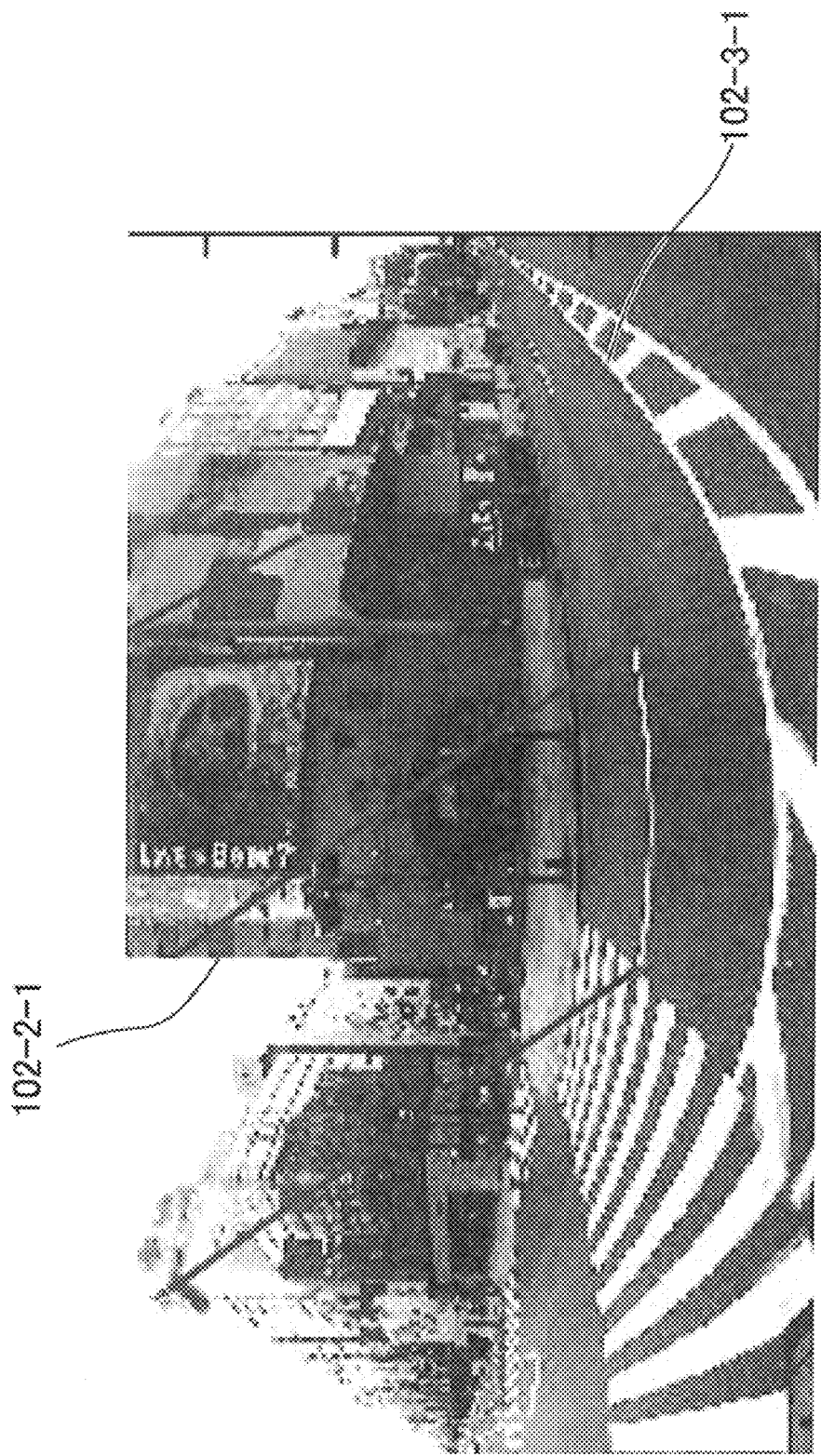
FIG. 60 is a conceptual diagram showing a corrected image clipped from an omnidirectional image.

FIG. 56 shows the display image of the sixth embodiment of the present invention, which adjusted the positions of the boundaries between the frontward correction image display region and the leftward or rightward correction image display region on the basis of the relationships shown in FIG. 14.

In FIG. 14, the vehicle-mounted camera 2 is not shown, but mounted on the vehicle 1 as shown in FIGS. 4 and 5. The reference sign 25-3 indicates a circle being an innermost of a vehicle travelling way on the ground surface, the vehicle travelling way travelled thereon the vehicle at full lock. The reference sign 25-4 indicates a circle being an outermost of a vehicle travelling way on the ground surface, the vehicle travelling way travelled thereon the vehicle at full lock. The innermost circle 25-3 is concentric with the outermost circle 25-4. The reference sign 25-2 indicates a common center of the innermost circles 25-3 with the outermost circles 25-4. The reference sign 25-1 indicates an image origin being under an imaging position on the ground surface. The reference sign 25-5 indicates a tangent line tangent to the innermost circles 25-3 with passing on the image origin 25-1 on the ground surface. The reference sign 25-6 indicates a tangent point of the tangent line 25-5 with respect to the innermost circles 25-3. The reference sign 25-7 indicates an image separation reference point on the tangent line 25-5 at an arbitrary distance such as 1.5 m in the direction of the x-axis.

Although the second embodiment of the present invention is not adjusted on the basis of the positional relationship as shown in FIG. 14, the sixth embodiment of the present invention will be explained as operating in the same manner as the second embodiment of the present invention as shown in FIGS. 35 and 36 in the result of the adjustment on the basis of the positional relationship as shown in FIG. 14.

FIG. 56 shows the display image operated in the same manner as the second embodiment of the present invention as shown in FIGS. 35 and 36. In FIG. 56, the innermost circle 25-3 is displayed on the leftward correction image display region 44-3L with the subjects shown in FIG. 37.

The innermost circle 25-3 is not displayed in real, but shown for better understanding of the positional relationship.

In FIG. 56, the reference sign 25-8 indicates an image separation point representing a boundary among the downward correction image display region 41-2, the forward correction image display region 41-1 and the leftward correction image display region 44-3L.

The image separation point is the same position in the directions of the x-axis, y-axis and z-axis directions on the downward correction image display region 41-2, the forward correction image display region 41-1 and the leftward correction image display region 44-3L.

For the purpose of displaying the area having a width of 1.5 m wider than the width of the vehicle 1 on the downward correction image display region 41-2, the direction of the y-axis is adjusted to the relationship 1.2 m vicinity of the 1.16 m of the image separation reference point 25-7.

By the adjustment, the dotted mask picture 44-5L displayed at any height in the direction of z-axis indicates the direction toward 1.5 m in the direction of x-axis and 1.2 m in the direction of the y-axis from the image origin 25-1 on the ground surface.

Therefore, as will be seen from the relationship between the image separation reference point 25-7 and the image separation point 25-8, it is to be understood that the innermost circle 25-3 mainly displayed in the leftward correction image display region 44-3L and the tangent point 25-6 is in the vicinity of the dotted mask picture 44-5L.

The solid subject having a height in the direction of the z-axis from the innermost circle 25-3 is displayed in vertical with respect to the innermost circle 25-3.

In FIG. 39, the cuboid 11 is corresponding to a solid subject having an edge in the vicinity of the tangent point 25-6, and a vertical side of the edge is displayed in the vicinity of the dotted mask picture 44-5L. At this time, the vehicle 1 at full lock passes beside the cuboid 11.

In other words, if the vehicle 1 is preliminarily handled as the cuboid 11 displayed on the leftward correction image display region 44-3L without displaying on the forward correction image display region 41-1, the vehicle 1 at full lock for the purpose of parking is then recognized to be in the vicinity of the cuboid 11 without contacting with the cuboid 11.

Because the relationship between the adjacent place and the vehicle 1 is visible in the downward correction image display region 41-2, the relationship between the distant place and the vehicle 1 is enough to be roughly visible.

As will be seen from the foregoing description, it is to be understood that the straight line formed mask pictures indicating the boundary between the leftward or rightward correction image display region and the forward correction image display region acts as a guideline for judging whether or not the vehicle at full lock is in contact with the solid subject, thereby resulting in improving visibility of the relationships between the vehicle, for example, moved into the garage and the solid subject.

[Industrial Applicability]

The drive assist display apparatus of the present invention is available for a drive assist display apparatus which can realize, from imaging to displaying the front, left, right and down wide area of the backward or frontward of the vehicle, displaying in high visibility of the form of the imaged subject in accordance with purposes, improving visibility of the directional and positional relationships between the imaged subject and the vehicle, and facilitating the movement of the eye line targeting to the subject on the display.

[Reference Signs List]
1 vehicle
2 vehicle-mounted camera
2-1 to 2-n vehicle-mounted camera
3 image processing section
4 monitor
5 image processing apparatus
6 vehicle origin
7 optical axis
8 horizon
9 image circle
10 bumper
11 cuboid
12-1, 12-2, 12-3 cuboid
13 cuboid
21 cells on a forward plane
21G vehicle left-right direction straight line
21L vertical line
21R vertical line
21-1 forward virtual sight line
21-2 forward plane
22-1 cells on a downward plane
22-1-1 downward virtual sight line
21-1-2 downward plane
22-2 cells on a downward plane
22-2-1 downward virtual sight line
21-2-2 downward plane
23-1L cells on a leftward plane
23-1-1L leftward virtual sight line
23-1-2L leftward plane
23-1R cells on a rightward plane
23-1-1R rightward virtual sight line
23-1-2R rightward plane
23-2L cells on a leftward plane
23-2-1L leftward virtual sight line
23-2-2L leftward plane 23-2R cells on a rightward plane
23-2-1R rightward virtual sight line
23-2-2R rightward plane
23-3L cells on a leftward plane
23-3-1L leftward virtual sight line
23-3-2L leftward plane
23-3R cells on a rightward plane
23-3-1R rightward virtual sight line
23-3-2R rightward plane
23-4L cells on a leftward plane
23-4-1L leftward virtual sight line
23-4-2L leftward plane
23-4R cells on a rightward plane
23-4-1R rightward virtual sight line
23-4-2R rightward plane
24 lines on the ground surface
24-15L vehicle front-back direction straight line
24-15R vehicle front-back direction straight line
25-1 image origin on the ground surface
25-2 center of a circle being a vehicle travelling way
25-3 circle being an innermost of the vehicle travelling way
25-4 circle being an outermost of the vehicle travelling way
25-5 tangent line
25-6 tangent point
25-7 image separation reference point
25-8 image separation point
30 imaging origin
41-1 forward correction image display region
41-2 downward correction image display region
41-3L leftward correction image display region
41-3R rightward correction image display region
41-4 dotted line mask picture
41-5L dotted line mask picture
41-5R dotted line mask picture
41-6L plane mask picture
41-6R plane mask picture
41-7L plane mask picture
41-7R plane mask picture
42-3L leftward correction image display region
42-3R rightward correction image display region
42-5L dotted line mask picture
42-5R dotted line mask picture
42-6L plane mask picture
42-6R plane mask picture
43-3L leftward correction image display region
43-3R rightward correction image display region
43-5L dotted line mask picture
43-5R dotted line mask picture
43-6L plane mask picture
43-6R plane mask picture
43-7L plane mask picture
43-7R plane mask picture
44-3L leftward correction image display region
44-3R rightward correction image display region
44-5L dotted line mask picture
44-5R dotted line mask picture
44-6L plane mask picture
44-6R plane mask picture
44-7L plane mask picture
44-7R plane mask picture
45-3L leftward correction image display region
45-3R rightward correction image display region
45-5L dotted line mask picture
45-5R dotted line mask picture
45-6L plane mask picture
45-6R plane mask picture
45-7L plane mask picture
45-7R plane mask picture
46-2 downward correction image display region
46-4 dotted line mask picture
46-8L dotted line mask picture
46-8R dotted line mask picture
47-2 downward correction image display region
47-3L leftward correction image display region
47-3R rightward correction image display region
47-4 dotted line mask picture
47-5L dotted line mask picture
47-5R dotted line mask picture
47-7L plane mask picture
47-7R plane mask picture
47-8L dotted line mask picture
47-8R dotted line mask picture
70 display device (moving object image display means)
71 backward left image display region (first display region)
72 backward right image display region (second display region)
73 backward straight image display region (third display region)
101-1 crosswise straight line on the ground surface
101-2 vertical line from the ground surface
102-2-1 vertical line from the ground surface
102-2-2 lines constituting a vertically-striped pattern of a crosswalk
102-3-1 crosswise straight line on the ground surface
F movement locus
F' auxiliary image guide line
M' auxiliary image
Q image appearance position
T moving object
x x-axis
y y-axis
z z-axis

The invention claimed is:

1. A drive assist display apparatus comprising:
one or more imaging sections operable to take an image of a front, left, right and down wide area of a backward or frontward of a vehicle from an imaging position;
an image processing section operable to correct the image taken by the imaging section, operable to divide the corrected image, operable to locate the divided images respectively on arbitrary correction image display regions, and operable to combine mask pictures with the located images on arbitrary display positions;
an image display section for displaying the image processed by the image processing section, wherein
the image processing section is operable to create:
a forward correction image corrected in a manner that, when an image of square cells formed by horizontal and vertical lines with respect to a horizontal ground surface on a forward plane is taken, the square cells on the forward plane are displayed as squares or rectangles formed by horizontal and vertical lines with each having an area equal to one another on a display image, the forward plane being in perpendicular relationship with a forward virtual sight line, the forward virtual sight line being in parallel relationship with a vehicle front-back direction, and the vehicle front-back direction being in parallel relationship with the ground surface;
a leftward correction image corrected in a manner that, when an image of square cells formed by horizontal and vertical lines with respect to the ground surface on a leftward plane is taken, the square cells on the leftward plane are displayed as squares or rectangles formed by horizontal and vertical lines with each having an area equal to one another on the display image, the leftward plane being in perpendicular relationship with a leftward virtual sight line, the leftward virtual sight line being horizontally inclined leftward at an angle over 0 and under 90 degrees with respect to the vehicle front-back direction;

a rightward correction image corrected in a manner that, when an image of square cells formed by horizontal and vertical lines with respect to the ground surface on a rightward plane is taken, the square cells on the rightward plane are displayed as squares or rectangles formed by horizontal and vertical lines with each having an area equal to one another on the display image, the rightward plane being in perpendicular relationship with a rightward virtual sight line, the rightward virtual sight line being horizontally inclined rightward at an angle over 0 and under 90 degrees with respect to the vehicle front-back direction; and a downward correction image corrected in a manner that, when an image of square cells formed by straight lines parallel to a vehicle left-right direction and straight lines perpendicular to a straight line being in the vehicle left-right direction on a downward plane is taken, the parallel and perpendicular square cells are displayed as squares or rectangles formed by horizontal and vertical lines with each having an area equal to one another on the display image, the downward plane being in perpendicular relationship with a downward virtual sight line, the downward virtual sight line being vertically inclined downward at an angle over 0 and under 90 degrees with respect to the vehicle front-back direction, operable to have the forward, leftward, rightward, and downward correction images displayed on respective forward, leftward, rightward, and downward correction image display regions:

the forward correction image display region having left and right sides each formed a vertical straight line on the display image, and a bottom side formed a horizontal straight line on the display image;

the leftward correction image display region having a right side formed a vertical straight line on the display image, and a bottom side formed a straight line corresponding to a straight line being in parallel relationship with the vehicle front-back direction at the left hand side of the imaging position on the ground surface;

the rightward correction image display region having a left side formed a vertical straight line on the display image, and a bottom side formed a straight line corresponding to a straight line being in parallel relationship with the vehicle front-back direction at the right hand side of the imaging position on the ground surface; and the downward correction image display region having a top side formed a horizontal straight line on the display image with corresponding to a straight line being in parallel relationship with the vehicle left-right direction at the front side of the imaging position on the ground surface, a left side formed a straight line corresponding to the straight line being in parallel relationship with the vehicle front-back direction at the left hand side of the imaging position on the ground surface, and a right side formed a straight line corresponding to the straight line being in parallel relationship with the vehicle front-back direction at the right hand side of the imaging position on the ground surface, operable to locate the correction image display regions in a manner that the right side of the leftward correction image display region is adjacent to the left side of the forward correction image display region, the left side of the rightward correction image display region is adjacent to the right side of the forward correction image display region, and the top side of the downward correction image display region is adjacent to the bottom side of the forward correction image display region, operable to fit the taken images to the respective correction image display regions in a manner that the same images are appeared in the vicinity of the sides of the respective correction image display regions adjacent to each other, operable to flip horizontally the display image with keeping the relationships among four correction image display regions as usage, and operable to draw mask pictures of lines or dotted lines in arbitrary color on the sides of the respective correction image display regions adjacent to each other, and draw mask pictures filling gaps except four correction image display regions in arbitrary color.

2. The drive assist display apparatus as set forth in claim 1,
adjusting the inclined angle of the leftward and rightward virtual sight lines, or adjusting the degree of expanding horizontally the square cells on the leftward and rightward planes so that the straight line corresponding to the bottom side of the leftward or rightward correction image display region and being parallel relationship with the vehicle front-back direction on the ground surface is displayed more horizontal on the leftward or rightward correction image display region than on the forward correction image display region.

3. The drive assist display apparatus as set forth in claim 1 or 2,
displaying in a manner that, when the image of the square cells on the leftward plane is taken, the square cells are appeared as parallelogram cells each having an area equal to one another and inclined down toward left gradually at a degree that straight lines parallel to the ground surface are visible in the leftward correction image display region, and that, when the image of the square cells on the rightward plane is taken, the square cells are appeared as parallelogram cells each having an area equal to one another and inclined down toward right gradually at a degree that the straight lines parallel to the ground surface is visible in the rightward correction image display region.

4. The drive assist display apparatus as set forth in claim 1,
locating the correction image display regions in a manner that the bottom side of the leftward correction image display region is adjacent to the left side of the downward correction image display region, and the bottom side of the rightward correction image display region is adjacent to the right side of the downward correction image display region, fitting the taken images to the respective correction image display regions in a manner that the same images are appeared in the vicinity of the sides of the respective correction image display regions adjacent to each other, and drawing the mask pictures of lines or dotted lines in arbitrary color on the sides of the respective correction image display regions adjacent to each other.

5. The drive assist display apparatus as set forth in claim 4,
displaying in a manner that, when the image of the square cells on the leftward plane is taken, the square cells are appeared as parallelogram cells each having an area equal to one another and inclined down toward left gradually at a degree that straight lines parallel to the ground surface are visible in the leftward correction image display region, and that, when the image of the square cells on the rightward plane is taken, the square cells are appeared as parallelogram cells each having an area equal to one another and inclined down toward right gradually at a degree that the straight lines parallel to the ground surface are visible in the rightward correction image display region.

6. The drive assist display apparatus as set forth in claim 1 to be operated with:

a vehicle front-back direction straight line being in parallel relationship with the vehicle front-back direction on the ground surface, and corresponding to the left or right side of the downward correction image display region or corresponding to the bottom side of the leftward or rightward correction image display region;

a vehicle left-right direction straight line being in parallel relationship with the vehicle left-right direction on the ground surface, and corresponding to the top side of the downward correction image display region or corresponding to the bottom side of the forward correction image display region;

an intersection point between the vehicle front-back direction straight line and the vehicle left-right direction straight line;

a circle being an innermost of a vehicle travelling way on the ground surface, the vehicle travelling way travelled thereon the vehicle at full lock; and a tangent line tangent to the circle with passing on an image origin being under the imaging position on the ground surface, wherein the intersection point is in the vicinity of the tangent line.

* * * * *